(12) United States Patent
Chien

(10) Patent No.: US 12,454,668 B2
(45) Date of Patent: Oct. 28, 2025

(54) THREE-DIMENSIONAL CELL CULTURE PLATFORM AND USES THEREOF

(71) Applicant: OminiWell Pty Ltd., Mawson Lakes (AU)

(72) Inventor: Chia-Chi Chien, Mawson Lakes (AU)

(73) Assignee: OMINIWELL PTY LTD., Mawson Lakes (AU)

( * ) Notice: Subject to any disclaimer, the term of this patent is extended or adjusted under 35 U.S.C. 154(b) by 821 days.

(21) Appl. No.: 17/642,919

(22) PCT Filed: Sep. 30, 2020

(86) PCT No.: PCT/AU2020/051042
§ 371 (c)(1),
(2) Date: Mar. 14, 2022

(87) PCT Pub. No.: WO2021/062471
PCT Pub. Date: Apr. 8, 2021

(65) Prior Publication Data
US 2022/0403315 A1    Dec. 22, 2022

(30) Foreign Application Priority Data
Sep. 30, 2019 (AU) .................... 2019903669

(51) Int. Cl.
C12M 1/12      (2006.01)
C12M 3/00      (2006.01)
C12M 3/06      (2006.01)
C12N 5/00      (2006.01)

(52) U.S. Cl.
CPC ............ *C12M 25/04* (2013.01); *C12M 21/08* (2013.01); *C12M 23/16* (2013.01); *C12N 5/0062* (2013.01); *C12N 2513/00* (2013.01)

(58) Field of Classification Search
CPC ...... C12M 25/04; C12M 25/14; C12M 21/08; C12M 23/16; C12M 23/12; C12M 23/22; C12N 5/0062; C12N 2513/00
See application file for complete search history.

(56) References Cited

U.S. PATENT DOCUMENTS 7,846,717 B2 * 12/2010 Yasuda .................. C12M 25/02
                                                                435/287.7
2017/0298314 A1 * 10/2017 Lyons ..................... B01L 3/563

FOREIGN PATENT DOCUMENTS

EP              1344817 A1 *  9/2003  ............. G02B 21/34
WO    WO-2019008189 A1 *  1/2019  ............. C12M 21/08

* cited by examiner

*Primary Examiner* — Michael L Hobbs
(74) *Attorney, Agent, or Firm* — Muncy, Geissler, Olds & Lowe, P.C.

(57) ABSTRACT

A three-dimensional cell culture platform includes a cell supporting medium having at least one microwell formed therein; and one or more microwell spacers defining an entrance of the or each microwell, the entrance enabling the introduction of a cell culture medium into the or each microwell. The volume of a microwell is determined by a surface of the one or more microwell spacers defining the entrance of the microwell, and by an interface of the cell supporting medium of the microwell. The one or more microwell spacers are in direct contact with the cell supporting medium prior to one or more cells being delivered to the three-dimensional cell culture platform.

10 Claims, 46 Drawing Sheets

Vascular Formation

Skin Cancer Units

Cell line only
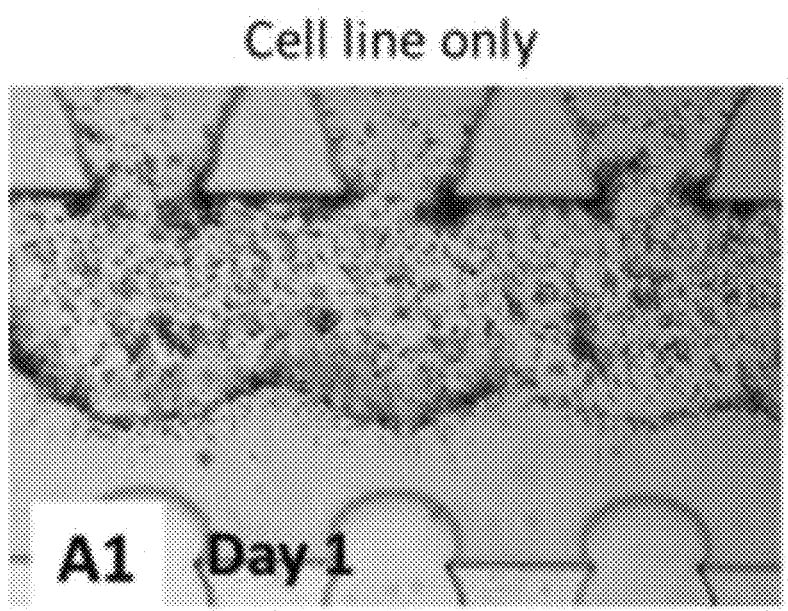
FIGURE 14 A1
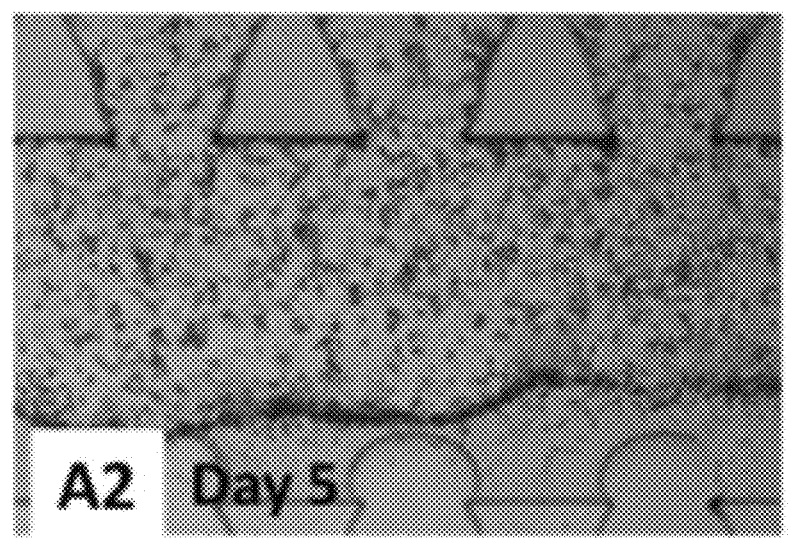
FIGURE 14 A2
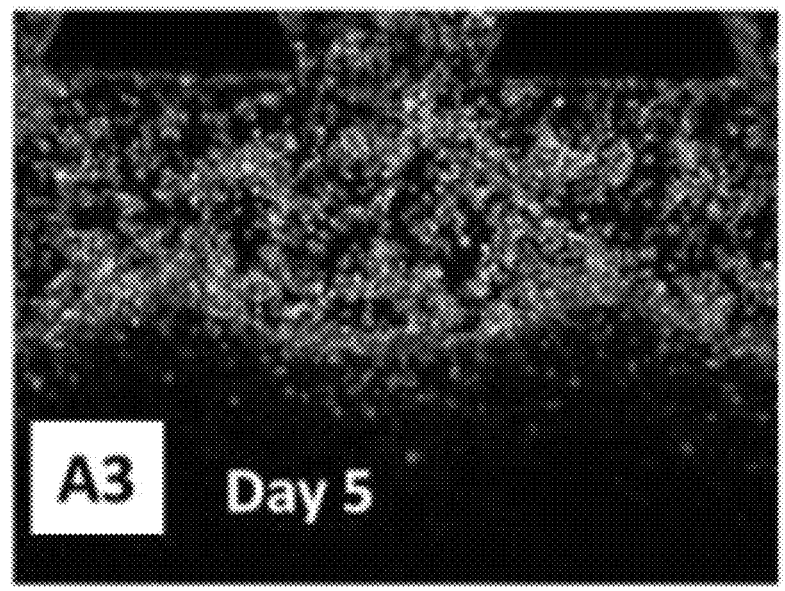
FIGURE 14 A3

Xenograft tumour
FIGURE 14 B1
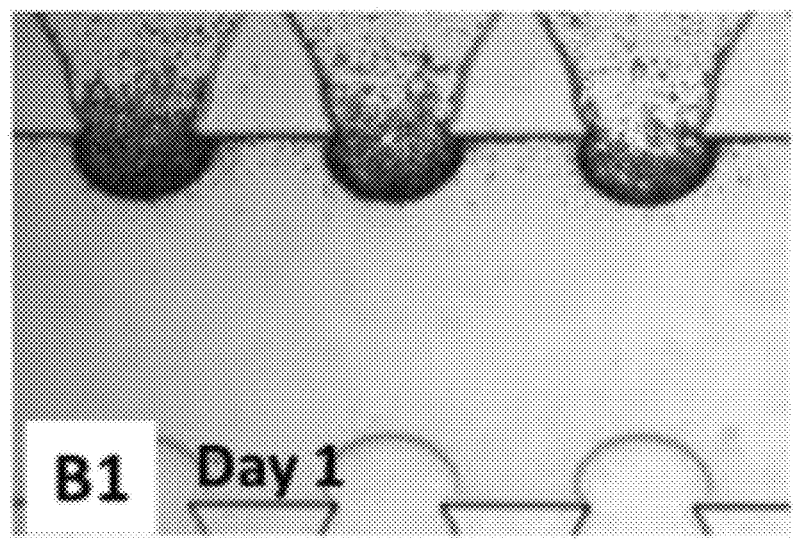
FIGURE 14 B2
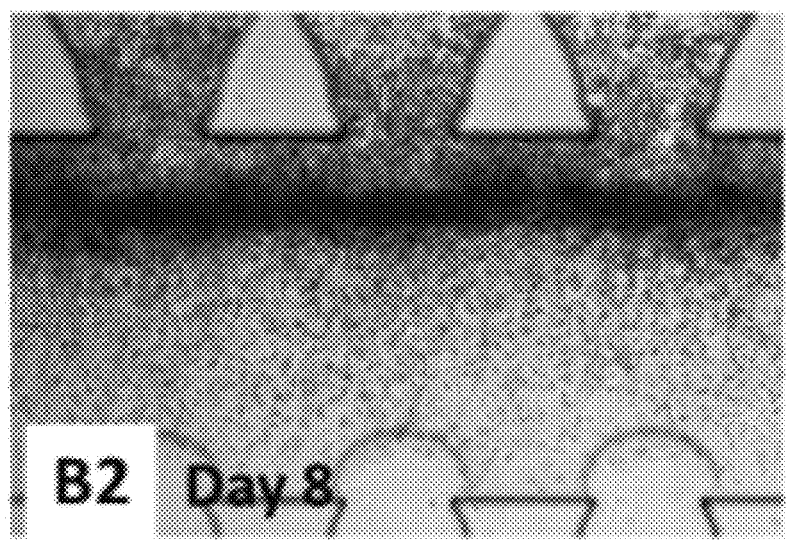
FIGURE 14 B3
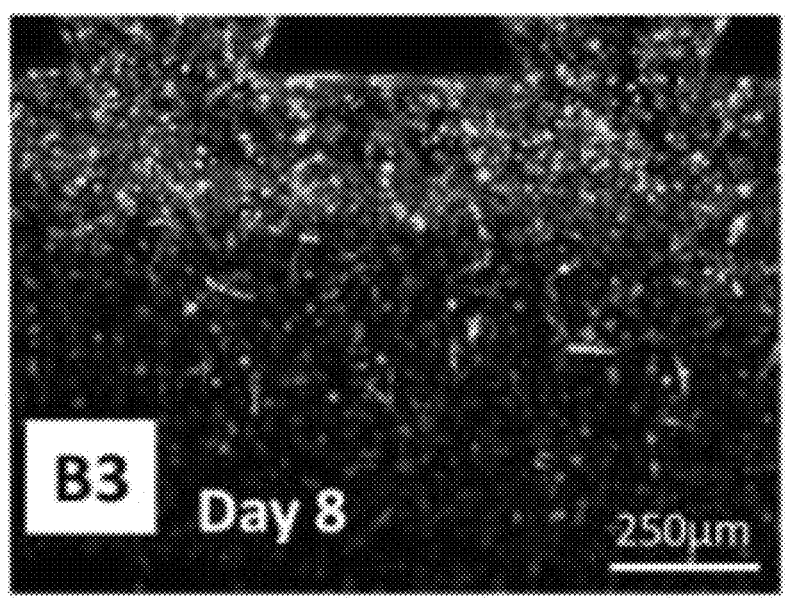

FIGURE 14 C1
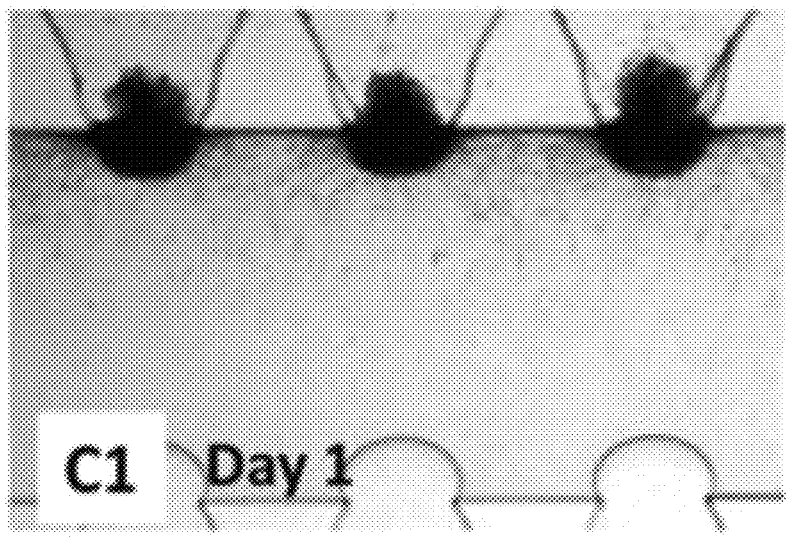
FIGURE 14 C2
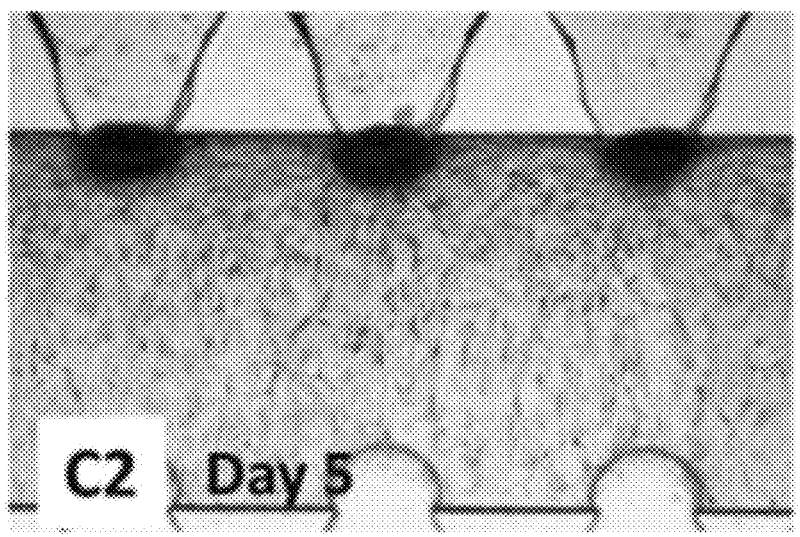
FIGURE 14 C3
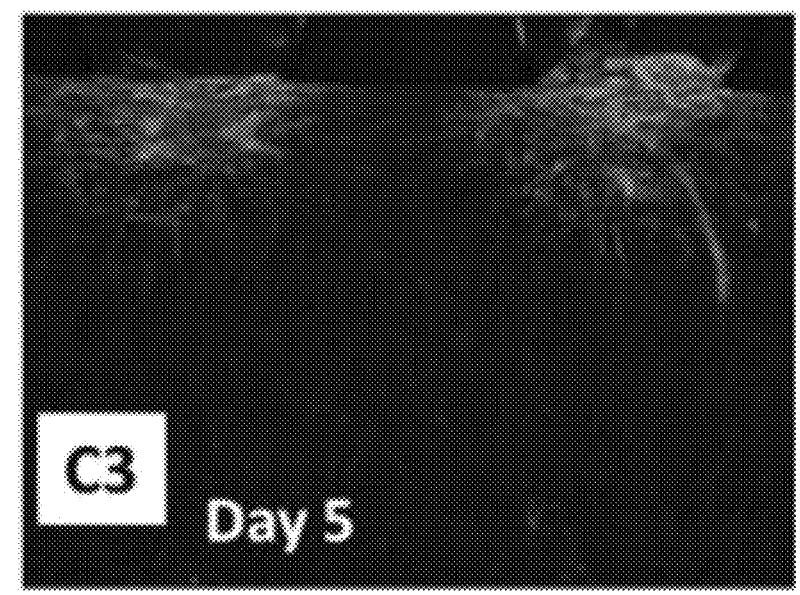

THREE-DIMENSIONAL CELL CULTURE PLATFORM AND USES THEREOF

FIELD OF THE INVENTION

The present invention relates generally to culture platforms for the growth of cells, including spheroids, tissues and organoids. Specifically, culture platforms which allow the formation of complex tissue-like structures under well-controlled conditions and allow co-culture with other cell types in a pre-defined supporting matrix are provided. Microfluidic devices comprising the culture platforms are also provided, together with methods for producing the culture platforms.

BACKGROUND OF THE INVENTION

The ability to study the molecular and cellular aspects of human disorders, and to identify and develop new therapies for those disorders, is limited by the lack of availability of appropriate preclinical models. This is because most in vitro models fail to fully recapitulate the local tissue and organ microenvironment, such as cellular composition, tissue-tissue interfaces, organ-level structures, fluid flows, and mechanical cues that cells experience in living organisms.

The limitations within existing in vitro models arise due to the complex three-dimensional nature of organs which are comprised of several tissues with a diverse cellular composition and defined cellular architectures. Within these structures, cells adhere to the same or different cell types by cell-cell adhesion, as well as to the surrounding extracellular matrix (ECM). These types of adhesions mutually regulate a myriad of cellular functions that are orchestrated at both the tissue and organ level and which are difficult to recapitulate in vitro.

In view of these limitations, most preclinical drug screening studies have relied mainly on the use of two-dimensional mono-culture systems which neglect the complexity of tissues in vivo, and poorly model the important contribution of the cellular and non-cellular microenvironment. Attempts to address these issues have relied on the use of more complex transwell-based assays, for example to study cancer cell invasion through microscale pores of a membrane pre-coated with a thin layer of extracellular matrix (ECM).

Other three-dimensional systems have been developed, such as formation of spheroids which can be used to model cell-cell and cell-ECM interactions between cells and their surrounding tissue environment. Spheroids may also generate oxygen and nutrient gradients if grown large enough. However, transwell-based assays and spheroids still fail to reproduce the complexity observed in the tissue architecture of organs. Furthermore, neither of these models includes exposure to a blood or nutrient rich medium which leads to a lack of tissue-tissue interactions and an inability to study recruitment of circulating immune cells or physiological dosing of potential therapeutic agents.

Another approach which involves the culture of cells in ECM gels to form self-organising organotypic structures called organoids has recently emerged as a new in vitro model for preclinical testing of potential new therapies and personalised medicine. However, organoids are commonly closed structures and so do not allow direct access to the epithelial lumen. Furthermore, although organoids have a complex cellular composition, they lack the tissue-tissue interfaces normally observed between cells and the surrounding vasculature and stroma.

In summary, present in vitro modelling technologies have evolved into two general categories: i) cells/organoids/spheroids grown in a gel matrix; and ii) gel-free systems which form three dimensional avascular organoids/spheroids/clusters, with neither of these being suitable to formulate and grow a complex multicellular-type organoid system. For example, in conventional gel matrix systems (category i), cells embedded in a gel system show similar phenotypes in vivo as cell-cell and cell-matrix interactions. However, the lack of blood flow networks in these systems and the partial flexibility (because of gels used for embedding) to also incorporate in a controlled manner (i.e. space and time) other cell types that are absent in the organoid/cell aggregate limits the applicability of such systems to recreate more complex tissue structures. On the contrary, most gel-free systems (category ii) allow cells to grow on antifouling surfaces and increase cell-cell adhesion, thus forming cell clusters/spheroids. However, further transferring and assembling procedures are still required to integrate the agglomerated cells within the ECM, which causes model variability in the experimental processes, that further adds to the fact this procedure is only applicable to cell types that self-aggregate.

Therefore, it appears that the main limitation of existing three dimensional and organotypic in vitro models is that they do not contain or allow for the existence of all cell types present in the organ they mimic, and/or they do not support the formation of spheroid and organotypic structures in situ. Accordingly, novel approaches that include the formation of complex spheroid and organotypic structures under well-controlled conditions and co-culture with other cell types in a pre-defined supporting matrix are highly desirable.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention as it existed before the priority date of each claim of this application.

SUMMARY OF THE INVENTION

The present invention provides in vitro three-dimensional cell culture platforms which closely resemble the local tissue and organ microenvironment, such as cellular composition, tissue-tissue interfaces, organ-level structures, and fluid flows, which is observed in vivo. The three-dimensional cell culture platforms of the present invention provide a surface interface formed by a cell supporting medium, which acts as a biological surface for cells to populate and grow.

In a first aspect, the present invention provides a three-dimensional cell culture platform comprising:
  (i) a cell supporting medium having at least one microwell formed therein; and
  (ii) one or more microwell spacers defining an entrance of the or each microwell, the entrance enabling the introduction of a cell culture medium into the or each microwell,
  wherein the volume of a microwell is determined by a surface of the one or more microwell spacers defining the entrance of the microwell, and by an interface of the cell supporting medium of the microwell, and
  wherein the one or more microwell spacers are in direct contact with the cell supporting medium prior to one or more cells being delivered to the three-dimensional cell culture platform.

In some embodiments, the cell supporting medium has at least two microwells formed therein, wherein at least one microwell opposes and faces another microwell. In some embodiments, the cell supporting medium has at least two microwells formed therein, wherein the at least two microwells lie in the same plane and are spaced apart from each other.

In some embodiments, the microwell spacers extends away from the cell supporting medium.

In some embodiments, the distance and area between each microwell spacer influences the volume and shape of the microwell.

In some embodiments, each microwell is in the form of a microchannel in the cell supporting medium. In some embodiments, each microwell or microchannel has a flat, bulbous, rounded, or curved base.

In some embodiments, the platform supports the formation of a cluster of cells in situ.

In some embodiments, the cell culture medium enables delivery of cells to a microwell. In some embodiments, the cells once delivered form a cluster of cells in the microwell, on the interface of the cell supporting medium of the microwell, and/or in the cell supporting medium.

In some embodiments, the three-dimensional cell culture platform further comprises a cluster of cells formed in situ. In some embodiments, the cluster of cells is present in a microwell, on the interface of the cell supporting medium of a microwell, and/or in the cell supporting medium.

In some embodiments, each microwell is optically transparent so as to enable microscopy imaging.

In some embodiments, the cell culture medium is a liquid medium. In some embodiments, the entrance of a microwell enables the delivery of one or more agents to the microwell, to the interface of the cell supporting medium of a microwell, or to the cell supporting medium. In some embodiments, the one or more agents are delivered via the cell culture medium.

In some embodiments, the one or more agents are selected from the group consisting of organic materials, inorganic materials, a drug carrier, a colloid, a drug, a small molecule, a nucleic acid, an oligonucleotide, an oligopeptide, a polypeptide, a protein, an enzyme, a polysaccharide, a glycoprotein, a hormone, a receptor, a ligand for a receptor, a co-factor, an antisense oligonucleotide, a ribozyme, a small interfering RNA, a microRNA, a short hairpin RNA, a lipid, an aptamer, a virus, and an antibody or an antigen binding part thereof.

In some embodiments, the cell supporting medium also influences the volume and shape of the microwell.

In some embodiments, the cell supporting medium supports the formation of a cluster of cells in situ. In some embodiments, the cluster of cells is in the form of a spheroid, a microtissue, a compact aggregate, a loose aggregate, or a suspension of cells in the cell supporting medium. In some embodiments, the cluster of cells is in the form of a tissue-like or organ-like structure.

In some embodiments, the cell supporting medium is a three-dimensional scaffold. In some embodiments, the three-dimensional scaffold comprises a gel matrix. In some embodiments, the gel matrix is a hydrogel. In some embodiments, the hydrogel is a natural hydrogel or a synthetic hydrogel.

In some embodiments, the hydrogel is a reversible or irreversible liquid-gel material, a thermosensitive hydrogel, a photosensitive hydrogel, an ionic polymerisation hydrogel, an enzymatic, covalent, or noncovalent polymerisable hydrogel, or a cross-linked hydrogel.

In some embodiments, the hydrogel is selected from a cell-derived ECM hydrogel, a decellularised matrix derived from tissue, laminin, fibrin, fibronectin, gelatin, collagen, basement membrane extract, Matrigel, GeIMA, TissueSpec, hyaluronic acid, alginate, chitosan, silk, VitroGel, Pluronic F-127, Poly(N-isopropylacrylamide) (PNIPAAm), and Polyethylene Glycol (PEG).

In some embodiments, the three-dimensional cell culture platform of the first aspect of the invention further comprises a cell culture medium which is in direct contact with an interface of the cell supporting medium of the microwell. In some embodiments, the cell culture medium is also in direct contact with the surface of the one or more microwell spacers defining the entrance of the microwell.

In a second aspect, the present invention provides a microfluidic device for cell culture, the microfluidic device comprising a three-dimensional cell culture platform of the first aspect of the invention.

In a third aspect, the present invention provides a method of producing a three-dimensional cell culture platform, the method comprising:
  providing a first supporting structure having at least one entrance formed therein, wherein the at least one entrance is located at the periphery of the first supporting structure, and wherein the at least one entrance is defined by one or more microwell spacers connected to the first supporting structure;
  providing a second supporting structure in communication with the at least one entrance, wherein the one or more microwell spacers are located between the first supporting structure and the second supporting structure;
  introducing a sacrificed medium into the second supporting structure, wherein the sacrificed medium is a liquid reversible medium, and wherein the sacrificed medium forms a liquid-air interface in the form of a meniscus due to surface tension between the sacrificed medium, air, and the first supporting structure and the second supporting structure;
  solidifying the sacrificed medium;
  introducing a cell supporting medium into the first supporting structure;
  solidifying the cell supporting medium, wherein the solidified sacrificed medium protrudes through the at least one entrance and into the cell supporting medium in the first supporting structure so as to form at least one microwell in the cell supporting medium; and optionally
  liquefying the sacrificed medium, and then removing the liquefied sacrificed medium from the second supporting structure,
  wherein the volume of a microwell is determined by a surface of the one or more microwell spacers defining the entrance of the microwell, and by an interface of the cell supporting medium of the microwell,
  wherein the at least one entrance enables the introduction of a cell culture medium into the microwell, and
  wherein the one or more microwell spacers are in direct contact with the cell supporting medium prior to one or more cells being delivered to the three-dimensional cell culture platform.

In a fourth aspect, the present invention provides a method of producing a three-dimensional cell culture platform, the method comprising:
  providing a first supporting structure having at least two entrances formed therein, wherein the entrances are located at the periphery of the first supporting structure, wherein at least one entrance opposes and faces another entrance, and wherein the entrances are defined by one or more microwell spacers connected to the first supporting structure;

providing a second supporting structure in communication with at least one entrance, wherein one or more microwell spacers are located between the first supporting structure and the second supporting structure;

providing a third supporting structure in communication with at least one other entrance which is opposed to and faces the at least one entrance in communication with the second supporting structure, wherein one or more microwell spacers are located between the first supporting structure and the third supporting structure;

introducing a sacrificed medium into the second supporting structure and third supporting structure, wherein the sacrificed medium is a liquid reversible medium, and wherein the sacrificed medium forms liquid-air interfaces in the form of menisci due to surface tension between the sacrificed medium, air, and the first supporting structure, second supporting structure, and third supporting structure;

solidifying the sacrificed medium;

introducing a cell supporting medium into the first supporting structure;

solidifying the cell supporting medium, wherein the solidified sacrificed medium protrudes through each entrance and into the cell supporting medium in the first supporting structure so as to form a microwell in the cell supporting medium; and optionally liquefying the sacrificed medium, and removing the liquefied sacrificed medium from the second supporting structure and third supporting structure, wherein the volume of a microwell is determined by a surface of the one or more microwell spacers defining the entrance of the microwell, and by an interface of the cell supporting medium of the microwell, wherein the entrance enables the introduction of a cell culture medium into the microwell, and wherein the one or more microwell spacers are in direct contact with the cell supporting medium prior to one or more cells being delivered to the three-dimensional cell culture platform.

In a fifth aspect, the present invention provides a method of producing a three-dimensional cell culture platform, the method comprising:

providing a first supporting structure having at least two entrances formed therein, wherein the at least two entrances lie in the same plane, are spaced apart from each other, and are located at the periphery of the first supporting structure, and wherein the at least two entrances are defined by one or more microwell spacers connected to the first supporting structure;

providing a second supporting structure in communication with the at least two entrances, wherein one or more microwell spacers are located between the first supporting structure and the second supporting structure;

introducing a sacrificed medium into the second supporting structure, wherein the sacrificed medium is a liquid reversible medium, and wherein the sacrificed medium forms liquid-air interfaces in the form of menisci due to surface tension between the sacrificed medium, air, and the first supporting structure and the second supporting structure;

solidifying the sacrificed medium;

introducing a cell supporting medium into the first supporting structure;

solidifying the cell supporting medium, wherein the solidified sacrificed medium protrudes through each entrance and into the cell supporting medium in the first supporting structure so as to form a microwell in the cell supporting medium; and optionally liquefying the sacrificed medium, and removing the liquefied sacrificed medium from the second supporting structure, wherein the volume of a microwell is determined by a surface of the one or more microwell spacers defining the entrance of the microwell, and by an interface of the cell supporting medium of the microwell, herein the entrance enables the introduction of a cell culture medium into the microwell, and wherein the one or more microwell spacers are in direct contact with the cell supporting medium prior to one or more cells being delivered to the three-dimensional cell culture platform.

In some embodiments of the third to fifth aspects of the invention, the sacrificed medium comprises properties of liquid reversible hydrogels.

In some embodiments of the third to fifth aspects of the invention, the integrity and stability of the solidified sacrificed medium is maintained during introduction and solidification of the cell supporting medium in the first supporting structure.

In some embodiments of the third to fifth aspects of the invention, the sacrificed medium is solidified by intermolecular forces of covalent bonds, noncovalent bonds, hydrogen bonding, or electrostatic force. In some embodiments of the third to fifth aspects of the invention, the sacrificed medium is liquefied by disturbing or changing intermolecular forces of covalent bonds, noncovalent bonds, hydrogen bonding, or electrostatic force.

In some embodiments of the third to fifth aspects of the invention, the sacrificed medium comprises gelatin. In some embodiments, the sacrificed medium comprises about 1% to about 30% w/v of gelatin. In some embodiments, the sacrificed medium is liquefied by heating at least to about 8° C. to about 60° C.

In some embodiments of the third to fifth aspects of the invention, the sacrificed medium comprises agarose. In some embodiments, the sacrificed medium comprises about 0.1% to about 10% w/v of agarose. In some embodiments, the sacrificed medium is liquefied by heating at least to about 40° C. to about 100° C.

In some embodiments of the third to fifth aspects of the invention, the sacrificed medium comprises Pluronic-127. In some embodiments, the sacrificed medium comprises about 10% to about 50% w/v of Pluronic-127. In some embodiments, the sacrificed medium is liquefied by cooling at least to about 1° C. to about 37° C.

In some embodiments of the third to fifth aspects of the invention, the cell supporting medium is solidified by intermolecular forces of covalent bonds, noncovalent bonds, hydrogen bonding, or electrostatic force.

In some embodiments of the third to fifth aspects of the invention, the cell supporting medium is a three-dimensional scaffold. In some embodiments, the three-dimensional scaffold comprises a gel matrix. In some embodiments, the gel matrix is a hydrogel. In some embodiments, the hydrogel is a natural hydrogel or a synthetic hydrogel.

In some embodiments of the third to fifth aspects of the invention, the hydrogel is a reversible or irreversible liquid-gel material, a thermosensitive hydrogel, a photosensitive hydrogel, an ionic polymerisation hydrogel, an irreversible gelling hydrogel, an enzymatic, covalent, or noncovalent polymerisable hydrogel, or a cross-linked hydrogel.

In some embodiments of the third to fifth aspects of the invention, the hydrogel is selected from a cell-derived ECM hydrogel, a decellularised matrix derived from tissue, laminin, fibrin, fibronectin, gelatin, collagen, basement membrane extract, Matrigel, GelMA, TissueSpec, hyaluronic acid, alginate, chitosan, silk, VitroGel, Pluronic F-127, Poly (N-isopropylacrylamide) (PNIPAAm), and Polyethylene Glycol (PEG).

In some embodiments of the third to fifth aspects of the invention, the hydrogel comprises about 2.5 mg/ml to about 100 mg/ml fibrin. In some embodiments, the hydrogel comprises about 0.01 mg/ml to about 50 mg/ml collagen. In some embodiments, the hydrogel comprises about 0.01 mg/ml to about 20 mg/ml basement membrane extract. In some embodiments, the hydrogel comprises about 0.01 mg/ml to about 30 mg/ml Matrigel. In some embodiments, the hydrogel comprises about 0.01 mg/ml to about 20 mg/ml laminin. In some embodiments, the hydrogel comprises about 0.01 mg/ml to about 20 mg/ml fibronectin. In some embodiments, the hydrogel comprises about 0.01 mg/ml to about 500 mg/ml GelMA. In some embodiments, the hydrogel comprises VitroGel. In some embodiments, the hydrogel comprises TissueSpec.

In some embodiments of the third to fifth aspects of the invention, each microwell is in the form of a microchannel in the cell supporting medium. In some embodiments, the microwell or microchannel has a flat, bulbous, rounded, or curved base.

In some embodiments of the third to fifth aspects of the invention, the distance and area between each microwell influences the volume and shape of the microwell. In some embodiments, the cell supporting medium also influences the volume and shape of the microwell.

In some embodiments of the third to fifth aspects of the invention, the platform supports the formation of a cluster of cells in situ.

In some embodiments of the third to fifth aspects of the invention, each concave protrusion is optically transparent so as to enable microscopy imaging.

In some embodiments of the third to fifth aspects of the invention, the method further includes replacing the liquefied sacrificed medium with a cell culture medium, wherein the cell culture medium is in direct contact with an interface of the cell supporting medium of the microwell. In some embodiments, the cell culture medium is also in direct contact with the surface of the one or more microwell spacers defining the entrance of the microwell In some embodiments of the third to fifth aspects of the invention, the cell culture medium enables delivery of cells to a microwell. In some embodiments, the cells once delivered form a cluster of cells in the microwell, on the interface of the cell supporting medium of the microwell, and/or in the cell supporting medium.

In some embodiments of the third to fifth aspects of the invention, the cell culture medium is a liquid medium. In some embodiments, the cell culture medium enables the delivery of one or more agents to the cell supporting medium. In some embodiments, the one or more agents are delivered to a cluster of cells formed in the microwell, on the interface of the cell supporting medium of the microwell, and/or in the cell supporting medium.

In some embodiments of the third to fifth aspects of the invention, the one or more agents are selected from the group consisting of organic materials, inorganic materials, a drug carrier, a colloid, a drug, a small molecule, a nucleic acid, an oligonucleotide, an oligopeptide, a polypeptide, a protein, an enzyme, a polysaccharide, a glycoprotein, a hormone, a receptor, a ligand for a receptor, a co-factor, an antisense oligonucleotide, a ribozyme, a small interfering RNA, a microRNA, a short hairpin RNA, a lipid, an aptamer, a virus, and an antibody or an antigen binding part thereof.

In some embodiments of the third to fifth aspects of the invention, the cell supporting medium supports formation and growth of a cluster of cells in situ. In some embodiments, the cluster of cells is in the form of a spheroid, a microtissue, a compact aggregate, a loose aggregate, or a suspension of cells in the cell supporting medium. In some embodiments, the cluster of cells is in the form of a tissue-like or organ-like structure.

In a sixth aspect, the present invention provides a three-dimensional cell culture platform produced by the method of any one of the third to fifth aspects of the invention.

In a seventh aspect, the present invention provides a microfluidic device for cell culture, the microfluidic device comprising a three-dimensional cell culture platform of the sixth aspect of the invention.

In an eighth aspect, the present invention provides a method of producing a three-dimensional cell culture platform, the method comprising:

providing a first supporting structure having at least one entrance formed therein, wherein the at least one entrance is located at the periphery of the first supporting structure, wherein the at least one entrance is defined by one or more microwell spacers connected to the first supporting structure;

providing a second supporting structure in communication with the at least one entrance, wherein the one or more microwell spacers are located between the first supporting structure and the second supporting structure;

introducing a sacrificed medium into the second supporting structure, wherein the sacrificed medium is a liquid reversible medium, and wherein the sacrificed medium forms a liquid-air interface in the form of a meniscus due to surface tension between the sacrificed medium, air, and the first supporting structure and the second supporting structure;

solidifying the sacrificed medium;

introducing a cell supporting medium into the first supporting structure;

solidifying the cell supporting medium, wherein the solidified sacrificed medium protrudes through the at least one entrance and into the cell supporting medium in the first supporting structure so as to form at least one microwell in the cell supporting medium;

liquefying the sacrificed medium, and removing the liquefied sacrificed medium from the second supporting structure; and replacing the removed liquefied sacrificed medium with a cell culture medium, wherein the cell culture medium is in direct contact with an interface of the cell supporting medium of a microwell, wherein the volume of a microwell is determined by a surface of the one or more microwell spacers defining the entrance of the microwell, and by an interface of the cell supporting medium of the microwell, and wherein the one or more microwell spacers are in direct contact with the cell supporting medium prior to one or more cells being delivered to the three-dimensional cell culture platform.

In a ninth aspect, the present invention provides a method of producing a three-dimensional cell culture platform, the method comprising:
- providing a first supporting structure having at least two entrances formed therein, wherein the entrances are located at the periphery of the first supporting structure, wherein at least one entrance opposes and faces another entrance, and wherein the entrances are defined by one or more microwell spacers connected to the first supporting structure;
- providing a second supporting structure in communication with at least one entrance, wherein one or more microwell spacers are located between the first supporting structure and the second supporting structure;
- providing a third supporting structure in communication with at least one other entrance which is opposed to and faces the at least one entrance in communication with the second supporting structure, wherein one or more microwell spacers are located between the first supporting structure and the third supporting structure;
- introducing a sacrificed medium into the second supporting structure and third supporting structure, wherein the first sacrificed medium is a liquid reversible medium, and wherein the sacrificed medium forms liquid-air interfaces in the form of menisci due to surface tension between the sacrificed medium, air, and the first supporting structure, second supporting structure, and third supporting structure;
- solidifying the sacrificed medium;
- introducing a cell supporting medium into the first supporting structure;
- solidifying the cell supporting medium, wherein the solidified sacrificed medium protrudes through each entrance and into the cell supporting medium in the first supporting structure so as to form a microwell in the cell supporting medium;
- liquefying the sacrificed medium, and removing the liquefied sacrificed medium from the second supporting structure and third supporting structure; and
- replacing the removed liquefied sacrificed medium with a cell culture medium, wherein the cell culture medium is in direct contact with an interface of the cell supporting medium of a microwell,
- wherein the volume of a microwell is determined by a surface of the one or more microwell spacers defining the entrance of the microwell, and by an interface of the cell supporting medium of the microwell, and
- wherein the one or more microwell spacers are in direct contact with the cell supporting medium prior to one or more cells being delivered to the three-dimensional cell culture platform.

In a tenth aspect, the present invention provides a method of producing a three-dimensional cell culture platform, the method comprising:
- providing a first supporting structure having at least two entrances formed therein, wherein the at least two entrances lie in the same plane, are spaced apart from each other, and are located at the periphery of the first supporting structure, and wherein the at least two entrances are defined by one or more microwell spacers connected to the first supporting structure;
- providing a second supporting structure in communication with the at least two entrances, wherein one or more microwell spacers are located between the first supporting structure and the second supporting structure;
- introducing a sacrificed medium into the second supporting structure, wherein the sacrificed medium is a liquid reversible medium, and wherein the sacrificed medium forms liquid-air interfaces in the form of menisci due to surface tension between the sacrificed medium, air, and the first supporting structure and second supporting structure;
- solidifying the sacrificed medium;
- introducing a cell supporting medium into the first supporting structure;
- solidifying the cell supporting medium, wherein the solidified sacrificed medium protrudes through each entrance and into the cell supporting medium in the first supporting structure so as to form a microwell in the cell supporting medium;
- liquefying the sacrificed medium, and removing the liquefied sacrificed medium from the second supporting structure; and
- replacing the removed liquefied sacrificed medium with a cell culture medium, wherein the cell culture medium is in direct contact with an interface of the cell supporting medium of a microwell,
- wherein the volume of a microwell is determined by a surface of the one or more microwell spacers defining the entrance of the microwell, and by an interface of the cell supporting medium of the microwell, and
- wherein the one or more microwell spacers are in direct contact with the cell supporting medium prior to one or more cells being delivered to the three-dimensional cell culture platform.

In an eleventh aspect, the present invention provides a three-dimensional cell culture platform produced by the method of any one of the eighth to tenth aspects of the invention.

In a twelfth aspect, the present invention provides a microfluidic device for cell culture, the microfluidic device comprising a three-dimensional cell culture platform of the eleventh aspect of the invention.

In a thirteenth aspect, the present invention provides a three-dimensional cell culture platform comprising:
(i) a cell supporting medium having at least one microwell formed therein; and
(ii) one or more microwell spacers defining an entrance of the or each microwell, the entrance enabling the introduction of a cell culture medium into the or each microwell,
wherein the volume of a microwell is determined by a surface of the one or more microwell spacers defining the entrance of the microwell, and by an interface of the cell supporting medium of the microwell,
wherein the one or more microwell spacers are in direct contact with the cell supporting medium prior to one or more cells being delivered to the three-dimensional cell culture platform, and
wherein the platform supports the formation of a cluster of cells in situ.

In a fourteenth aspect, the present invention provides three-dimensional cell culture platform comprising:
(i) a cell supporting medium having at least two microwells formed therein, wherein at least one microwell opposes and faces another microwell; and
(ii) one or more microwell spacers defining an entrance of each microwell, the entrance enabling the introduction of a cell culture medium into each microwell,
wherein the volume of a microwell is determined by a surface of the one or more microwell spacers defining the entrance of the microwell, and by an interface of the cell supporting medium of the microwell, wherein the one or more microwell spacers are in direct contact with the cell supporting medium prior to one or more cells being delivered to the three-dimensional cell culture platform, and wherein the platform supports the formation of a cluster of cells in situ.

In a fifteenth aspect, the present invention provides three-dimensional cell culture platform comprising:

(i) a cell supporting medium having at least two microwells formed therein, wherein the at least two microwells lie in the same plane and are spaced apart from each other; and (ii) one or more microwell spacers defining an entrance of each microwell, the entrance enabling the introduction of a cell culture medium into each microwell, wherein the volume of a microwell is determined by a surface of the one or more microwell spacers defining the entrance of the microwell, and by an interface of the cell supporting medium of the microwell, wherein the one or more microwell spacers are in direct contact with the cell supporting medium prior to one or more cells being delivered to the three-dimensional cell culture platform, and wherein the platform supports the formation of a cluster of cells in situ.

In a sixteenth aspect, the present invention provides three-dimensional cell culture platform comprising:

(i) a cell supporting medium having at least one microwell formed therein; and (ii) one or more microwell spacers defining an entrance of the or each microwell, the entrance enabling the introduction of a cell culture medium into the or each microwell, wherein the volume of a microwell is determined by a surface of the one or more microwell spacers defining the entrance of the microwell, and by an interface of the cell supporting medium of the microwell, wherein the one or more microwell spacers are in direct contact with the cell supporting medium prior to one or more cells being delivered to the three-dimensional cell culture platform, and wherein the interface of the cell supporting medium of the or each microwell includes a cluster of cells formed in situ.

In a seventeenth aspect, the present invention provides three-dimensional cell culture platform comprising:

(i) a cell supporting medium having at least two microwells formed therein, wherein at least one microwell opposes and faces another microwell; and (ii) one or more microwell spacers defining an entrance of each microwell, the entrance enabling the introduction of a cell culture medium into each microwell, wherein the volume of a microwell is determined by a surface of the one or more microwell spacers defining the entrance of the microwell, and by an interface of the cell supporting medium of the microwell, wherein the one or more microwell spacers are in direct contact with the cell supporting medium prior to one or more cells being delivered to the three-dimensional cell culture platform, and wherein the interface of the cell supporting medium of each microwell includes a cluster of cells formed in situ.

In an eighteenth aspect, the present invention provides three-dimensional cell culture platform comprising:

(i) a cell supporting medium having at least two microwells formed therein, wherein the at least two microwells lie in the same plane and are spaced apart from each other; and (ii) one or more microwell spacers defining an entrance of each microwell, the entrance enabling the introduction of a cell culture medium into each microwell, wherein the volume of a microwell is determined by a surface of the one or more microwell spacers defining the entrance of the microwell, and by an interface of the cell supporting medium of the microwell, wherein the one or more microwell spacers are in direct contact with the cell supporting medium prior to one or more cells being delivered to the three-dimensional cell culture platform, and wherein the interface of the cell supporting medium of each microwell includes a cluster of cells formed in situ.

In a nineteenth aspect, the present invention provides a microfluidic device for cell culture, the microfluidic device comprising a three-dimensional cell culture platform of any one of the thirteenth to eighteenth aspects of the invention.

BRIEF DESCRIPTION OF THE FIGURES

For a further understanding of the aspects and advantages of the present invention, reference should be made to the following detailed description, taken in conjunction with the accompanying figures which illustrate certain embodiments of the present invention.

FIG. 1A: A single microwell formed in the cell supporting medium of the culture platform. FIG. 1B: A three-dimensional representation of the embodiment shown in FIG. 1A. FIG. 1C: Two microwells formed in the cell supporting medium of the culture platform, wherein the microwells oppose and face each other. FIG. 1D: An embodiment of a cell culture platform comprising a series of microwells which oppose and face each other. FIG. 1E: An embodiment of a cell culture platform comprising a series of microwells which lie in the same plane. FIG. 1F: A three-dimensional representation of an embodiment of a cell culture platform of the present invention comprising a microwell in the form of a microchannel.

FIG. 3A: The device and integrated platform structure before cell seeding, with sacrificed gel (S gel) present in channels C1 and C3 and ECM gel present in channels C2 and C4. FIG. 3B(i): A magnified view of the platform with the ECM gel in C2 and microwells formed therein. The interface of the cell supporting medium of the microwells is in direct contact with a cell culture medium (Medium) that has replaced the S gel in channels C1 and C3. FIGS. 3B(ii) and 3B(iii): Images of the depiction in FIG. 3B(i) with tumour cells (MCF-7—top microwells) and stroma cells (HUVECs and NHLFs—bottom microwells) colonizing each microwell, and as stained in FIG. 3B(iii)). FIG. 3C: Depicts the steps involved in the cell culture platform production—Step (i) sacrificed (S) gels introduced in C1 and C3; Step (ii) ECM gel introduced in C2 and C4; and Step (iii) S gel is replaced by culture medium. FIG. 3D: A schematic showing microwell volume can be dictated by ECM type (left panel), the size of the opening between PDMS microwell spacers (pillars) (Middle panel), and concentration of the ECM (Right panel). FIG. 3E: Phase contrast images of microwells formed in different ECMs and having different sized openings. The left and middle panels show the same opening size (175 µm) in different ECM gels, and the right panel shows the same ECM (fibrin) with different sized openings (175 µm, 253 µm and 293 µm). FIG. 3F:—quantitative analysis of ECM and microwell parameters.

FIG. 4B: Phase contrast images of cells after culturing for 4 days. FIG. 4C: An image of cell growth from a separated culture showing HUVECs sprouting with a small fraction forming hollow tubes. FIG. 4D: A magnified view of the white box in FIG. 4C. FIG. 4E: An image of cell growth from a mixed culture showing larger vessel formation and cells reorganized into tissue-like structures formed with the support of NHLFs. FIG. 4F: A magnified view the white box in FIG. 4E showing the vascular-like structures. FIG. 4G: Parameters of vascular formation in each microwell (i), such as vascular sprouting number (ii), vascular width (iii) and vascular length (v). Measurement started from the edge of each microwell.

FIGS. 4A-5C: Phase contrast of two images merged into one. FIG. 5A: MCF-7 cells (non-invasive) derived from solid tumor ex vivo; FIG. 5B: A mixture of MCF-7 and MDA-MB-231 (invasive—metastatic tumor) cells; and FIG. 5C: MDA-MB-231 cells. Measurement of migration distances shown in FIG. 5D was achieved using a best-fit arc curve to cover most of the cells then measuring the arc radius at five angle positions in each microwell. FIG. 5E: A graph representing a quantitative assay of migration distance (day 6 distance minus day 1 distance) in each microwell. FIGS. 5F-5H: Confocal microscope images of different cancer cells.

FIG. 6A: A portion of the culture platform showing the location of cells in each of channels C1 and C3. FIG. 6B: Brightfield phase contrast and FIG. 6C: confocal microscope images of cell growth. FIG. 6D: A graph showing quantitative tumor angiogenesis analysis. FIGS. 6E-6F: Immunostaining of solid tumor (E—left panel) and metastatic models (E—right panel). Cytokeratin 5 (CK5) was concentrated in specific cells in 3D cultures. High expression of cytokeratin 8 (CK8) was seen at the interface of the solid tumor (MCF-7) and ECM gel. On the contrary, CK5 was randomly expressed in the metastatic tumor model.

FIG. 7A: Characterisation of cubosomes using small-angle X-ray scattering (SAXS) and cryo-TEM showing the Pn3m crystallographic spacing of the cubic phase as indicated by the Miller indices at $\sqrt{2}$: $\sqrt{3}$: $\sqrt{4}$: $\sqrt{6}$ in the cell culture media. FIGS. 7B, 7E-7G: Solid tumor model: MCF-7 remained in the microwells with limited tumor angiogenesis and high uptake by cubosomes. FIGS. 7C, 7H-7J: Metastatic tumor model: MDA-MB-231 cells invaded and cooperated with NHLF and induced tumor angiogenesis. FIGS. 7B and 7C: Phase contrast and fluorescence images of solid and metastatic tumor models showing accumulated cubosomes in the solid tumor model. FIG. 7D: Graphs showing quantitative cubosome accumulation in each model.

FIG. 8A: An illustration of the microfluidic device used (left panel), magnification of the culture platform used in the device (middle panel) and cross-section of a portion of the platform (right panel) showing formation of the mini-skin equivalent unit comprising skin epithelium, connective tissue and a blood stream. FIG. 8B: Images of cell growth and reorganisation in the ECM. FIG. 8C: Images showing that ECM concentrations (2.5 mg mL$^{-1}$ and 4 mg mL$^{-1}$ of fibrin matrix) also affect epithelium formation and stroma cells. FIG. 8D: Graphs showing cell proliferation (as measured by fluorescence intensity) is affected by the cell type and the composition of cells but not affected by ECM concentration (left panel corresponds to B; right panel corresponds to C). FIG. 8E: Images of a unit of mini-skin equivalent and staining of keratinocyte and fibroblast markers.

FIG. 9A: Image (left panel) and cell staining (right panel) of skin cancer units in the model. MET-1 cells were cultured in the top microwell and mixed NHLF and HUVEC cells cultured in the bottom microwell. The cells were stained for proliferating cell nucleic acid (PCNA), CD31, actin, and the nucleus. FIG. 9B: Cell staining of skin cancer units in the model.

FIG. 10A: U87 cells without chemotherapeutic drug treatment (as a control group) were viable and grew well in the cell culture platform. Viable cells were labelled with blue fluorescent dyes via Hoechst stain. FIG. 10B: U87 cells treated with 10 µM Abemaciclib showed a sharp increase in dead cells which are labelled with green fluorescent by Image-iT® Dead Green staining. FIG. 10C: U87 cells treated with 40 µM Palbociclib led to almost all cancer cells being killed. Cells were labelled with green fluorescent.

FIG. 11A: In fibrin ECM gel, human glioblastoma cells degraded the fibrin whether CAR T-cells were present or not. FIG. 11B: Human glioblastoma cells showed chemotaxis to CAR T-cells and CAR T-cells are migrating through the fibrin. FIG. 11C: In Matrigel, no obvious degradation of Matrigel by human glioblastoma cells was observed. FIG. 11D: CAR T-cells are attracted by, and migrate through Matrigel toward, human glioblastoma cells.

FIG. 13A: The iPSC cells differentiated into a brain organoid in the microwells. FIG. 13B: On confocal microscopy imaging, the brain organoids formed in the microwells demonstrated brain epithelial cells in situ where the cortex was detected by C9-PAX6 and the tight junction protein was identified by ZO1. Neuron cells were detected with Tubulin β3.

FIGS. 14A1-14C3—images showing a comparison of a human breast cancer cell line, a mouse xenograft dissociated, and a mouse mammary tumour derived cell culture, using the three-dimensional cell culture platform of the present invention. FIGS. 14A1-14A3: The monoculture of MDA-MB-231 cells the culture platform showed significantly degraded fibrin both on day 1 and day 5. Continued growth and progressive migration of MDA-MB-231 cells was also seen. The green fluorescence in the cell culture platform indicated the monoculture of MDA-MB-231 cell did not have a tissue-like structure. FIGS. 14B1-14B3: The dissociated cells of a xenograft tumour from MDA-MB-231 showed the ability to degrade fibrin and increasing amount of cancer cells from day 1 to day 8. Different cell types were scattered without a tissue-like structure, where cancer cells, endothelial cells, and all cells were labelled with green fluorescence, red fluorescence (CD31), and blue fluorescence (nucleus), respectively. FIGS. 14C1-14C3: The mouse mammary tumour derived cell grew in the cell culture platform without obvious fibrin degradation on both day 1 and day 5. The epithelial cells and mesenchymal cells were labelled with E-cadherin in green fluorescence and vimentin in red fluorescence, respectively. It presented epithelial cells forming tubular structure in situ which mimics mammary gland embedded in mesenchymal cells.

DETAILED DESCRIPTION OF THE INVENTION

Figure 1A:
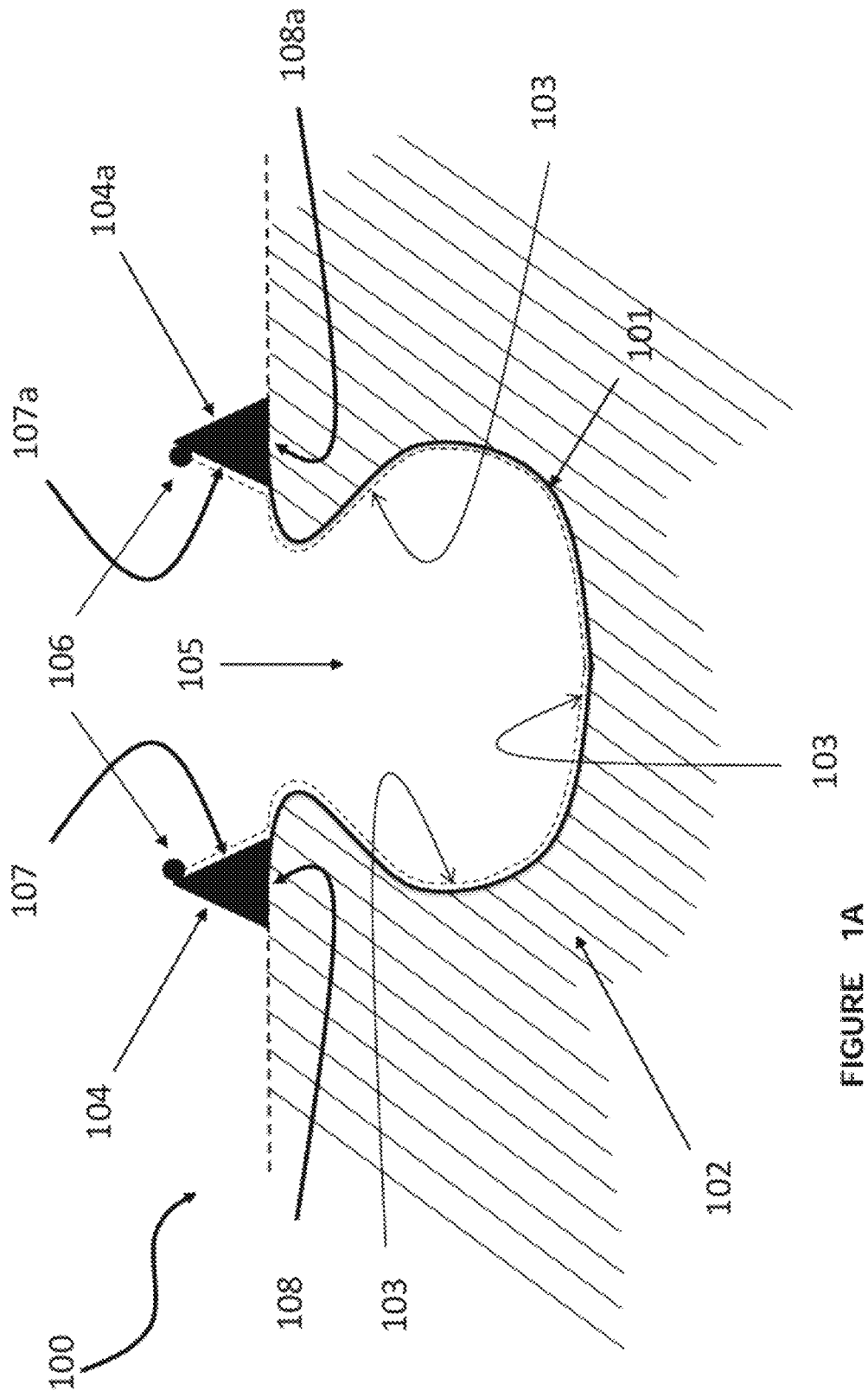
FIGS. 1A-1F—depictions of a three-dimensional cell culture platform according to various embodiments of the present invention.

As set out above, the present invention is predicated, in part, on the development of an in vitro three-dimensional cell culture platform which provides a model of in vivo cell and organ environments.

Accordingly, certain disclosed embodiments provide compositions, products, and methods, that have one or more advantages. For example, some of the advantages of some embodiments disclosed herein include one or more of the following: provision of in vitro three-dimensional cell culture platforms which model cell and tissue microenvironments in vivo; three-dimensional cell culture platforms which can be used to create tailored microenvironments for tissue and organ growth; three-dimensional cell culture platforms which enable interrogation of candidate therapeutic agents; three-dimensional cell culture platforms which support the formation and growth of spheroids in situ; three-dimensional cell culture platforms which permit the precise control of interactions that lead to the formation of higher-order tissue and organ structures; novel microfluidic devices comprising the cell culture platforms; methods for producing the three-dimensional cell culture platforms; or the provision of a commercial alternative to existing platforms, microfluidic devices and methods. Other advantages of some embodiments of the present disclosure are provided herein.

In a first aspect, the present invention provides a three-dimensional cell culture platform comprising:

(i) a cell supporting medium having at least one microwell formed therein; and
(ii) one or more microwell spacers defining an entrance of the or each microwell, the entrance enabling the introduction of a cell culture medium into the or each microwell, wherein the volume of a microwell is determined by a surface of the one or more microwell spacers defining the entrance of the microwell, and by an interface of the cell supporting medium of the microwell, and wherein the one or more microwell spacers are in direct contact with the cell supporting medium prior to one or more cells being delivered to the three-dimensional cell culture platform.

Isolated cells grown in culture do not reflect the nature of the organ or organism from which they were derived due to their isolation and lack of contact with other cells. However, the three-dimensional cell culture platform of the present invention allows several aspects of structure and organisation of the original tissue or organ to be preserved. Accordingly, as used herein, the term "three-dimensional cell culture platform" refers to a culture platform that allows for the interaction between different cell types towards the in vitro growth of complex biological tissues, including organoids, in a way that replicates part of their normal physiology and function.

The three-dimensional cell culture platforms provided herein comprise a cell supporting medium. As its name suggests, the cell supporting medium is a medium which supports the maintenance, viability, growth, and replication of a cell in the culture platform. In this regard, the cell supporting medium is typically a three-dimensional scaffold which mimics the extracellular matrix (ECM) component of cellular environments found in vivo.

The ECM surrounding a cell performs several critical functions. It provides a complex, nanoscale architecture of structural proteins such as collagen, laminin, and fibronectin to create the mechanical properties inherent in the cellular microenvironment. Cells sense these mechanics through their cell surface integrins and bind to specific adhesion motifs present on the ECM proteins. Cell adhesion in a 3D system leads to and influences a series of subsequent cellular responses that are more physiologically relevant compared to cells grown on 2D surfaces. Furthermore, the ECM is vital for sequestering soluble biomolecules and growth factors and releasing these signaling molecules with spatial-temporal control to guide processes such as cell migration, matrix degradation and deposition. ECM remodeling is imperative for achieving tissue homeostasis and is particularly pronounced during development and diseases. Therefore, the cell supporting medium should ideally exhibit the mechanical and biochemical properties of an ECM, not only at the initial stage of cell seeding, but also, in a dynamic and tunable manner as the cells grow and develop.

The three-dimensional scaffold nature of the cell supporting medium allows fluid flow and cell migration therethrough. In some embodiments, the three-dimensional scaffold is a gel matrix which may contain a gel or gel-like material. In one embodiment, the gel matrix is a hydrogel. Hydrogels are comprised of networks of cross-linked polymer chains or complex protein molecules of natural or synthetic origin. Due to their significant water content, hydrogels possess biophysical characteristics very similar to natural tissue, and serve as highly effective matrices for 3D cell culture.

Hydrogels can be used as stand-alone 3D matrices or combined with other technologies, such as bioinks (which can also be used as the hydrogel), solid scaffolds, permeable supports, cellular microarrays, and microfluidics devices (as described further below). The morphology, growth and functionality of cells within a hydrogel matrix depends on the presentation of biophysical and biochemical cues, as well as physical properties such as permeability and matrix stiffness.

In some embodiments, the hydrogel may be a natural hydrogel or a synthetic hydrogel. In some embodiments, the hydrogel is an irreversible or reversible liquid-gel material, a thermosensitive hydrogel, a photosensitive hydrogel, an ionic polymerisation hydrogel, an enzymatic, covalent, or noncovalent polymerisable hydrogel, or a cross-linked hydrogel. Such hydrogels are known in the art with further examples summarized in the publications of Panwar A et al. 2016, *Molecules*, 21: 685; and Aljohani W et al., 2018, *International Journal of Biological Macromolecules*, 107(Pt A): 261-275.

Naturally derived hydrogels for cell culture may be formed of proteins and ECM components (Corning Inc., Sigma Aldrich, Trevigen, Inc., NovaMatrix and Xylyx Bio), such as gelatin, collagen, laminin, fibrin (the combination of fibrinogen and thrombin—thrombin is used to rapidly polymerize fibrinogen to form fibrin—see Duong H et al., 2009, *Tissue Engineering Part A*, 15(7): 1865-1876), hyaluronic acid, chitosan, basement membrane extract (Cultrex®), alginate, Matrigel®, and silk. Derived from natural sources, these gels are inherently biocompatible and bioactive. They also promote many cellular functions due to the presence of various endogenous factors, which can be advantageous for supporting viability, proliferation, function, and development of many cell types.

Matrigel is an ECM-based natural hydrogel that has been used extensively for 3D cell culture in vitro and in vivo. This reconstituted basement membrane is extracted from Engelbreth-Holm-Swarm (EHS) mouse tumors and contains all of the common ECM molecules found in basement membrane (i.e., laminin, collagen IV, heparin sulfate proteoglycan, and nidogen/entactin). The ECM components of Matrigel matrix activate various signaling pathways in cancer cells that control angiogenesis, cancer cell motility, and drug sensitivity.

Collagen Type I is a common ECM molecule found in stromal compartments and bone. It can be isolated from various biological sources including bovine skin, rat tail tendon, and human placenta. Collagen I can also be electrospun into membranes and can support 3D cell growth and differentiation.

Other naturally derived hydrogels encompassed by the present invention include cell-derived ECM hydrogels (TissueSpec®) and decellularised matrix derived from tissue. These hydrogels are isolated from specific tissues or organs which preserve the biomolecules from original tissues (see Pati F et al., 2014, *Nature Communications*, 5: 3935; Choudhury D et al., 2018, *Trends Biotechnol.*, 36(8): 787-805). These hydrogels are the optimized cell culture ECM gels for the specific organ development in 3D culture.

Other natural, but non-hydrogel, three-dimensional scaffolds that may be used for forming the cell supporting medium include matrices developed in organisms that are animal-free or derived from recombinant nucleic acid technology. Hyaluronic acid (hyaluronan or HA) is one such biologically derived matrix (Gurski L A et al., 2009, *Biomaterials*, 30(30): 6076-6085). Most commercial grade HA is of bacterial origin and characterized by high purity and homogeneous quality. These gels may be modified by the addition of ECM components for improving cell attachment and growth properties. Gelatin methacryloyl (GelMA) hydrogels may also be used and comprise gelatin modified by replacing amino groups to methacryloyl groups to become photo cross-linkable. GelMA has excellent thermostability and is similar to gelatin in that its solid-liquid transition is also influenced by temperature (Sun M et al., 2018, *Polymers*, 10(11): 1290). The photo-crosslinked form is crosslinked by adding initiator under UV light.

As indicated above, the hydrogel may be a synthetic hydrogel. Synthetic hydrogels may be chosen when naturally derived biological matrices are unsuitable. Synthetic hydrogels are comprised of purely non-natural molecules (see DeVolder R and Kong H J, 2012, *Wiley Interdiscip. Rev. Syst. Biol. Med.*, 4(4): 351-365) such as poly(ethylene glycol) (PEG) (Sawhney A S et al., 1993, *Macromolecules*, 26(4): 581-587), poly(vinyl alcohol)(Martens P and Anseth K S, 2000, *Polymer*, 41(21): 7715-7722), poly(2-hydroxy ethyl methacrylate) (Chirila T V et al., 1993, *Biomaterials*, 14(1): 26-38), and Poly(N-isopropylacrylamide) (PNIPAAm) and Pluronic F-127 thermosensitive synthetic hydrogels. They are biologically inert but provide structural support for various cell types. Pluronic F-127 and PNIPAAm are synthetic hydrogels with an inverse gelling temperature such that they are solidified at a high temperature and melted at a lower temperature. For example, the gelling temperature of PNIPAAm is about 32-35° C., and the melting temperature is around 30-32° C. (Lanzalaco S and Armelin E, 2017, *Gels* 3, 36; doi:10.3390/gels3040036; Matzelle T R et al., 2003, *Macromolecules*, 36, 2926-2931). Similarly, 20% Pluronic-127 has a gelling temperature above 28° C. and a melting temperature below 28° C. (Khateb K A et al., 2016, *International Journal of Pharmaceutics*, 502: 70-79).

PEG hydrogels have been shown to maintain the viability of encapsulated cells while allowing for ECM deposition as the hydrogel degrades, thereby demonstrating that synthetic gels can function as an appropriate culture platform in the absence of integrin-binding ligands. Such inert gels are highly reproducible, allow for facile tuning of the mechanical properties, and are simple to process and manufacture.

It is also possible to modify inert synthetic hydrogels with appropriate biological components. Examples of synthetic hydrogels that are tunable include PuraMatrix™ (Corning), VitroGel VitroGel® 3D, VitroGel® 3D-RGD, and VitroGel® 3D-RGD-PLUS (TheWell Bioscience, North Brunswick, N.J., USA), peptide hydrogel, a self-assembling, synthetic oligopeptide that exhibits nanometer scale fibers. Nanometer-sized fibres and pores are essential to ensure a true 3D environment for the cell.

The cell supporting medium allows cells to aggregate at the interface of the cell supporting medium of the microwell so as to form a cluster of cells. The cell supporting medium may also allow cells, or a cluster of cells so formed, to distribute through the medium as the cells adopt their native in vivo function. A "cluster of cells" as used herein, may take a number of forms. Examples of the form of the cluster of cells can be found in Kenny P et al., 2007, *Molecular Oncology*, 1(1): 84-96. In some embodiments, the cluster of cells may be in the form of a spheroid, a microtissue, a compact aggregate, a loose aggregate, or as a suspension of cells. Other forms of cell aggregates are contemplated. In some embodiments, the cluster of cells is in the form of a tissue-like structure or organ-like structure.

Adherent cells have an inherent tendency to aggregate to form compact spheres termed "Spheroids". Spheroids naturally mimic various aspects of solid tissues and are equipped with inherent gradients for efficient diffusion of oxygen and nutrients as well as the removal of metabolic waste. Spheroids can be generated from a wide range of cell types and common examples include embryoid bodies, mammospheres, tumour spheroids, hepatospheres and neurospheres. Accordingly, in some embodiments the cell supporting medium supports formation and growth of a spheroid.

In some embodiments of the present invention, each microwell is optically transparent to the extent that it enables microscopic observation of cell growth and interaction in real-time. For example, fluorescent and/or immunologically-based techniques may be employed to detect biological markers of cell growth, cell skeleton, tissue formation, cell-type, and the like. For example, live cells can be transfected or transduced with recombinant proteins containing fluorescent protein domains, such as green fluorescent protein (GFP). Immunofluorescence staining and immunohistochemistry with the specific antibodies in combination with different fluorescent dyes (to label specific biomolecule targets within a cell) can also be used after fixing dead cells/tissue-like structures. Non-antibody methods of fluorescent staining can also be used such as DAPI to label DNA, allowing visualization of the distribution of the target molecule through the sample.

Figure 1B:
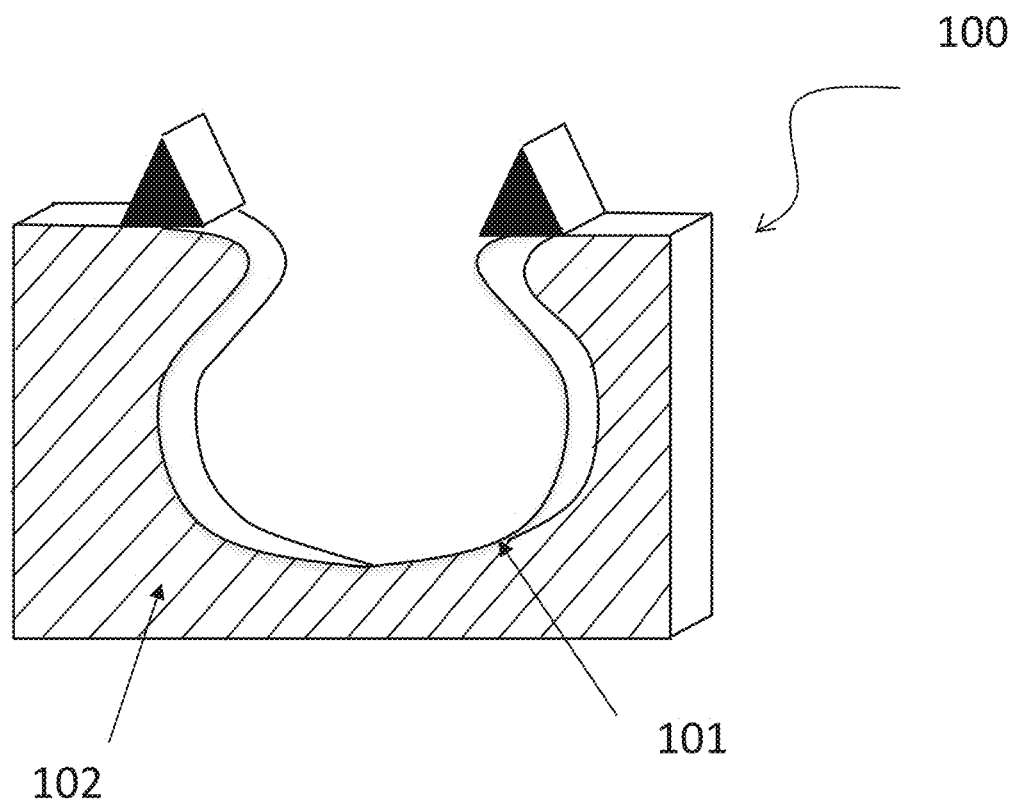

Importantly, the cell supporting medium of the cell culture platform provides an interface comprising one or more regions to which cells can be seeded and nourished as they grow and aggregate. Each region takes the form of a microwell formed in the cell supporting medium. This embodiment 100 is illustrated in a cross-sectional view in FIG. 1A and a three-dimensional view in FIG. 1B. FIGS. 1A and 1B show a single microwell 101 formed in the cell supporting medium 102. In this embodiment, the microwell has a flat, bulbous, rounded, or curved shaped base. The microwell structure provides an interface 103 defined by the cell supporting medium of the microwell, wherein the interface acts as a natural (biological) surface, from which cells can adhere to, aggregate on, and grow from, rather than being formed of traditional microwell materials such as plastics and polymers.

The cell supporting medium can also be engineered such that it contains microwells which oppose and face each other. Accordingly, in some embodiments of the three-dimensional cell culture platform, the cell supporting medium has at least two microwells formed therein, wherein at least one microwell opposes and faces another microwell.

Figure 1C:
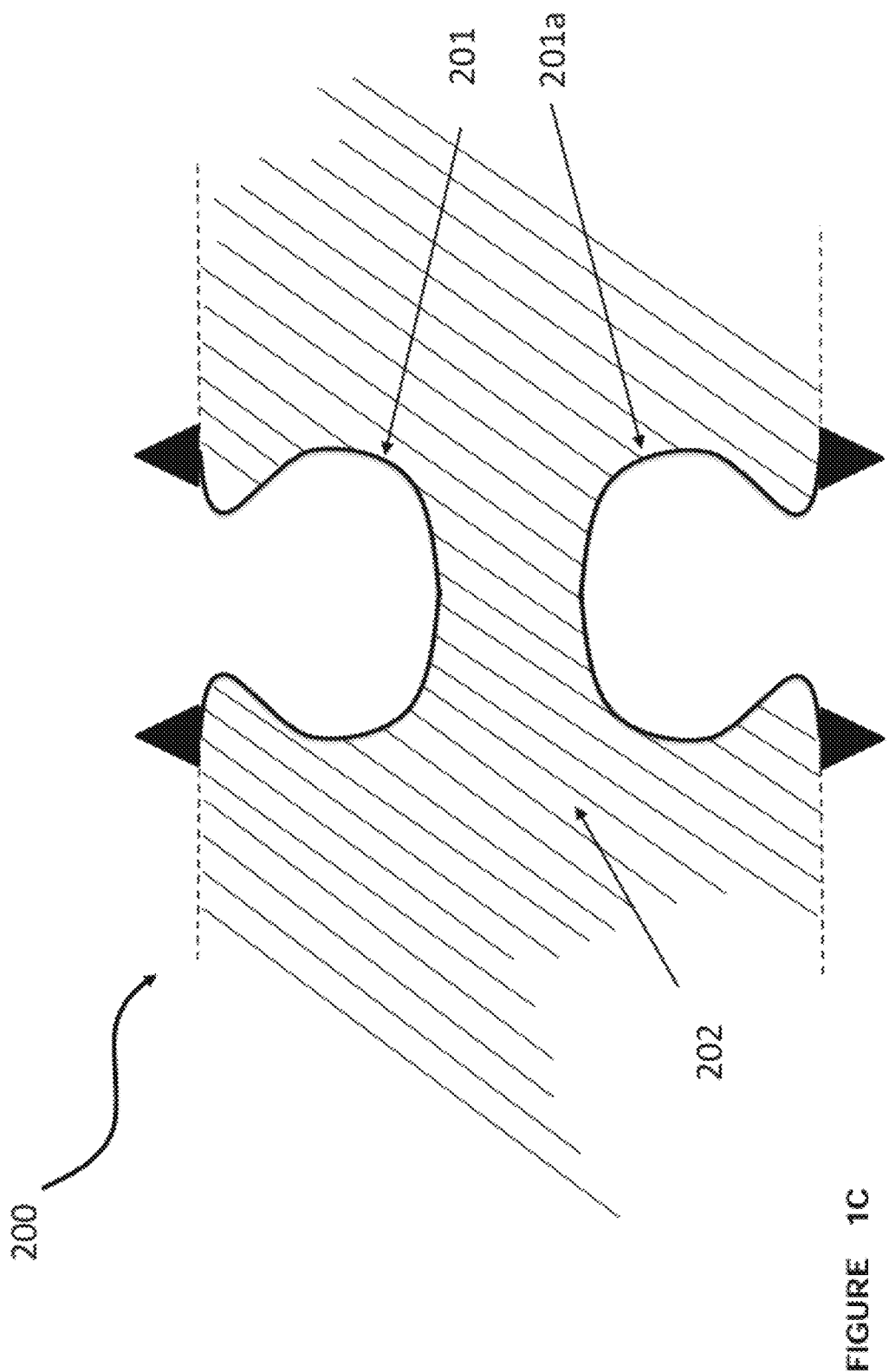

This embodiment 200 is illustrated in FIG. 1C which shows two microwells 201,201a formed in the cell supporting medium 202 from opposite sides of the cell supporting medium 202. As shown, one microwell 201 opposes and faces another microwell 201a. In this manner, different cell types can be accommodated in each microwell allowing independent growth and ultimately interaction towards development of an in vitro tissue, spheroid, or organoid structure.

Figure 1D:
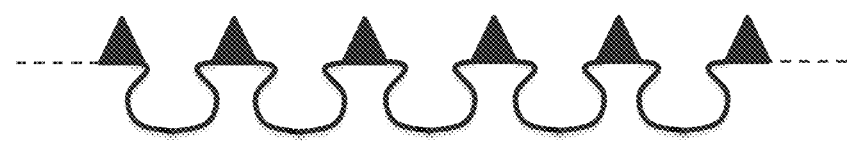
Figure 1D:
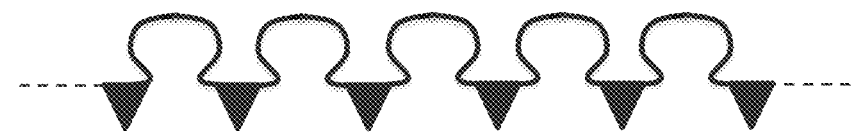
Figure 1E:
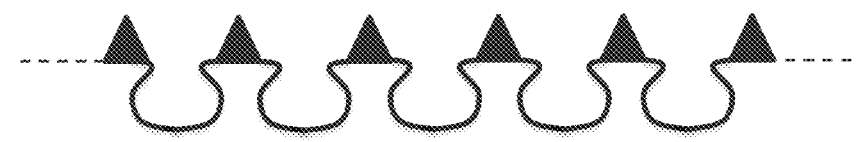

Other configurations of the microwells in the cell supporting medium are contemplated, particularly for large-scale applications. In this regard, FIGS. 1D and 1E show the presence of multiple microwells formed in the cell supporting medium, where multiple microwells oppose and face each other (FIG. 1D) or are generally aligned in the same plane (FIG. 1E). In this regard, in a further embodiment of the three-dimensional cell culture platform, the cell supporting medium has at least two microwells formed therein, wherein the at least two microwells lie in the same plane and are spaced apart from each other.

Although the embodiments set forth in FIGS. 1A to 1E define particular configurations, other configurations of the microwells in the cell supporting medium are clearly encompassed by the present invention. So too are the number of microwells present in the three-dimensional cell culture platform.

As shown in FIGS. 1A to 1E, each microwell has a microwell spacer positioned immediately adjacent to each side of the microwell so as to define an entrance or opening of each microwell. These microwell spacers are also referred to herein as pillars. For example, in FIG. 1A one microwell spacer 104 is positioned at one side of entrance 105 of the microwell 101, while a second microwell spacer 104a is positioned at the other side of entrance 105.

Essentially, the microwell spacers 104,104a define an entrance 105 of each microwell 101 formed in the cell supporting medium 102. Each microwell spacer shown in FIGS. 1A to 1E is depicted as a triangular shape. However, this is not essential and indeed each microwell spacer may be of any shape provided that they collectively define an entrance or opening for each microwell formed in the cell supporting medium. The microwell spacers provide a pre-defined spatial confinement for cell adhesion and stacking on the cell supporting medium of each microwell.

Figure 1F:
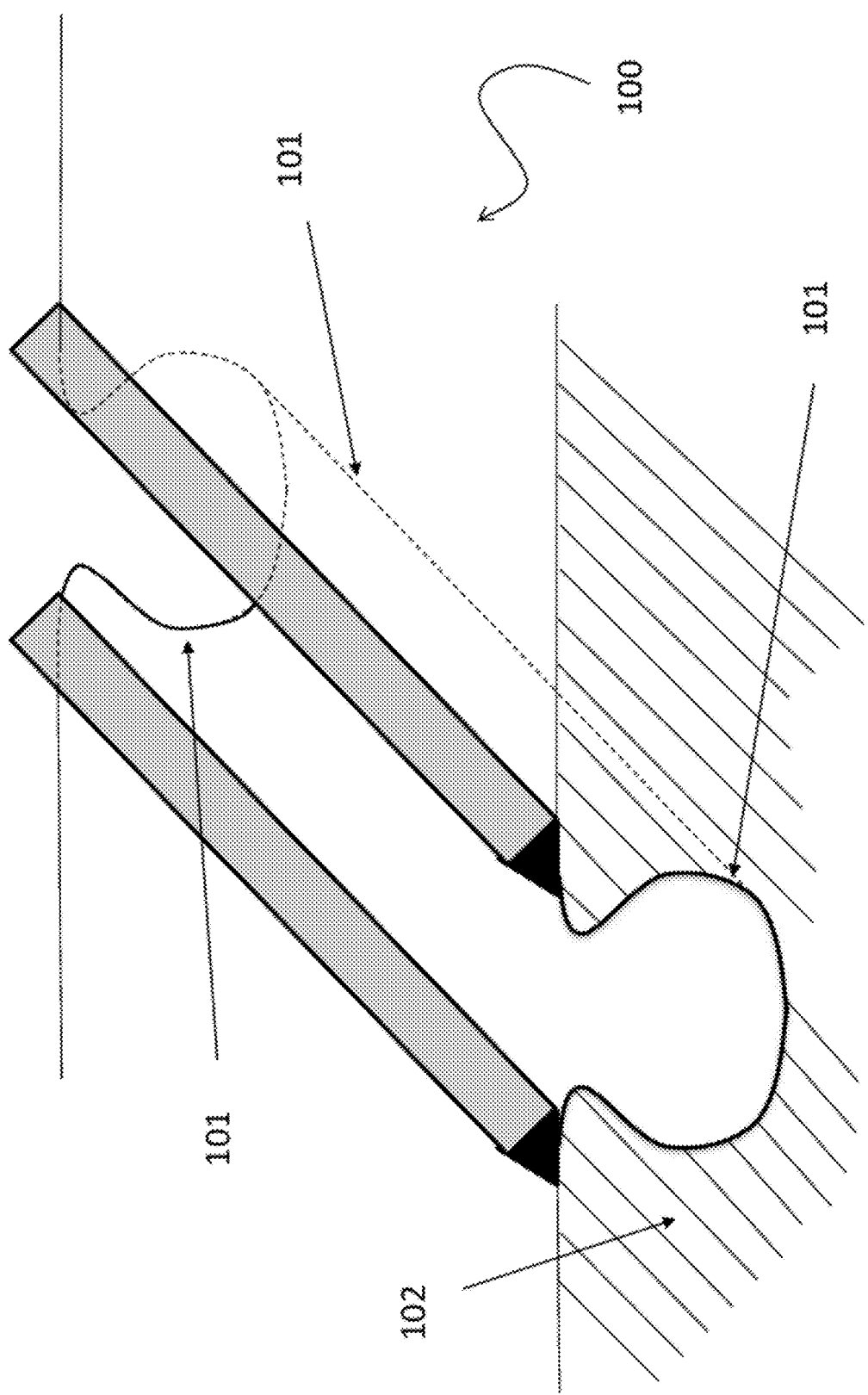

In some embodiments, the microwell formed in the cell supporting medium may be in the form of a channel, herein referred to as a microchannel. Like a microwell, the microchannel may also have a flat, bulbous, rounded, or curved base. A microchannel provides a larger surface area to allow development and growth of larger or specific tissue structures and organs. This particular embodiment 100 is depicted in FIG. 1F, which shows a microchannel 101 formed in the cell supporting medium 102. The nature and geometry of the microwell (or microchannel) is not limited by the present disclosure.

The volume (and shape) of each microwell will be dictated by a number of factors, including the shape of the microwell spacers, the size of the microwell spacers, the distance between each microwell spacer defining the entrance of the microwell, and the nature of the cell supporting medium, such as the composition of the medium and concentration of components of the medium.

Despite these variables, the volume of each microwell will be dictated by a surface of the one or more microwell spacers defining the entrance of the microwell, and by an interface of the cell supporting medium of the microwell. This can be depicted in FIG. 1A as an example. In this embodiment 100, the volume of the microwell 101 is determined by the dashed line extending between the two circles 106. This dashed line includes the interface 103 defined by the cell supporting medium of the microwell, a surface 107 of microwell spacer 104, and surface 107a of microwell spacer 104a. This is the space that can be occupied by a cell culture medium.

Each microwell spacer of the three-dimensional cell culture platform encompassed by the present invention is not only capable of directly contacting the cell culture medium but is also in direct contact with the cell supporting medium prior to one or more cells being delivered to the cell culture platform. This is demonstrated in the embodiment shown in FIG. 1A, where a surface 108 of microwell spacer 104 and a surface 108a of microwell spacer 104a are in direct contact with the cell supporting medium 102.

The delivery of cells to the cell culture platform can be achieved any number of ways as would be understood by a person skilled in the art. For example, cells may be delivered to the microwell of the cell culture platform, via the entrance, using a pipette comprising cells in suspension. The cells may also be delivered by introducing a cell culture medium comprising the cells via the entrance of the microwell. Modes of delivery of cells are not limited by the present invention.

The microwell spacers may be made of any rigid material such a transparent, semi-transparent, or opaque polymeric material. Examples include a thermoplastic polymer such as polydimethylsiloxane (PDMS), polyimide, polycarbonate, polycarbonate, poly(methyl methacrylate), cyclic olefin copolymer, polyethylene, polyethylene terephthalate, polyurethane, polycaproleacton, polyactic acid, polyglycolic acid, or poly(lactic-co-glycolic acid), Acrylic, OrdyISY330, polyaryletherketone, (PEKK)fluorinated ethylene propylene (FEP), fluoropolymers PTFE (polytetrafluoroethylene) and PFA (perfluoroalkoxy polymer resin), Flexdym™ and polystyrene. The publication of Halldorsson S et al., 2015 (*Biosens. Bioelectron.*, 63: 218-231) provides a list of relevant materials and their sources. Other materials are contemplated such as silica glass and quartz. That is, the material from which the protrusion supports are made is not limited as long as the material is biocompatible.

As indicated above, the entrance defined by the one or more microwell spacers enables the introduction of a cell culture medium into each microwell. As shown in FIG. 1A, once a cell culture medium enters the entrance 105, and occupies the microwell 101, the cell supporting medium 102 of the microwell 101 will be in direct contact, or in communication, with the cell culture medium. Therefore, the viability and/or growth of a cell or cells present on the interface 103 defined by the cell supporting medium of the microwell can also be supported by a cell culture medium present in the microwell.

The cell culture medium may be any medium which is capable of maintaining the viability and/or growth of a cell, or is capable of transporting or delivering the cell to the cell supporting medium without affecting the cells viability. Exemplary media include those available from commercial sources such as ThermoFisher Scientific (Gibco Cell Culture Media), HyClone™ Cell Culture Media, and Sigma Aldrich (such as DMEM—Dulbecco's Modified Eagle Medium, DMEM/F12, Dulbecco's Modified Eagle Medium: Nutrient Mixture F-12, Ham's F-10 Nutrient Mixture, Ham's F-12 Nutrient Mixture, Media 199, MEM, Minimum Essential Media RPMI Medium 1640, Advanced Media, Opti-MEM I Reduced Serum Media IMDM, Iscove's Modified Dulbecco's Medium, Gibco Cell Culture Bags, FluoroBrite DMEM Media). Suitable cell culture media is also available from STEMCELL™ Technologies (mTeSR™ Plus, mTeSR™, mTeSR™1, MethoCult™ H4034 Optimum, BrainPhys™ Neuronal Medium, IntestiCult™ Organoid Growth Medium (Mouse), AggreWell™ EB Formation Medium, Agar Leukocyte Conditioned Medium), LONZA (media OGM™, Osteoblast Growth Medium SingleQuots™ Supplements and Growth Factors, EGM™-2 MV, Microvascular Endothelial Cell Growth Medium-2 BulletKit™, EGM™ Endothelial Cell Growth Medium BulletKit™, EGM™-MV Microvascular Endothelial Cell Growth Medium BulletKit™, MEGM™ Mammary Epithelial Cell Growth Medium BulletKit™, MBM™-4 Melanocyte Growth Basal Medium-4, LGM-3™ Lymphocyte Growth Medium-3, FGM™ Fibroblast Growth Medium BulletKit™, FGM™-2 Fibroblast Growth Medium-2 BulletKit™, PGM-2™ Preadipocyte Growth Medium-2 BulletKit™, KGM™ Gold Keratinocyte Growth Medium BulletKit™, tEGM™ Retinal Pigment Epithelial Cell Growth Medium BulletKit™, B-ALI™ Bronchial Air-Liquid Interface Medium BulletKit™, SAGM™ Small Airway Epithelial Cell Growth Medium BulletKit™, KGM™-CD Keratinocyte Growth Medium BulletKit™-Chemically Defined, SCGM™ Stromal Cell Growth Medium BulletKit™, KGM™-2 Keratinocyte Growth Medium-2 BulletKit™, Calcium Free, AGM™, Astrocyte Growth Medium BulletKit™, MsGM™ Mesangial Cell Growth Medium BulletKit™, ABM™ Astrocyte Basal Medium, SkGM™-2 Skeletal Muscle Cell Growth Medium-2 BulletKit™, BEGM™ Bronchial Epithelial Cell Growth Medium BulletKit™ PrEGM™ Prostate Epithelial Cell Growth Medium BulletKit™, SmGM™-2 Smooth Muscle Cell Growth Medium-2 BulletKit™ etc) and PromoCell (Endothelial Cell Growth Medium, Fibroblast Growth Medium, Adipocyte Nutrition Medium, Airway Epithelial Cell Growth Medium, Chondrocyte Growth Medium, Keratinocyte Growth Medium, Mammary Epithelial Cell Growth Medium, Melanocyte Growth Medium, Osteoblast Growth Medium, Pericyte Growth Medium, Skeletal Muscle Cell Growth Medium, Smooth Muscle Cell Growth Medium, Small Airway Epithelial Cell Growth Medium, etc).

A feature of the three-dimensional cell culture platform of the present invention is the ability to form a cluster of cells de novo within the system. An issue with existing 3D culture platforms is the need to form a cluster of cells (such as a spheroid) in a separate culture and then transfer the cell cluster to the culture platform for further experimentation. This is not a limitation of the culture platform of the present invention. Accordingly, in some embodiments, the three-dimensional cell culture platform of the present invention supports the formation of a cluster of cells in situ.

For example in some embodiments, the cell culture medium will enable the delivery of a cell or cells (in suspension) to the interface of the cell supporting medium of the microwell via the entrance of the microwell. The cell culture medium then promotes the growth of a cell cluster on the interface of the cell supporting medium of the microwell. Accordingly, in some embodiments, the interface of the cell supporting medium of the microwell includes a cluster of cells formed in situ. The cluster of cells which may be formed is described above.

In some embodiments, a cell or cells once delivered to the interface of the cell supporting medium of the microwell may migrate into the cell supporting medium and form a cluster of cells therein. Accordingly, in some embodiments, the cell supporting medium includes a cluster of cells formed in situ. The cluster of cells which may be formed is described above.

In some embodiments, a cell or cells once delivered to the microwell through the entrance of the microwell may form a cluster of cells in the microwell itself. Accordingly, in some embodiments, the microwell includes a cluster of cells formed in situ. The cluster of cells which may be formed is described above.

The type of cell culture medium utilized will depend on the nature of the application of the three-dimensional cell culture platform. For the establishment of a cell cluster such as a spheroid or organoid the medium will comprise constituents supportive of cell viability and growth. Suitable media have been described above.

In some embodiments, the cell culture medium may be in the form of a colloid or colloidal suspension. A colloid is a phase separated mixture in which one substance of microscopically dispersed insoluble or soluble particles is suspended throughout another substance. In some instances, the dispersed substance alone may be referred to as the colloid. The term colloidal suspension refers to the overall mixture.

In some embodiments, the cell culture medium may be absent such that the microwell is filled with air. This may be important for modelling skin or lung systems. In such systems, cells need to grow in air-liquid interfaces after seeding. In this regard, in some embodiments of the cell culture platform of the present invention the interior of the microwell can be ventilated with air.

In some embodiments, the entrance of a microwell enables the delivery of one or more agents to the microwell, to the interface of the cell supporting medium of the microwell, or to the cell supporting medium. In some embodiments, the agents are delivered via the cell culture medium. In some embodiments, the one or more agents are delivered to a cluster of cells formed in the microwell, formed on the interface of the cell supporting medium of the microwell, or formed within the cell supporting medium.

For example, once a cluster of cells has formed, the culture platform may be used in drug screening assays to test suitability of candidate agents for therapeutic applications. In this regard, the one or more agents may be selected from the group consisting of organic materials, inorganic materials, a drug, a drug carrier, a colloid, a small molecule, a nucleic acid, an oligonucleotide, an oligopeptide, a polypeptide, a protein, an enzyme, a polysaccharide, a glycoprotein, a hormone, a receptor, a ligand for a receptor, a co-factor, an antisense oligonucleotide, a ribozyme, a small interfering RNA, a microRNA, a short hairpin RNA, a lipid, an aptamer, a virus, and an antibody or an antigen binding part thereof.

The three-dimensional cell culture platform of the present invention may also be a part of a microfluidic device. Accordingly, in a second aspect, the present invention provides a microfluidic device for cell culture, the microfluidic device comprising a three-dimensional cell culture platform of the first aspect of the present invention. Microfluidic devices encompassing the cell culture platform enable precise control over multiple cellular parameters and over communication among multiple cell types in a single in vitro device. They also facilitate the establishment and control of biochemical or thermal gradients, and provide improved access for imaging.

The structure of the microfluidic device is typically dictated by the nature of the three-dimensional cell culture platform it is anticipated to incorporate. For example, a microfluidic device that would be suitable for incorporation of the cell culture platform depicted in FIG. 1A would comprise:
 a first supporting structure capable of housing a cell supporting medium, wherein the cell supporting medium has at least one microwell formed therein; and
 a second supporting structure capable of housing a cell culture medium, wherein the cell culture medium can make direct contact with an interface of the cell supporting medium of a microwell.

A microfluidic device that would be suitable for incorporation of the three-dimensional cell culture platform depicted in FIGS. 1C and 1D would comprise:
 a first supporting structure capable of housing a cell supporting medium, wherein the cell supporting medium has at least two microwells formed therein, wherein at least one microwell opposes and faces another microwell;
 a second supporting structure capable of housing a cell culture medium, wherein the cell culture medium can make direct contact with an interface of the cell supporting medium of a microwell; and
 a third supporting structure capable of housing a cell culture medium, wherein the cell culture medium can make direct contact with an interface of the cell supporting medium of at least one other opposed microwell,
 wherein the second supporting structure and third supporting structure lie either side of the first supporting structure and oppose and face each other.

A microfluidic device that would be suitable for incorporation of the three-dimensional cell culture platform depicted in FIG. 1E would comprise:
 a first supporting structure capable of housing a cell supporting medium, wherein the cell supporting medium has at least two microwells formed therein, wherein the at least two microwells lie in the same plane and are spaced apart from each other; and
 a second supporting structure capable of housing a cell culture medium, wherein the cell culture medium can make direct contact with an interface of the cell supporting medium of each microwell,
 wherein the second supporting structure lies substantially parallel to the first supporting structure.

Clearly, the number of entrances required in the first supporting structure will dictate the number of microwell spacers and associated supporting structures needed, and therefore the invention as defined by the aforementioned specific embodiments is not limiting and any and all arrangements are encompassed by the present invention. That is, although the specific embodiments described above comprise two or three supporting structures, microfluidic devices having any number of supporting structures are contemplated by the present invention. For example, there may be more than one supporting structure housing a cell supporting medium, and/or there may be more than two supporting structures capable of housing a cell culture medium.

In some embodiments of the microfluidic device encompassed by the present invention, the internal surface tension of the first supporting structure is hydrophobic (for example at least >80°, water contact angle). In some embodiments, the internal surface tension of the second and/or third supporting structures is hydrophobic (for example at least >80°, water contact angle), or hydrophilic (for example at least <15°, water contact angle). Further detail is provided below.

Figure 2:
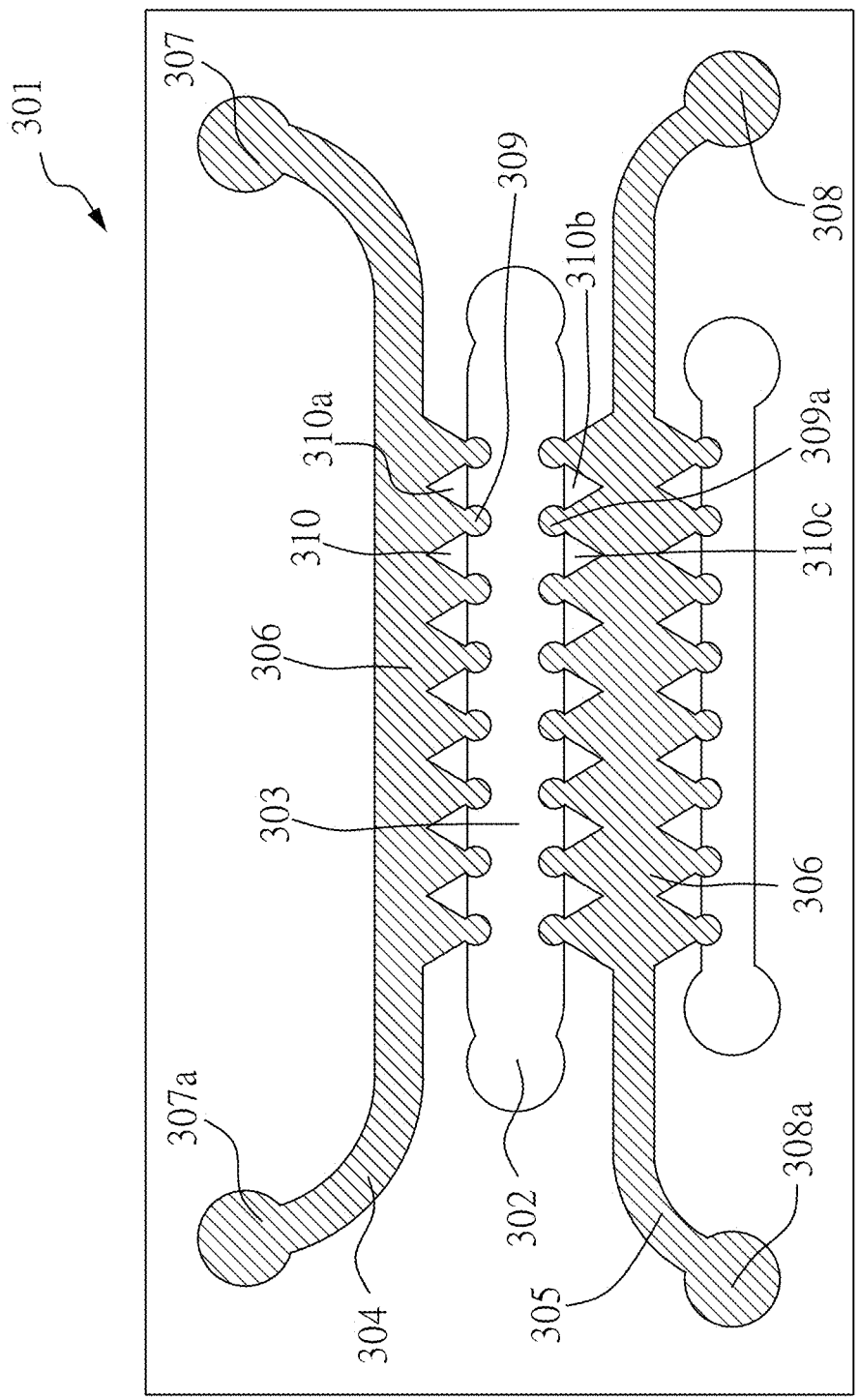
FIG. 2—depiction of a top view a microfluidic device which comprises the three-dimensional cell culture platform of the embodiment shown in FIG. 1C.

An exemplary embodiment of a microfluidic device encompassed by the present invention is shown in FIG. 2. In this embodiment, the microfluidic device 301 comprises a first supporting structure 302 in the form of a channel which is capable of housing the cell supporting medium 303. The internal surface tension of the first supporting structure 302 is hydrophobic. The nature of the cell supporting medium 303 may be as described above. The second supporting structure 304 and third supporting structure 305 are also in the form of channels, the internal surfaces of each of which are hydrophobic and are capable of housing the cell culture medium 306. The cell culture medium 306 may be the same in both the second supporting structure 304 and third supporting structure 305, or the cell culture medium 306 in the second supporting structure 304 may be different to the cell culture medium 306 in the third supporting structure 305. The nature of the cell culture medium 306 is as described above.

The microfluidic device depicted in FIG. 2 is an example of a closed system device. A closed system device as referred to herein is a device wherein a portion of the first supporting structure capable of housing a cell supporting medium is covered by parts of one or more other supporting structures of the device. Open system devices are also encompassed by the present invention. An open system device as referred to herein is a device wherein none of the first supporting structure capable of housing a cell supporting medium is covered by one or more other supporting structures of the device.

In some embodiments of a microfluidic device encompassed by the present invention, the second supporting structure and/or the third supporting structure may comprise one or more reservoirs for housing the cell culture medium. In some embodiments, the second supporting structure and/or third supporting structure comprise a reservoir located at each terminal end of each structure. For example, as shown in FIG. 2, the second supporting structure 304 comprises reservoirs 307, 307a located at each end of the channel 304, while the third supporting structure (channel) 305 comprises reservoirs 308, 308a located at each end of the channel 305.

In the embodiment depicted in FIG. 2, a series of microwells are formed in the cell supporting medium 303, where multiple microwells oppose and face each other. As an example, opposed microwells 309 and 309a are labelled in FIG. 2. Each microwell has a microwell spacer positioned immediately adjacent to each side of the microwell, thereby defining an entrance of the microwell, wherein the microwell spacer extends away from the cell supporting medium. Microwell spacers 310, 310a, 310b and 310c are labelled in FIG. 2.

In some embodiments of a microfluidic device encompassed by the present invention, the second supporting structure and/or third supporting structure each comprise an inlet for receiving, and an outlet for removing, respectively, the cell culture medium. In some embodiments, the inlet and the outlet are located in a respective reservoir located at each terminal end of each supporting structure.

A microfluidic device encompassed by the present invention may be manufactured from thermoplastic materials as described above with respect to the microwell spacers. Indeed, the microfluidic device preferably is made of the same material as the microwell spacers and in some embodiments the microwell spacers are an integral part of the microfluidic device. In some embodiments, the microfluidic device is made of PDMS.

Templates for construction of the microfluidic device can be produced using manufacturing methods known in the art. Example protocols are provided in Lake M A et al., 2015, Microfluidic Device Design, Fabrication, and Testing Protocols, https://www.nature.com/protocolexchange/system/uploads/3745/original/Microfluidic_device_design_fabrication_and_testing_protocols_protex2015_069.pdf?1436957242; and Friend J and Yeo L, 2010, Fabrication of Microfluidic Devices using Polydimethylsiloxane, *Biomicrofluidics*, 4(2): 026502, doi: 10.1063/1.3259624.

A typical process first requires the fabrication of an epoxy-based negative (SU-8) photoresist master mold that serves as a patterned template for PDMS casting. Master fabrication steps include spin coating of a photoresist film, exposure, and development to make final raised features of the mold on a silicon substrate. Device fabrication steps using the completed master as a mold includes the steps of pouring PDMS on the master and the final device after punching holes with a biopsy punch and bonding the PDMS structure to glass as an example.

An open channel of the device can be produced by using a laser cutting method. The thin layer of PDMS (Thickness typically 250-1000 µm) can be cut in different patterns by using a laser cutting machine as described in Isiksacan Z et al., 2016, Rapid Fabrication of Microfluidic PDMS Devices From Reusable PDMS Molds Using Laser Ablation, *J. Micromechanics and Microengineering*, 26(3), https://iopscience.iop.org/article/10.1088/0960-1317/26/3/035008.

After producing the patterns on the film, different layers of PDMS are assembled.

The present inventor recognized the need to produce in vitro surfaces and interfaces which best allow modelling of in vivo environments towards the formation of cell clusters and complex cell structures, including organoids. In this regard, the inventor produced microwell-like bioactive interfaces in a cell supporting medium by placing two different types of gels with orthogonal liquid-gelling properties under direct contact conditions within a microfluidic platform.

Accordingly, in a third aspect, the present invention provides a method of producing a three-dimensional cell culture platform, the method comprising:

providing a first supporting structure having at least one entrance formed therein, wherein the at least one entrance is located at the periphery of the first supporting structure, and wherein the at least one entrance is defined by one or more microwell spacers connected to the first supporting structure;

providing a second supporting structure in communication with the at least one entrance, wherein the one or more microwell spacers are located between the first supporting structure and the second supporting structure;

introducing a sacrificed medium into the second supporting structure, wherein the sacrificed medium is a liquid reversible medium, and wherein the sacrificed medium forms a liquid-air interface in the form of a meniscus due to surface tension between the sacrificed medium, air, and the first supporting structure and the second supporting structure;

solidifying the sacrificed medium;

introducing a cell supporting medium into the first supporting structure;

solidifying the cell supporting medium, wherein the solidified sacrificed medium protrudes through the at least one entrance and into the cell supporting medium in the first supporting structure so as to form at least one microwell in the cell supporting medium; and optionally liquefying the sacrificed medium, and removing the liquefied sacrificed medium from the second supporting structure, wherein the volume of a microwell is determined by a surface of the one or more microwell spacers defining the entrance of the microwell, and by an interface of the cell supporting medium of the microwell, wherein the at least one entrance enables the introduction of a cell culture medium into the microwell, and wherein the one or more microwell spacers are in direct contact with the cell supporting medium prior to one or more cells being delivered to the three-dimensional cell culture platform.

Such a method would be suitable for producing the three-dimensional cell culture platform depicted in FIG. 1A.

In a fourth aspect, the present invention provides a method of producing a three-dimensional cell culture platform, the method comprising:

providing a first supporting structure having at least two entrances formed therein, wherein the entrances are located at the periphery of the first supporting structure, wherein at least one entrance opposes and faces another entrance, and wherein the entrances are defined by one or more microwell spacers connected to the first supporting structure;

providing a second supporting structure in communication with at least one entrance, wherein one or more microwell spacers are located between the first supporting structure and the second supporting structure;

providing a third supporting structure in communication with at least one other entrance which is opposed to and faces the at least one entrance in communication with the second supporting structure, wherein one or more microwell spacers are located between the first supporting structure and the third supporting structure;

introducing a sacrificed medium into the second supporting structure and third supporting structure, wherein the sacrificed medium is a liquid reversible medium, and wherein the sacrificed medium forms liquid-air interfaces in the form of menisci due to surface tension between the sacrificed medium, air, and the first supporting structure, second supporting structure, and third supporting structure;

solidifying the sacrificed medium;

introducing a cell supporting medium into the first supporting structure;

solidifying the cell supporting medium, wherein the solidified sacrificed medium protrudes through each entrance and into the cell supporting medium in the first supporting structure so as to form a microwell in the cell supporting medium; and optionally liquefying the sacrificed medium, and removing the liquefied sacrificed medium from the second supporting structure and third supporting structure, wherein the volume of a microwell is determined by a surface of the one or more microwell spacers defining the entrance of the microwell, and by an interface of the cell supporting medium of the microwell, wherein the entrance enables the introduction of a cell culture medium into the microwell, and wherein the one or more microwell spacers are in direct contact with the cell supporting medium prior to one or more cells being delivered to the three-dimensional cell culture platform.

Such a method would be suitable for producing the three-dimensional cell culture platforms depicted in FIGS. 1C and 1D as part of a microfluidic device depicted in FIG. 2.

In a fifth aspect, the present invention provides a method of producing a three-dimensional cell culture platform, the method comprising:

providing a first supporting structure having at least two entrances formed therein, wherein the at least two entrances lie in the same plane, are spaced apart from each other, and are located at the periphery of the first supporting structure, wherein the at least two entrances are defined by one or more microwell spacers, and wherein the microwell spacers connected to the first supporting structure;

providing a second supporting structure in communication with the at least two entrances, wherein one or more microwell spacers are located between the first supporting structure and the second supporting structure;

introducing a sacrificed medium into the second supporting structure, wherein the sacrificed medium is a liquid reversible medium, and wherein the sacrificed medium forms liquid-air interfaces in the form of menisci due to surface tension between the sacrificed medium, air, and the first supporting structure and the second supporting structure;

solidifying the sacrificed medium;

introducing a cell supporting medium into the first supporting structure;

solidifying the cell supporting medium, wherein the solidified sacrificed medium protrudes through each entrance and into the cell supporting medium so as to form a microwell in the cell supporting medium; and optionally liquefying the sacrificed medium, and removing the liquefied sacrificed medium from the second supporting structure, wherein the volume of a microwell is determined by a surface of the one or more microwell spacers defining the entrance of the microwell, and by an interface of the cell supporting medium of the microwell, wherein the entrance enables the introduction of a cell culture medium into the microwell, and wherein the one or more microwell spacers are in direct contact with the cell supporting medium prior to one or more cells being delivered to the three-dimensional cell culture platform.

Such a method would be suitable for producing the three-dimensional cell culture platform depicted in FIG. 1E.

In some embodiments of the third to fifth aspects of the invention, each meniscus may be in the form of a concave meniscus or convex meniscus. A number of factors will determine the form and size of each meniscus. Some of these factors include evaporation of the sacrificed medium (the form and size of each meniscus will depend on the time taken to introduce the cell supporting medium), the flow rate upon which the sacrificed medium is introduced, and the surface tension between the supporting structures. As the cell supporting medium solidifies, the sacrificed medium protrudes/bulges into the first supporting structure in a constant swelling process due to the difference of osmotic pressure between the cell supporting medium and the sacrificed medium as it solidifies. The water molecules from the cell supporting medium diffuse into the sacrificed medium. Protrusion of the sacrificed medium through each entrance and into the solidifying/solidified cell supporting medium continues until an equilibrium between the stiffness (elasticity) and osmotic pressure of the sacrificed medium and the cell supporting medium is reached (at which point a microwell has formed in the solidified cell supporting medium). To ensure this protrusion process occurs, the stiffness of the sacrificed medium should be greater than the stiffness of the solidified cell supporting medium. As used herein, the words "solidifies", "solidified" and "solidifying", and the like, encompass the words "gels", "gelled" and "gelling", as a reflection of the nature of the sacrificed medium and cell supporting medium used.

With respect to the third to fifth aspects of the invention, the level to which the sacrificed medium protrudes into the first supporting structure is also determined by the defined area and shape of the entrance, which in turn is dictated by the shape of the microwell spacers and the distance between adjacent microwell spacers.

The surface tension of the first supporting structure imparts a liquid repellent property to increase the formation of liquid-air interfaces of the sacrificed medium. For example, the sacrificed medium may be hydrophilic, and the first supporting structure may be hydrophobic; the sacrificed medium may be hydrophobic and the first supporting structure may be hydrophilic; or the first supporting structure may be superhydrophobic for both a hydrophobic or hydrophilic sacrificed medium.

The surface tension of the second, third, and/or further supporting structures can have a low or high affinity with the sacrificed medium when the entrances in the first supporting structure are in a closed system. However, the surface tension of the second, third, and/or further supporting structures have a high affinity with the sacrificed medium when the entrances in the first supporting structure are in an open system.

Overall, high repellent properties (such as when the first supporting structure is hydrophobic and the sacrificed medium is hydrophilic) are essential between the sacrificed medium and the first supporting structure in closed and open systems, and high affinity properties of the sacrificed medium with the second, third, and/or further supporting structures (such as when the second, third, and/or further supporting structures are hydrophilic and the sacrificed medium is hydrophilic) are essential in an open system. High affinity of the second, third, and/or further supporting structures will increase the capillarity (capillary force/surface tension) driven sacrificed medium flow through the second, third, and/or further supporting structures.

With respect to the third to fifth aspects of the present invention, the nature of the first, second, third, and further supporting structures, microwell spacers, cell supporting medium, and microwells are as described above.

Figure 3A:
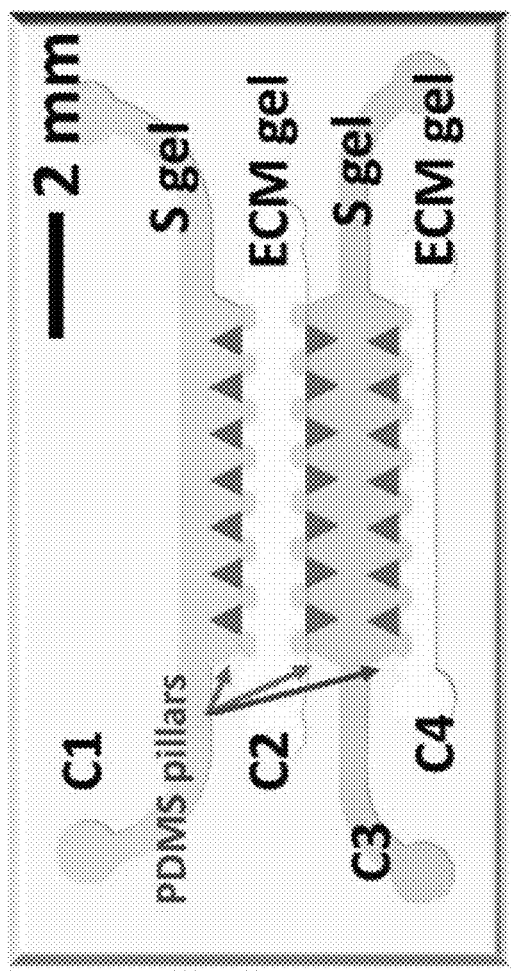
FIGS. 3A-3F—depicts three-dimensional cell culture platform and microfluidic device set-up and structure according to an embodiment of the present invention.

With reference to FIG. 3A as an example, the sacrificed medium (S gel) is first introduced into the second supporting structure (channel C1) and third supporting structure (channel C3), or similarly, the second supporting structure 304 and third supporting structure 305 shown in FIG. 2. In some embodiments, the sacrificed medium comprises the properties of reversible hydrogels, such as liquid reversible hydrogels, which are known in the art. For example, thermal sensitive hydrogels may be used such as gelatin, agarose, GelMA, Pluronic F68 and Pluronic F-127, or ionic reversible hydrogels may be used such as alginate, and VitroGel®. Hydrogels made from other materials (such as fibrin, collagen, chitosan, Poly(N-isopropylacrylamide) (PNIPAAm), and Polyethylene Glycol (PEG)) may also be used for the sacrificed medium. Hydrogels can also be separated into two groups on the basis of their natural or synthetic origins as described in detail above. Hydrogel-forming natural polymers include proteins such as gelatin, polysaccharides such as cellulose, alginate and agarose. Further examples of sacrificed media can be found in Khateb Al et al., 2016, *Int. J. Pharm.*, 502(1-2): 70-90; Wang X Y et al., 2014, *Lab on a Chip*, 15: 2709-2716; Tan Y et al., 2014, *Biofabrication*, 6(2): doi: 10.1088/1758-5082/6/2/024111; and Gillette B M et al., 2008, *Nat. Mater.*, 7(8): 636-640.

Furthermore, the sacrificed medium may be comprised of a thermal sensitive material such as a wax-based support material or Poly(N-isopropylacrylamide) (PNIPAAm)-based thermal reversible gel. See for example Miao S et al., 2017, *Materials Today*, 20(10): 577-591.

In introducing the sacrificed medium into the second and/or third supporting structures, for example with respect to the three-dimensional cell culture platform of the fourth aspect of the invention (a closed channel system, as depicted in FIG. 2), the following steps can be taken. Sacrificed medium is liquefied by heating to its melting temperature ($T_{mS}$) and then is injected into the second and third supporting structures. The viscosity of the sacrificed medium ($V_S$: mPa·s) and the injection flow rate of the sacrificed medium ($FR_S$: µl/s) should be under the burst pressure of the openings (the burst pressure of the sacrificed medium ($P_S$) ranges from 108 to 2520 Pa) in the interface of the first and second or first and third supporting structures ($V_S+FR_S<P_S$). The surface tension of the first supporting structure ($ST_{1S}$) is liquid repellent.

The viscosity of the sacrificed medium ($V_S$, η: 0.01 to 200 mPa·s) is affected by the gelling temperature of the sacrificed medium ($T_{gS}$), melting temperature of the sacrificed medium ($T_{mS}$), and stiffness of the sacrificed medium ($S_S$). $S_S$ is affected by the concentration of the sacrificed medium ($C_S$: 0.5 to 20 w/v %). The length of the second supporting structure ($L_2$) and length of the third supporting structure ($L_3$) are typically between 5 to 20 mm (in the example of FIG. 2), and the flow rate that the sacrificed medium ($FR_S$) at the melting temperature of the sacrificed medium ($T_{mS}$) is introduced at is typically between 0.04 to 10 µl/sec depending on the opening size/area of the first supporting structure ($O_A$: 0.03 to 4 mm$^2$) under the burst pressure of the sacrificed medium ($P_S$: 108 to 2520 Pa).

The required surface tension of the first supporting structure ($ST_{1S}$) for retaining the interface of the sacrificed medium is hydrophobic, wherein the surface contact angle of the first supporting structure ($CA_{1S}$) is >95° (water contact angle). The surface tension of the second supporting structure ($ST_{2S}$) may be hydrophobic or hydrophilic, wherein the surface contact angle of the second supporting structure is >0° (in the example of FIG. 2).

In the embodiment shown in FIG. 2, the surface contact angle of the first supporting structure ($CA_{1S}$) is >95° (water contact angle) and the sacrificed medium is a water-based solution which is hydrophilic. The surface tension of the second supporting structure ($ST_{2S}$) and the surface tension of the third supporting structure ($ST_{3S}$) are liquid repellent in the closed system ($CA_{2S}$ and $CA_{3S}$ are >95°, hydrophobic) and the sacrificed medium is hydrophilic.

The manner in which the sacrificed medium is solidified depends on the type of medium used. For example, the sacrificed medium may be solidified by intermolecular forces of covalent bonds, noncovalent bonds, hydrogen bonding, or electrostatic force. Thermal sensitive hydrogels can be solidified within $T_{gS}$ and liquefied within $T_{mS}$ by temperature control. With respect to ionic reversible hydrogels, such hydrogels can be solidified by crosslinking with ionic bonding and liquefying by reducing crosslinking or replacing with a non-crosslinker by competitive binding to remove the ionic bonding.

In some embodiments, the sacrificed medium may be one of gelatin, agarose, or Pluronic-127. In some embodiments, the sacrificed medium may comprise about 1% to about 30% w/v gelatin, about 0.1% to about 10% w/v of agarose, or about 10% to about 50% w/v of Pluronic-127. However, the present invention is not limited by the type of sacrificed medium used, provided the medium maintains integrity and stability of microwells formed during introduction and solidification of the cell supporting medium in the first supporting structure (as described below).

Once the sacrificed medium has solidified, the cell supporting medium is introduced into the first supporting structure. In some embodiments, the cell supporting medium is a liquid irreversible medium, such that once it has solidified, it cannot be made liquid again. Examples of suitable cell supporting media have been described in detail above.

In introducing the cell supporting medium into the first supporting structure, the following steps can be taken. The cell supporting medium is in a liquid form at its melting temperature ($T_{mCSM}$) and the sacrificed medium is under its gelling temperature ($T_{gS}$) in solidified form. When injecting the cell supporting medium into the first supporting structure, the viscosity of the cell supporting medium ($V_{CSM}$) and the flow rate of the cell supporting medium ($FR_{CSM}$) should be less than the stiffness of sacrificed medium ($S_S$) (i.e. $V_{CSM}+FR_{CSM}<S_S$) and less than the melting temperature of the cell supporting medium ($T_{mCSM}$). Once injection of the cell supporting medium is completed, the cell supporting medium is solidified by reducing the temperature of the cell supporting medium to less than its gelling temperature ($T_{gCSM}$).

The $V_{CSM}$ ($\eta$:0.01 to 200 mPa·s) is affected by the $T_{gCSM}$. $T_{mCSM}$ and $C_{CSM}$. $S_{CSM}$ is affected by the $C_{CSM}$ (typically 0.5-30 mg/ml). The length of the first supporting structure ($L_1$) is typically between 5 to 30 mm. $FR_{CSM}$ may be introduced at between 0.2 to 205 µl/sec in liquid condition under $T_{mCSM}$. The range of $O_A$ is typically from 0.03 to 4 mm², which is within $S_{CSM}$ range of 50 to 10000 Pa.

The manner in which the cell supporting medium is solidified depends on the type of medium used. In some embodiments where the cell supporting medium is a thermosensitive hydrogel, the medium is solidified by decreasing the temperature of the gel to below its melting temperature. In some embodiments where the cell supporting medium is an irreversible polymerisation hydrogel, the gel will solidify shortly after introducing the gel into the first supporting structure under a room temperature environment. Other examples include irreversible gelling hydrogels which can be solidified by adding a crosslinking agent to the gel, photosensitive hydrogels which can be solidified by exposure to light, or polymerisable hydrogels which are solidified by ionic, enzymatic, or otherwise polymerization. In any event, the cell supporting medium is solidified by intermolecular forces of covalent bonds, noncovalent bonds, hydrogen bonding, or electrostatic force.

In some embodiments of the first to fifth aspects of the invention, the cell supporting medium is a hydrogel which comprises fibrin. In some embodiments, the cell supporting medium comprises fibrin at a concentration of about 2.5 mg/ml to about 100 mg/ml fibrin. In some embodiments, the cell supporting medium comprises about 2.5 mg/ml fibrin. Fibrin is the mixture of fibrinogen and thrombin. In some embodiments, the fibrinogen component is present in the mixture at a concentration of about 0.01 mg/ml to about 100 mg/ml. In some embodiments, the thrombin component is present in the mixture at a concentration of about 0.01 U/ml to about 500 U/ml.

In some embodiments of the first to fifth aspects of the invention, the cell supporting medium is a hydrogel which comprises collagen. In some embodiments, the cell supporting medium comprises collagen at a concentration of about 0.01 mg/ml to about 50 mg/ml. In some embodiments, the cell supporting medium comprises about 5 mg/ml collagen.

In some embodiments of the first to fifth aspects of the invention, the cell supporting medium is a hydrogel which comprises basement membrane extract. In some embodiments, the cell supporting medium comprises basement membrane extract at a concentration of about 0.01 mg/ml to about 20 mg/ml. In some embodiments, the cell supporting medium comprises about 10 mg/ml basement membrane extract.

In some embodiments of the first to fifth aspects of the invention, the cell supporting medium comprises Matrigel. In some embodiments, the cell supporting medium comprises Matrigel at a concentration of about 0.01 mg/ml to about 30 mg/ml. In some embodiments, the cell supporting medium comprises about 10 mg/ml Matrigel.

In some embodiments of the first to fifth aspects of the invention, the cell supporting medium comprises laminin. In some embodiments, the cell supporting medium comprises laminin at a concentration of about 0.01 mg/ml to about 20 mg/ml. In some embodiments, the cell supporting medium comprises about 10 mg/ml laminin.

In some embodiments of the first to fifth aspects of the invention, the cell supporting medium comprises fibronectin. In some embodiments, the cell supporting medium comprises fibronectin at a concentration of about 0.01 mg/ml to about 20 mg/ml. In some embodiments, the cell supporting medium comprises about 10 mg/ml fibronectin.

In some embodiments of the first to fifth aspects of the invention, the cell supporting medium comprises GelMA (Gelatin-Methacryloyl). In some embodiments, the cell supporting medium comprises GelMA at a concentration of about 0.01 mg/ml to about 500 mg/ml. In some embodiments, the cell supporting medium comprises about 100 mg/ml GelMA.

In some embodiments of the first to fifth aspects of the invention, the cell supporting medium comprises VitroGel®. The VitroGel® can be present at different dilution ratios to achieve different degrees of stiffness. In some embodiments, the hydrogel can be diluted with VitroGel® Dilution Solution. The stiffness of hydrogel will vary depending on the dilution profile. For example, the stiffness of the hydrogel will be around 1500 Pa for a 1:0 dilution (VitroGel®:VitroGel® Dilution Solution), 600-700 Pa for a 1:1 dilution (VitroGel®:VitroGel® Dilution Solution), 300-400 Pa for a 1:2 dilution (VitroGel®:VitroGel® Dilution Solution), 200-300 Pa for a 1:3 dilution (VitroGer:VitroGel® Dilution Solution), and 100 Pa for a 1:4 dilution (VitroGel®:VitroGel® Dilution Solution).

In some embodiments of the third to fifth aspects of the invention, the method comprises the optional step of liquefying the sacrificed medium, and removing the liquefied sacrificed medium from the second supporting structure. The manner in which the sacrificed medium is liquefied will be dictated by the nature of the medium used, as would be understood by a person skilled in the art. For example, the sacrificed medium may be liquefied by heating at or above the melting temperature of the sacrificed medium. In this regard, if the sacrificed medium is gelatin, the gelatin may be liquefied by heating at least about 8° C. to about 60° C. depending on the types of gelatin and the concentration of gelatin used. If the sacrificed medium is agarose, the agarose may be liquefied by heating at least about 40° C. to about 100° C. In embodiments where the sacrificed medium is Pluronic-127, the medium may be liquefied by cooling at least to about 1° C. to about 37° C.

Liquification of the sacrificed medium should not disrupt the integrity of the microwells formed in the cell supporting medium. Once liquefied, the sacrificed medium can be removed and replaced with a cell culture medium delivered via the second and/or third supporting structure. In this way, the cell culture medium will now be in direct communication with the perimeter of each microwell, which includes the cell supporting medium, thereby enabling one mode of delivery of cells and or agents to the cell supporting medium.

In liquefying the sacrificed medium and replacing with cell culture medium, the following steps can be taken. When replacing the sacrificed medium with cell culture medium, the viscosity of the cell culture medium ($V_M$) and the flow rate of the cell culture medium ($FR_M$) should be less than the stiffness of the cell supporting medium ($S_{CSM}$) so as not to damage the cell supporting medium (in solidified form). That is, $V_M + FR_M < S_{CSM}$.

When the sacrificed medium is in liquid form, it may be removed by a pipette tip, needle, by vacuum, or otherwise. The cell culture medium may then be delivered (for example by injection) to the second and/or third supporting structures to replace the sacrificed medium. The temperature of the cell culture medium will be within the melting temperature of the sacrificed medium ($T_{mS}$) and the cell supporting medium is maintained in a solidified form because of its irreversible properties. The flow rate of injection of the cell culture medium ($FR_M$) may be within the range of 0.2 μl/sec to 120 μl/sec depending on the stiffness of the cell supporting medium (ranging from 50 to 5000 Pa), and the concentration of the cell supporting medium (ranging from 0.1 to 50 mg/ml).

The exemplary three-dimensional cell culture platforms and associated microfluidic devices described herein are horizontal systems in that they are produced and used in a generally horizontal orientation. However, it is to be made clear that vertical systems are also encompassed by the present invention. For example, the first supporting structure may be positioned below the second supporting structure such that the sacrificed medium is introduced from above the first supporting structure as opposed to being introduced from the sides of the first supporting structure in a horizontal system.

In a sixth aspect, the present invention provides a three-dimensional cell culture platform produced by the method of any one of the third to fifth aspects of the invention.

In a seventh aspect, the present invention provides a microfluidic device for cell culture, the microfluidic device comprising a three-dimensional cell culture platform of the sixth aspect of the invention.

In an eighth aspect, the present invention provides a method of producing a three-dimensional cell culture platform, the method comprising:
  providing a first supporting structure having at least one entrance formed therein, wherein the at least one entrance is located at the periphery of the first supporting structure, wherein the at least one entrance is defined by one or more microwell spacers connected to the first supporting structure;
  providing a second supporting structure in communication with the at least one entrance, wherein the one or more microwell spacers are located between the first supporting structure and the second supporting structure;
  introducing a sacrificed medium into the second supporting structure, wherein the sacrificed medium is a liquid reversible medium, and wherein the sacrificed medium forms a liquid-air interface in the form of a meniscus due to surface tension between the sacrificed medium, air, and the first supporting structure and the second supporting structure;
  solidifying the sacrificed medium;
  introducing a cell supporting medium into the first supporting structure;
  solidifying the cell supporting medium, wherein the solidified sacrificed medium protrudes through the at least one entrance and into the cell supporting medium in the first supporting structure so as to form at least one microwell in the cell supporting medium;
  liquefying the sacrificed medium, and removing the liquefied sacrificed medium from the second supporting structure; and
  replacing the removed liquefied sacrificed medium with a cell culture medium, wherein the cell culture medium is in direct contact with an interface of the cell supporting medium of a microwell,
  wherein the volume of a microwell is determined by a surface of the one or more microwell spacers defining the entrance of the microwell, and by an interface of the cell supporting medium of the microwell, and
  wherein the one or more microwell spacers are in direct contact with the cell supporting medium prior to one or more cells being delivered to the three-dimensional cell culture platform.

In a ninth aspect, the present invention provides a method of producing a three-dimensional cell culture platform, the method comprising:
  providing a first supporting structure having at least two entrances formed therein, wherein the entrances are located at the periphery of the first supporting structure, wherein at least one entrance opposes and faces another entrance, and wherein the entrances are defined by one or more microwell spacers connected to the first supporting structure;
  providing a second supporting structure in communication with at least one entrance, wherein one or more microwell spacers are located between the first supporting structure and the second supporting structure;
  providing a third supporting structure in communication with at least one other entrance which is opposed to and faces the at least one entrance in communication with the second supporting structure, wherein one or more microwell spacers are located between the first supporting structure and the third supporting structure;
  introducing a sacrificed medium into the second supporting structure and third supporting structure, wherein the sacrificed medium is a liquid reversible medium, and wherein the sacrificed medium forms liquid-air interfaces in the form of menisci due to surface tension between the sacrificed medium, air, and the first supporting structure, the second supporting structure and the third supporting structure;
  solidifying the sacrificed medium;
  introducing a cell supporting medium into the first supporting structure;
  solidifying the cell supporting medium, wherein the solidified sacrificed medium protrudes through each entrance and into the cell supporting medium in the first supporting structure so as to form a microwell in the cell supporting medium;
  liquefying the sacrificed medium, and removing the liquefied sacrificed medium from the second supporting structure and third supporting structure; and
  replacing the removed liquefied sacrificed medium with a cell culture medium, wherein the cell culture medium is in direct contact with an interface of the cell supporting medium of a microwell,
  wherein the volume of a microwell is determined by a surface of the one or more microwell spacers defining the entrance of the microwell, and by an interface of the cell supporting medium of the microwell, and
  wherein the one or more microwell spacers are in direct contact with the cell supporting medium prior to one or more cells being delivered to the three-dimensional cell culture platform.

In a tenth aspect, the present invention provides a method of producing a three-dimensional cell culture platform, the method comprising:
  providing a first supporting structure having at least two entrances formed therein, wherein the at least two entrances lie in the same plane, are spaced apart from each other, and are located at the periphery of the first supporting structure, and wherein the at least two entrances are defined by one or more microwell spacers connected to the first supporting structure;
  providing a second supporting structure in communication with the at least two entrances, wherein one or more microwell spacers are located between the first supporting structure and the second supporting structure;

introducing a sacrificed medium into the second supporting structure, wherein the sacrificed medium is a liquid reversible medium, and wherein the sacrificed medium forms liquid-air interfaces in the form of menisci due to surface tension between the sacrificed medium, air, and the first supporting structure and the second supporting structure;

solidifying the sacrificed medium;

introducing a cell supporting medium into the first supporting structure;

solidifying the cell supporting medium, wherein the solidified sacrificed medium protrudes through each entrance and into the cell supporting medium so as to form a microwell in the cell supporting medium;

liquefying the sacrificed medium, and removing the liquefied sacrificed medium from the second supporting structure; and replacing the removed liquefied sacrificed medium with a cell culture medium, wherein the cell culture medium is in direct contact with an interface of the cell supporting medium of a microwell, wherein the volume of a microwell is determined by a surface of the one or more microwell spacers defining the entrance of the microwell, and by an interface of the cell supporting medium of the microwell, and wherein the one or more microwell spacers are in direct contact with the cell supporting medium prior to one or more cells being delivered to the three-dimensional cell culture platform.

In an eleventh aspect, the present invention provides a three-dimensional cell culture platform produced by the method of any one of the eighth to tenth aspects of the invention.

In a twelfth aspect, the present invention provides a microfluidic device for cell culture, the microfluidic device comprising a three-dimensional cell culture platform of the eleventh aspect of the invention.

In a thirteenth aspect, the present invention provides a three-dimensional cell culture platform comprising:
(i) a cell supporting medium having at least one microwell formed therein; and
(ii) one or more microwell spacers defining an entrance of the or each microwell, the entrance enabling the introduction of a cell culture medium into the or each microwell,
wherein the volume of a microwell is determined by a surface of the one or more microwell spacers defining the entrance of the microwell, and by an interface of the cell supporting medium of the microwell,
wherein the one or more microwell spacers are in direct contact with the cell supporting medium prior to one or more cells being delivered to the three-dimensional cell culture platform, and
wherein the platform supports the formation of a cluster of cells in situ.

In a fourteenth aspect, the present invention provides a three-dimensional cell culture platform comprising:
(i) a cell supporting medium having at least two microwells formed therein, wherein at least one microwell opposes and faces another microwell; and
(ii) one or more microwell spacers defining an entrance of each microwell, the entrance enabling the introduction of a cell culture medium into each microwell,
wherein the volume of a microwell is determined by a surface of the one or more microwell spacers defining the entrance of the microwell, and by an interface of the cell supporting medium of the microwell,
one or more microwell spacers are in direct contact with the cell supporting medium prior to one or more cells being delivered to the three-dimensional cell culture platform, and
wherein the platform supports the formation of a cluster of cells in situ.

In a fifteenth aspect, the present invention provides a three-dimensional cell culture platform comprising:
(i) a cell supporting medium having at least two microwells formed therein, wherein the at least two microwells lie in the same plane and are spaced apart from each other; and
(ii) one or more microwell spacers defining an entrance of each microwell, the entrance enabling the introduction of a cell culture medium into each microwell,
wherein the volume of a microwell is determined by a surface of the one or more microwell spacers defining the entrance of the microwell, and by an interface of the cell supporting medium of the microwell,
wherein the one or more microwell spacers are in direct contact with the cell supporting medium prior to one or more cells being delivered to the three-dimensional cell culture platform, and
wherein the platform supports the formation of a cluster of cells in situ.

In a sixteenth aspect, the present invention provides a three-dimensional cell culture platform comprising:
(i) a cell supporting medium having at least one microwell formed therein; and
(ii) one or more microwell spacers defining an entrance of the or each microwell, the entrance enabling the introduction of a cell culture medium into the or each microwell,
wherein the volume of a microwell is determined by a surface of the one or more microwell spacers defining the entrance of the microwell, and by an interface of the cell supporting medium of the microwell,
wherein the one or more microwell spacers are in direct contact with the cell supporting medium prior to one or more cells being delivered to the three-dimensional cell culture platform, and
wherein the interface of the cell supporting medium of the or each microwell includes a cluster of cells in the form of a cluster of cells formed in situ.

In a seventeenth aspect, the present invention provides a three-dimensional cell culture platform comprising:
(i) a cell supporting medium having at least two microwells formed therein, wherein at least one microwell opposes and faces another microwell; and
(ii) one or more microwell spacers defining an entrance of each microwell, the entrance enabling the introduction of a cell culture medium into each microwell,
wherein the volume of a microwell is determined by a surface of the one or more microwell spacers defining the entrance of the microwell, and by an interface of the cell supporting medium of the microwell,
wherein the one or more microwell spacers are in direct contact with the cell supporting medium prior to one or more cells being delivered to the three-dimensional cell culture platform, and
wherein the interface of the cell supporting medium of each microwell includes a cluster of cells in the form of a cluster of cells formed in situ.

In an eighteenth aspect, the present invention provides a three-dimensional cell culture platform comprising:
- (i) a cell supporting medium having at least two microwells formed therein, wherein the at least two microwells lie in the same plane and are spaced apart from each other; and
- (ii) one or more microwell spacers defining an entrance of each microwell, the entrance enabling the introduction of a cell culture medium into each microwell, wherein the volume of a microwell is determined by a surface of the one or more microwell spacers defining the entrance of the microwell, and by an interface of the cell supporting medium of the microwell, wherein the one or more microwell spacers are in direct contact with the cell supporting medium prior to one or more cells being delivered to the three-dimensional cell culture platform, and wherein the interface of the cell supporting medium of each microwell includes a cluster of cells in the form of a cluster of cells formed in situ.

In a nineteenth aspect, the present invention provides a microfluidic device for cell culture, the microfluidic device comprising a three-dimensional cell culture platform of any one of the thirteenth to eighteenth aspects of the invention.

The invention is further illustrated in the following examples. The examples are for the purposes of describing particular embodiments only and are not intended to be limiting with respect to the above description.

Example 1

Three-Dimensional Cell Culture Platform and Microfluidic Device Development and Testing A novel compact platform has been developed that allows for independent control of the cellular composition of complex multicellular tissues and cellular interactions with the extracellular matrix (ECM). This platform consists of "microwell-like" bioactive interfaces suitable for microtissue formation and growth. Microwell formation was achieved by placing two different types of hydrogels with orthogonal liquid-gelling properties under direct contact conditions within a microfluidic platform. This generates microwell shaped interfaces that are also optically transparent and integrated within the media flow channels permitting spatial-temporal control of the biochemical and mechanical signals within the tissue microenvironments and microscopic observation in real time.

Materials and Methods

Microfluidic Device and Culture Platform Design

The microfluidic device was cast from poly(dimethylsiloxane) (PDMS; Sylgard® 184, Dow Chemical Co.). A 300 μm thickness SU-8 master was fabricated using conventional soft lithography methods on a silicon wafer, and a PDMS mold was replicated from the SU-8 master. Briefly, a mixture of a PDMS pre-polymer with a PDMS precursor and curing agent in a 10:1 weight ratio was poured onto the SU-8 master and polymerized in a drying oven (at 60° C.) overnight. After the PDMS mold solidified, inlet and outlet holes were created on the PDMS mold using a punch (diameter, 1 mm) and reservoirs were created using 6 mm and 8 mm punches. The final PDMS microfluidic device was prepared by assembly of a PDMS channel or channels, reservoirs, and a Polymer Coverslip (#1.5 ibidi), and sterilisation under UV light for 2 hours.

Three-Dimensional Cell Culture Platform (Gel Matrix) Formation

Two types of hydrogels were used to create the cell culture platform aspect of the microfluidic device. The first hydrogel was a sacrificial hydrogel (the "S gel") of 10% gelatin (Sigma-Aldrich/Merck, G9391) in Dulbecco's phosphate-buffered saline (DPBS, Gibco 14190250, ThermoFisher Scientific). The second hydrogel was used as a cell supporting medium effectively mimicking an extracellular matrix (the "ECM gel"). With reference to FIG. 2, the S gel was introduced into side channels of the microfluidic device first (channels C1 and C3 in FIG. 3A) to avoid trapping bubbles inside the openings between the PDMS pillars of the microfluidic device, and to prevent the ECM gel (once delivered) from leaking into the side channels. The S gel was solidified by polymerization, and then the ECM gel was delivered into central channels of the microfluidic device (channels C2 and C4 in FIG. 3A). The ECM gel acts as the cell supporting layer (essentially a connective tissue) for cell growth and attachment. Three different ECM gels were tested, namely (i) fibrin (Fibrinogen, Sigma-Aldrich/Merck, F8630; Thrombin, Sigma-Aldrich/Merck, T6634; Aprotinin, Sigma-Aldrich/Merck, bovine A6279) at a concentration of 2.5 mg/ml in DPBS solution (DPBS, Gibco 14190250, ThermoFisher Scientific); (ii) collagen (PureCol® EZ Gel solution, Sigma Aldrich, 5074) at a concentration of 5 mg/ml; and (iii) Basement Membrane Extract, (BME extract, Cultrex PathClear BME, R&D Systems™ 343201001) at a concentration of 10 mg/ml.

During polymerization of the ECM gel, the solidified S gel bulged into the ECM gel through the openings between the PDMS pillars to form round shaped (concave) protrusions within the ECM scaffold. These concave protrusions effectively formed microwells in the ECM gel. After formation of the ECM, the S gel was melted by incubating the device at 37° C. and quickly replaced with a cell culture medium at same temperature. After changing the cell culture medium 2-3 times, the microfluidic device containing the organoid culture platform gel matrix was ready for cell seeding.

Cell Culture

All cells were maintained in a humidified incubator at 37° C. and 5% $CO_2$. Cells were grown to 70-80% confluence for the experiments. Normal human lung fibroblasts (NHLF, Lonza, used within 9 passages) in Fibroblast Growth Medium (FGM-2, Lonza) and Human umbilical vein endothelial cells (HUVEC, Lonza, used within 3 to 8 passages) in Endothelial Growth Medium (EGM-2, Lonza) were used for the experiments. Breast cancer cell lines, MCF-7 and MDA-MB-231, were cultured in DMEM (Gibco, high glucose 11965118, ThermoFisher Scientific) supplemented with 10% fetal bovine serum, penicillin (100 U/ml), and streptomycin (100 U/ml).

Cell Seeding

Separate culture: Cultured MCF-7 and/or MDA-MB-231 cells were delivered to channel C1 (for the tumor invasion and tumor angiogenesis study—see FIGS. 3A, 5A-5H, 6A-6F and 7A-7J). Cultured HUVEC and NHLF cells were delivered to channel C1 (for the stroma and vascular formation assays—see FIGS. 4A-4G) and to channel C3 (for the tumor angiogenesis assays—see FIGS. 6A-6F and 7A-7J). For cell delivery, each channel was sequentially seeded with $1\times10^5$ cells in 10 μL. For example, cultured cells were delivered to channel C1 and the device was placed in a vertical direction for 10-30 minutes to allow the cells to settle in the microwells. After the cells had settled, the same cell seeding procedure was performed with respect to channel C3. Mixed cell cultures were 1:1 of MCF-7/MDA-MB-231 and HUVECs/NHLFs. Cell culture mediums were changed every day. Following an 8-day cell growth period, each co-cultured device was subjected to a nanoparticle cellular distribution study.

Nanoparticle Treatment

Fluorescently-labelled cubosomes were prepared by pre-mixing the parent lipid, phytantriol, with 1,2-dipalmitoyl-sn-glycero-3-phosphoethanolamine-N-(lissamine rhodamine B sulfonyl) (16:0 Liss Rhod-PE, Avanti Polar Lipids) prior to dispersing via ultrasonication in the presence of a stabilizer, Synperonic F108 (at a lipid:stabilizer mass ratio of 10:1). The internal nanostructure of the cubosome dispersion was characterized using small angle X-ray scattering (SAXS) at the Australian Synchrotron (Kirby N M et al., 2013, *J. Applied Crystallography*, 46: 1670-1680). The X-ray energy was tuned to 13 keV at a camera-to-detector length of 1600 mm to acquire the scattering vector within a g-range of 0.01 to 0.6 $Å^{-1}$. Cryogenic transmission electron microscopy (cryo-TEM) imaging was undertaken at the Bio21 Advanced Microscopy Facility. Negatively stained grids were observed on a FEI Tecnai F30 instrument operated at 300 kV and equipped with a Gatan quantum 965 energy filter and an upper CETA 4k×4k CMOS camera. The Rhod-PE tagged cubosomes were dosed at 100 μg/ml (Tan A et al., 2019, "Self-Assembled Nanostructured Lipid Systems: Is There a Link Between Structure and Cytotoxicity?, *Advanced Science*, 6: 1801223) in culture medium and were introduced via channel C3 (stromal tissues) in the heterogeneous 3D tumor microenvironment for 24 hr of incubation.

Immunostaining

4% paraformaldehyde (PFA) was loaded within the channels to fixed microtissues in situ overnight at 4° C. Following fixation, devices were washed 3 times in 1×PBS, permeabilized in 0.5% Triton X-100 in PBS (PBST) containing 0.2% sodium azide for 1 hr and washed again with PBST, blocked with 2% Bovine Serum Albumin (BSA, A9418, Sigma-Aldrich/Merck) and 10% Goat serum (Gibco, 16210064, ThermoFisher Scientific) in PBST for 2 hours at room temperature. Samples were then incubated overnight to three days at 4° C. in a humidified chamber with mixed fluorescently-conjugated primary antibodies (cytokeratin 5-Alexa Fluor® 647, ab207352; CD31-Alexa Fluor® 647, ab215912; and cytokeratin 8-Alexa Fluor® 488, ab192467, Abcam), phalloidin (50 ug/ml, Sigma Aldrich P5282) and Hoechst 33342 (10 μg/ml) at a dilution of 1:100 in 2% BSA and 10% Goat serum in PBST. Samples were then washed 3 times in 1×PBS ready for imaging on an inverted fluorescence microscope and confocal microscope (LSM 710, Zeiss).

Imaging Analysis and Quantification

Brightfield and fluorescent images were taken from inverted motorized Z focusing on an Eclipse Ti-E Nikon microscope (Nikon, Japan). Measurement of vascular formation, cell invasiveness and tumor angiogenesis were performed using the edge of the microwells as the starting point by using Image J software. Cell invasiveness was defined by the cell migration ranges using a best-fit arc curve to fit and cover most of the cells in different days. In this cell invasive assay, migration distances were measured after 1 day and 6 days. The day 1 migration distance was subtracted from the day 6 migration distance to define the migration distance within a time period (5 days—see FIG. 5D, outer arrows). After defining the range of cell invasion, cell migration distances from five positions around the edge of the microwell boundary in different angles in each microwell were measured (see FIG. 5D).

The vascular tissue formation assay quantified the vessel network based on vessel width, length and numbers in the individual microwells (see FIGS. 4A-4G and FIGS. 6A-6F). Fluorescent images were taken in different thicknesses. The width of the vessels was measured from endothelial cells sprouting around the edge of the microwells. The length of the sprouting vessels was measured from the edge of the microwells to the end of the sprouting tip. The number of the vessels was measured as the vessel sprouting number from the microwells. The quantitative data were analyzed by Graphpad Prism 7.02 with 2-way ANOVA for multiple comparisons (Tukey's multiple comparison test) and Student's t-tests for two condition comparisons. The p-values under 0.05 were considered significant differences. The annotations indicated, ns=not significant, =P<0.01, **=P<0.0001.

Results

Culture Platform and Microfluidic Device Design

The cell culture platform design was based on the concepts of liquid phase separation, surface tension and gelling effect that was applied to different gels in contact hence allowing the formation of protrusions (microwells) extending from the polydimethylsiloxane (PDMS) pillars (microwell spacers) into the extracellular matrix (ECM gel). Cells can be seeded into each microwell from different sides of the platform, therefore it was possible to not only control the cellular environment of these cells (i.e. by co-culturing different cell types) but also regulating the biochemical and biomechanical properties of the ECM, which were given by the properties of the hydrogel.

Figure 3B:
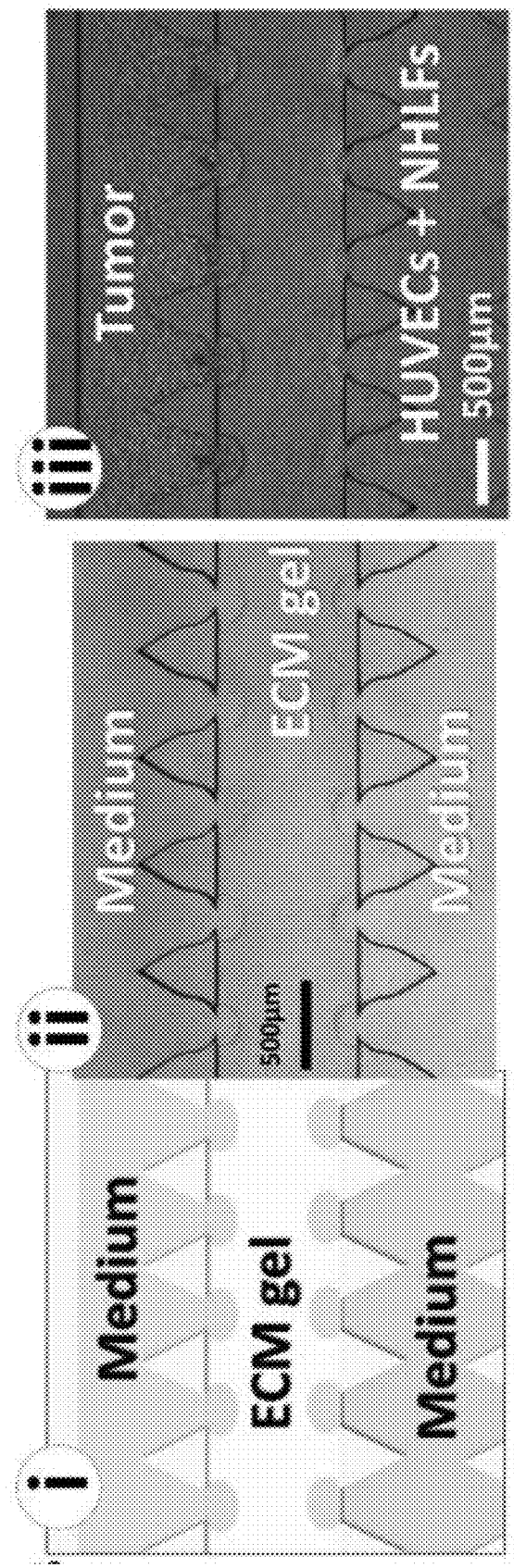
Figure 3C:
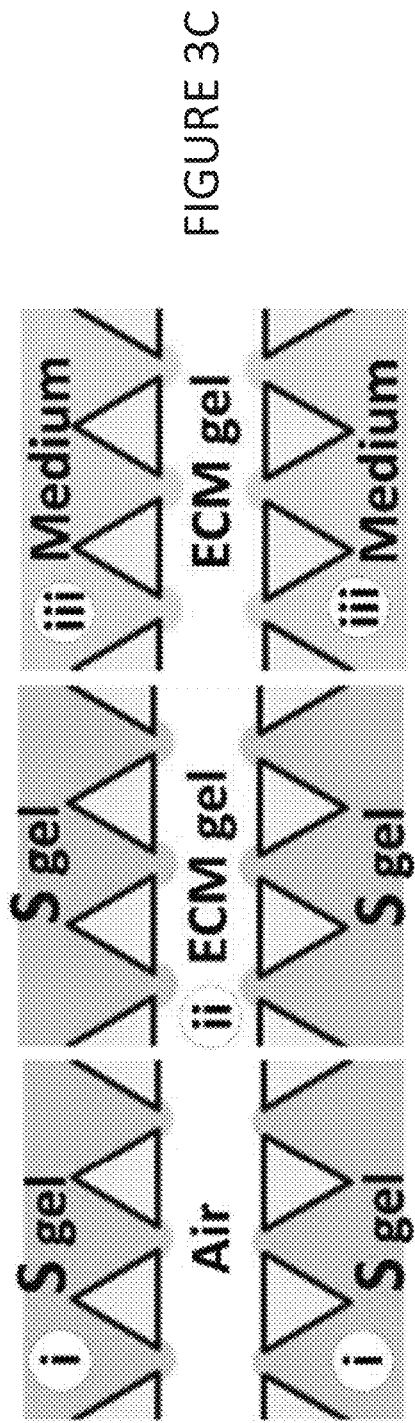

In order to achieve this, the design of the microfluidic device included a central channel (C2, FIG. 3A) and two side channels (C1 and C3, FIG. 3A) and one outer channel (C4, FIG. 3A), which were interconnected within the device but also surrounded by a sequence of PDMS pillars (microwell spacers) (FIG. 3A). When the sacrificed gel (S gel, liquid reversible) was loaded within the side channels (C1 and C3), the S gel was formed at room temperature and its surface tension together with hydrophobicity of the PDMS allowed the formation of air-gel interfaces (FIG. 3C, step i). After the liquid S gel was solidified, the central channel (C2) and the outer channel (C4) were loaded with the liquid from of a secondary gel (defined in this embodiment as the ECM gel), which consisted of either a spontaneous polymerization hydrogel (in this embodiment fibrin), or a thermosensitive hydrogel (collagen or Basement Membrane Extract), wherein the gelling characteristics of each type of hydrogel were different from the S gel (in this case irreversible polymerized ECM gels were used, FIG. 3C, step ii).

When the ECM gel was cured by thermal sensitive gelling (Matrigel and collagen) and spontaneous polymerization (fibrin), the direct contact interface between the S and ECM gels led to the formation of a microwell within the ECM gel, which occurred due to the swelling of the already formed S gel in the precursor solution of the ECM gel before its solidification (FIG. 3C, step ii). Finally, given that the S gel can be liquefied again due to its reversible gelling properties (i.e., by temperature), raising the temperature of the whole system allowed the removal of the S gel and its replacement with culture medium or a new third hydrogel containing the cells of interest (FIG. 3C, step iii). In this last case, the seeding of cells within microwells was facilitated by placing the device in a vertical position for 10-30 mins to allow the cells to settle within the microwells (FIG. 3B).

Overall, this system presented a number of beneficial characteristics, including but not limited to: (i) Microwell shaped gel-gel interfaces of different sizes and spatially integrated within ECM gels; (ii) Round shaped hydrogel-wells integrated into a microfluidic chamber that allowed cells to form micro-tissues in a well-controlled extracellular matrix (i.e. hydrogel); (iii) Seeding of single cell types and mixed cell types inside or outside microwells; (iv) Dynamic change of cell culture medium and introduction of flow within the system; and (v) Addition of drugs for cell culture, drug treatment, and drug screening.

Therefore, the design of the microwells integrated within the microfluidic device and the different ECM gels at each side of the channels permits the precise 3D control of environmental cues that are required for the formation of polarized micro-tissues (including spheroids and organoids) and the establishment of interactions between different cell types within the ECM. In effect, the culture platform and device enables the formation of spheroids in situ as opposed to existing systems which require formation of the spheroid separately and then introducing the formed spheroid into the system.

Figure 3D:
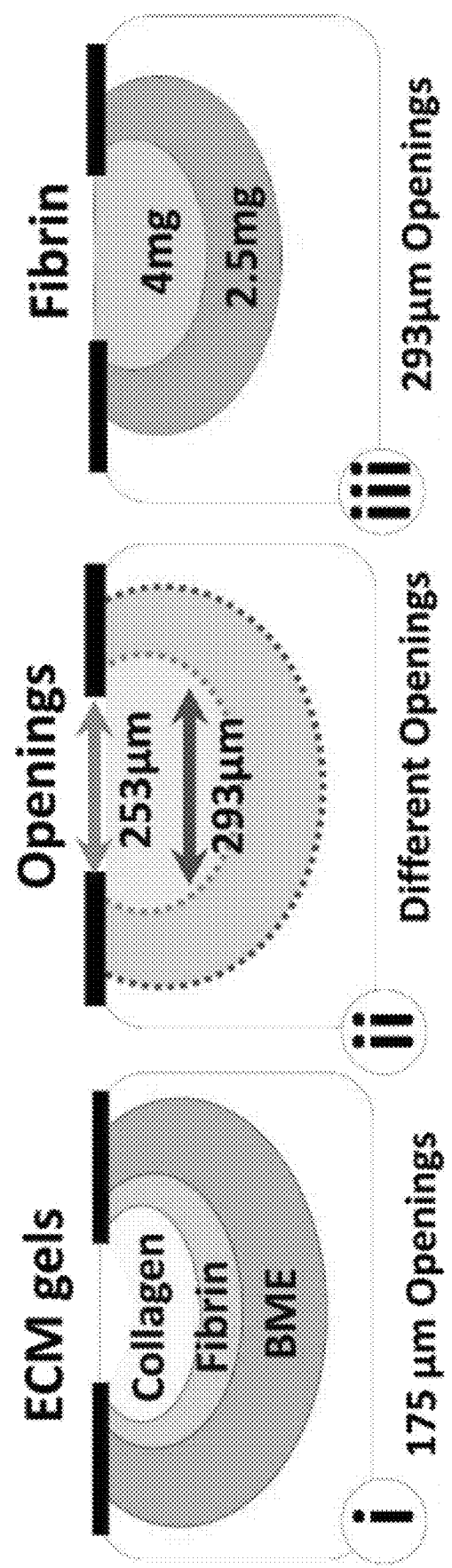
Figure 3E:
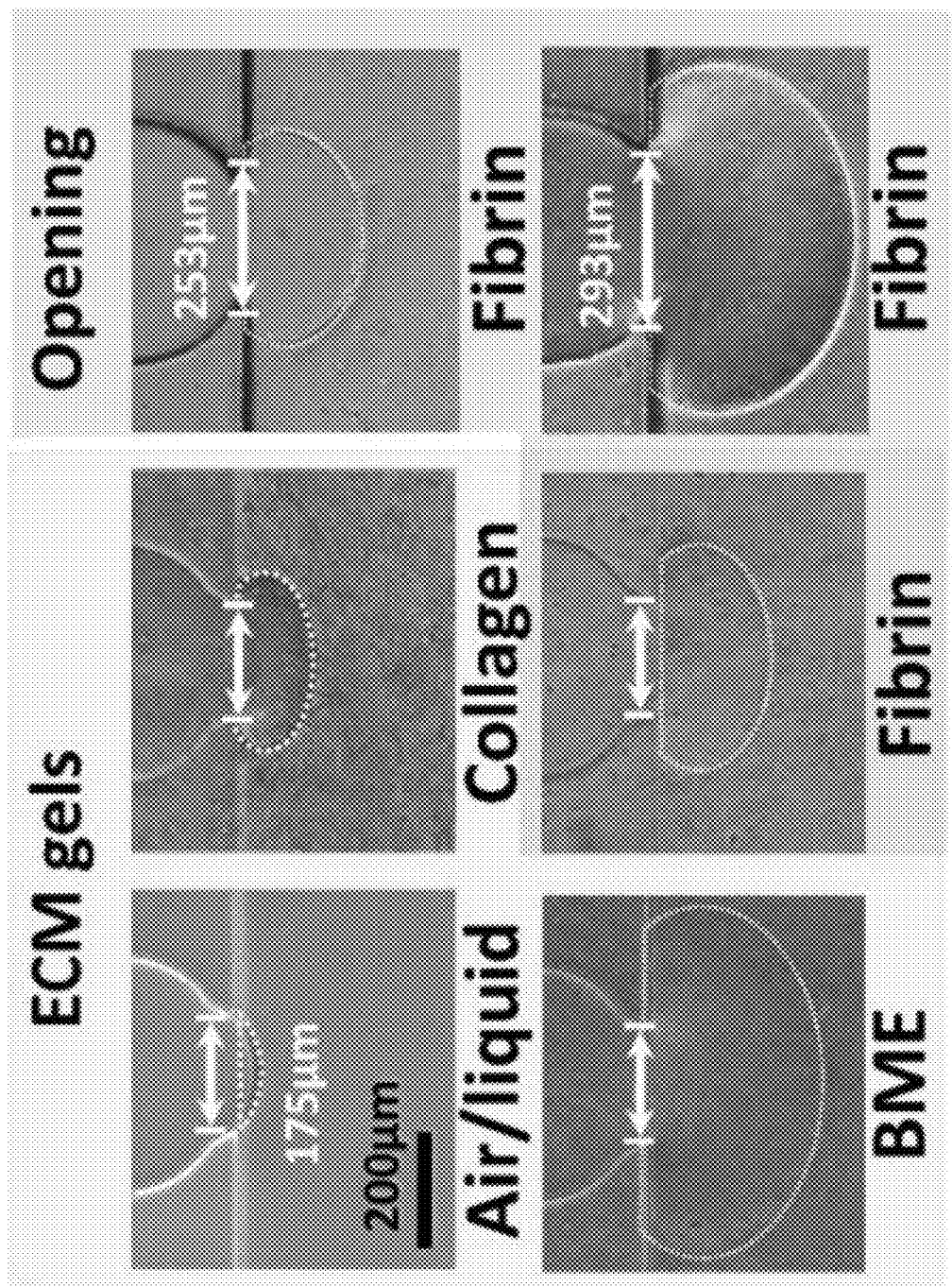
Figure 3F:
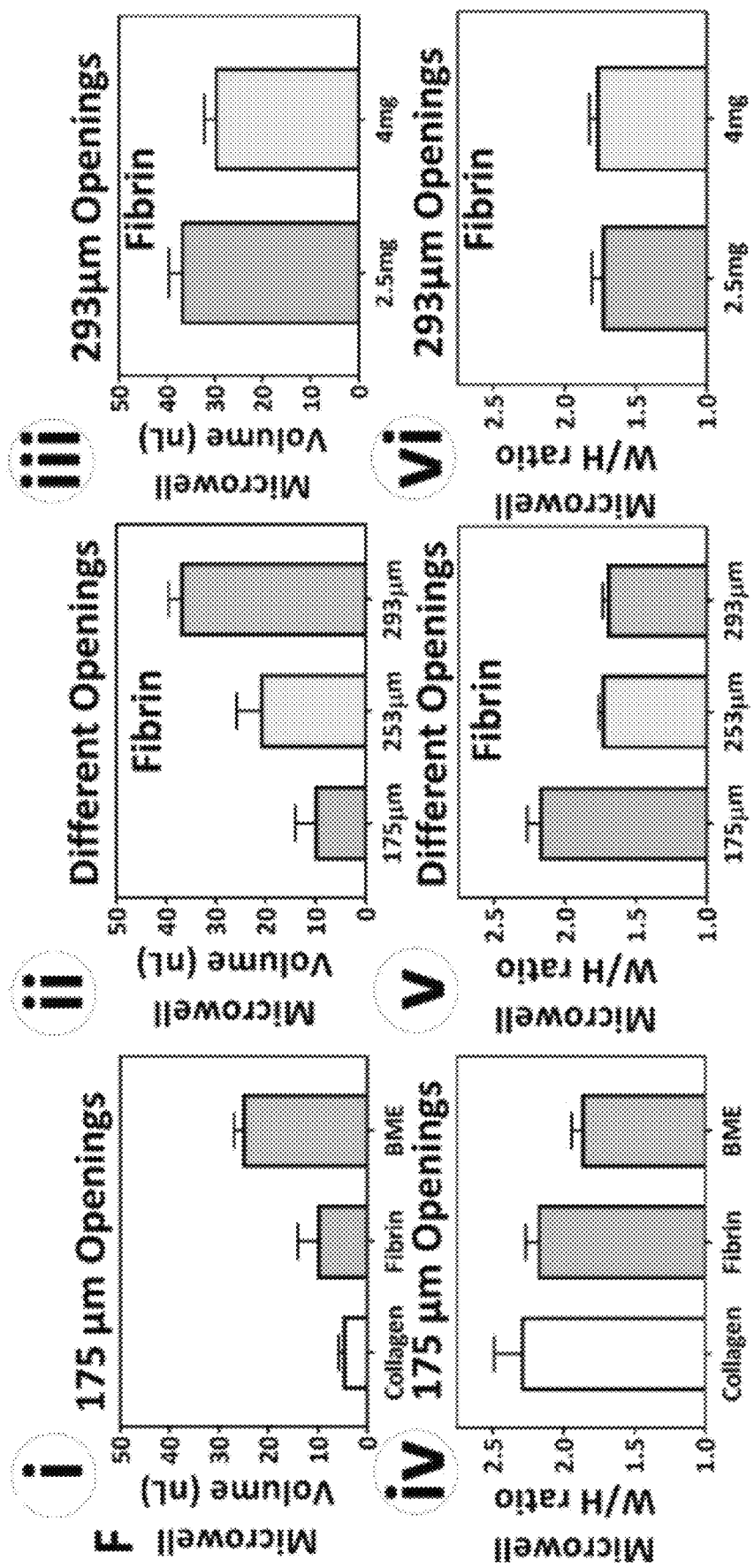

As mentioned above, the sequential order of addition and gelation of the S gel, addition and curing of the ECM gel, and liquefaction of the S gel, led to creation of microwells. The microwell size was defined by: (i) the differential gelling effect between the two gels (S and ECM gel) that are put in contact with each other, since water molecules inside the ECM gel diffuse through the pre-gelled S gel causing further gel swelling (FIG. 3D, ECM gels, FIG. 3E, 175 µm, air-liquid, Collagen, BME and Fibrin; quantifications in FIG. 3F, i and iv); (ii) the space between PDMS pillars (microwell spacers) (FIG. 3D, openings, and FIG. 3E, Fibrin, 175 µm, 253 µm and 293 µm; and quantifications in FIG. 3F, ii and v); and (iii) the concentration of the ECM gels (FIG. 3D, fibrin, 2.5 mg/ml, 4 mg/ml; quantifications in FIG. 3F). In this study, fibrin was used as ECM gel due to its mechanical stability for better maintaining and keeping the scaffold from collapsing during tissue formation. However, when cells were cultured on collagen, the collagen was easily deformed.

Applications

Channeled microwells presented the advantage of being suitable for the creation of multiple (8 to 10 depending on the number of microwells but easily scalable to more) micro-tissue units formed by one or more different cell types integrated in a well-defined ECM. This is confirmed below with the successful implementation for the following different types of micro-environmental conditions: (i) stroma and vascular tissue formation; (ii) cancer cell invasion and tumor angiogenesis; and (iii) cell-particle interactions.

(i) Stroma and Vascular Tissue Formation

Figure 4A:
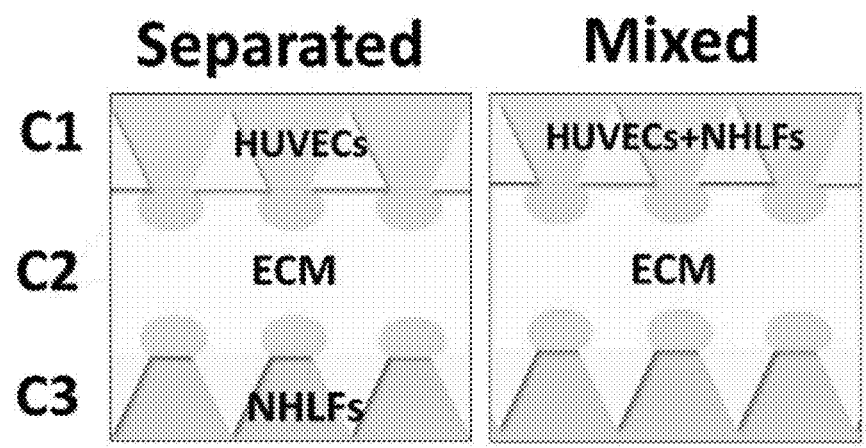
FIGS. 4A-4G—shows stroma and vascular tissue formation in an embodiment of the culture platform of the present invention. HUVECs and NHLFs (in separated or mixed culture) were seeded in channels C1 and C3 for observing differences in tissue formation. Figure A: Seeding of cells in channels.
Figure 4B:
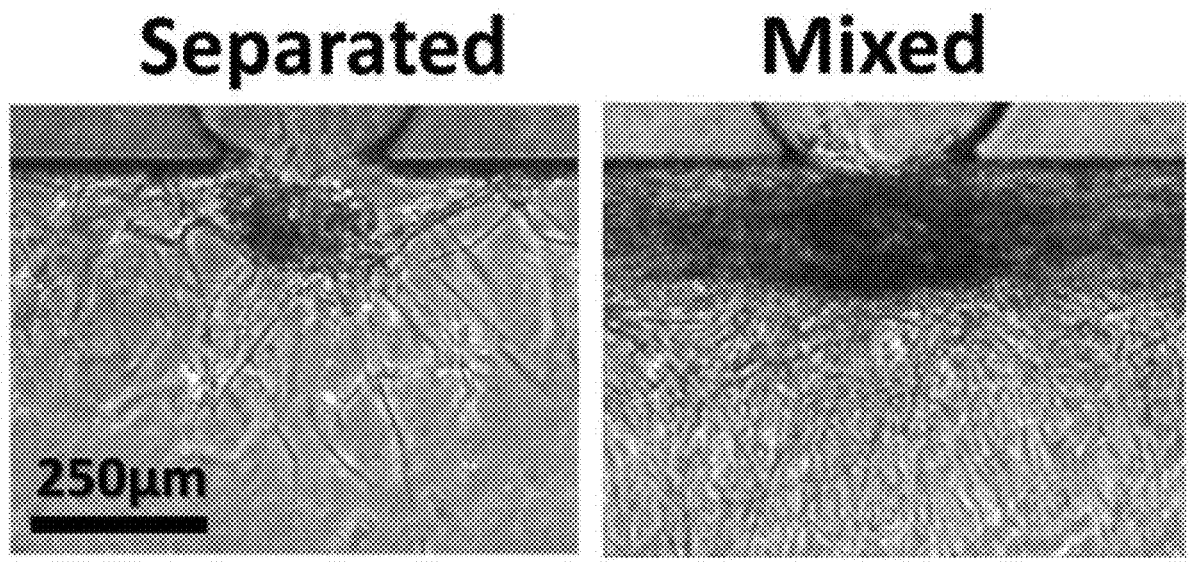
Figure 4C:
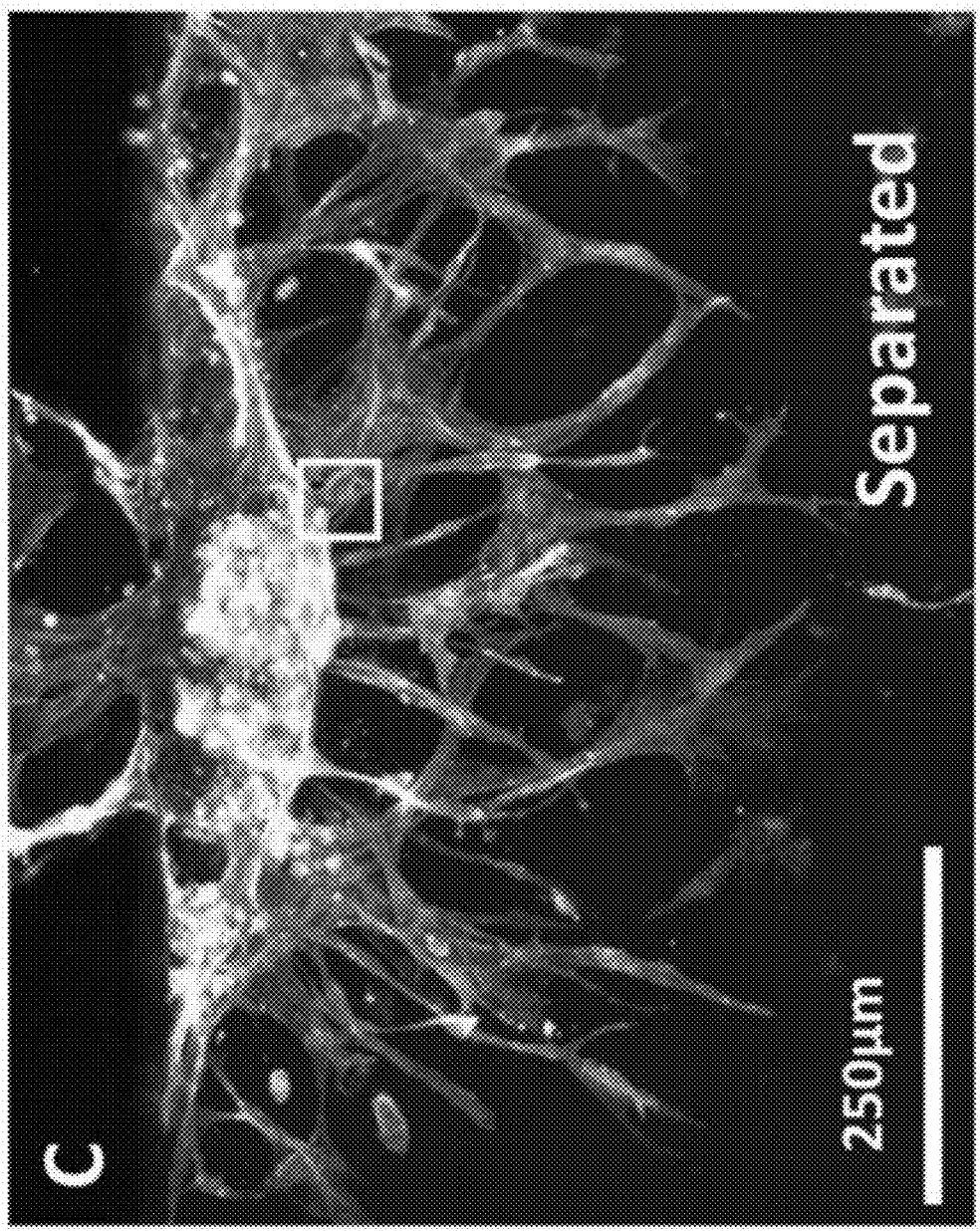
Figure 4D:
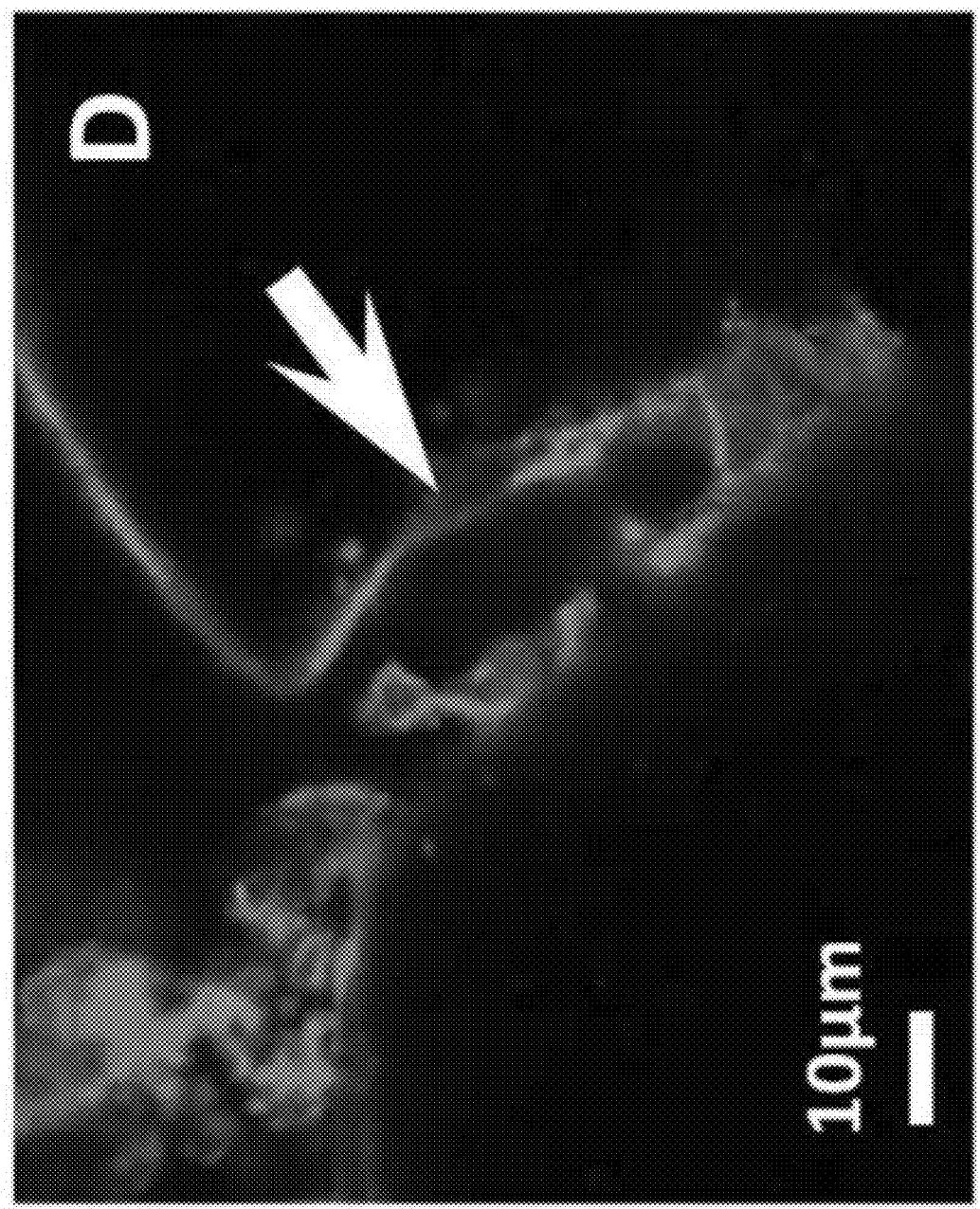
Figure 4E:
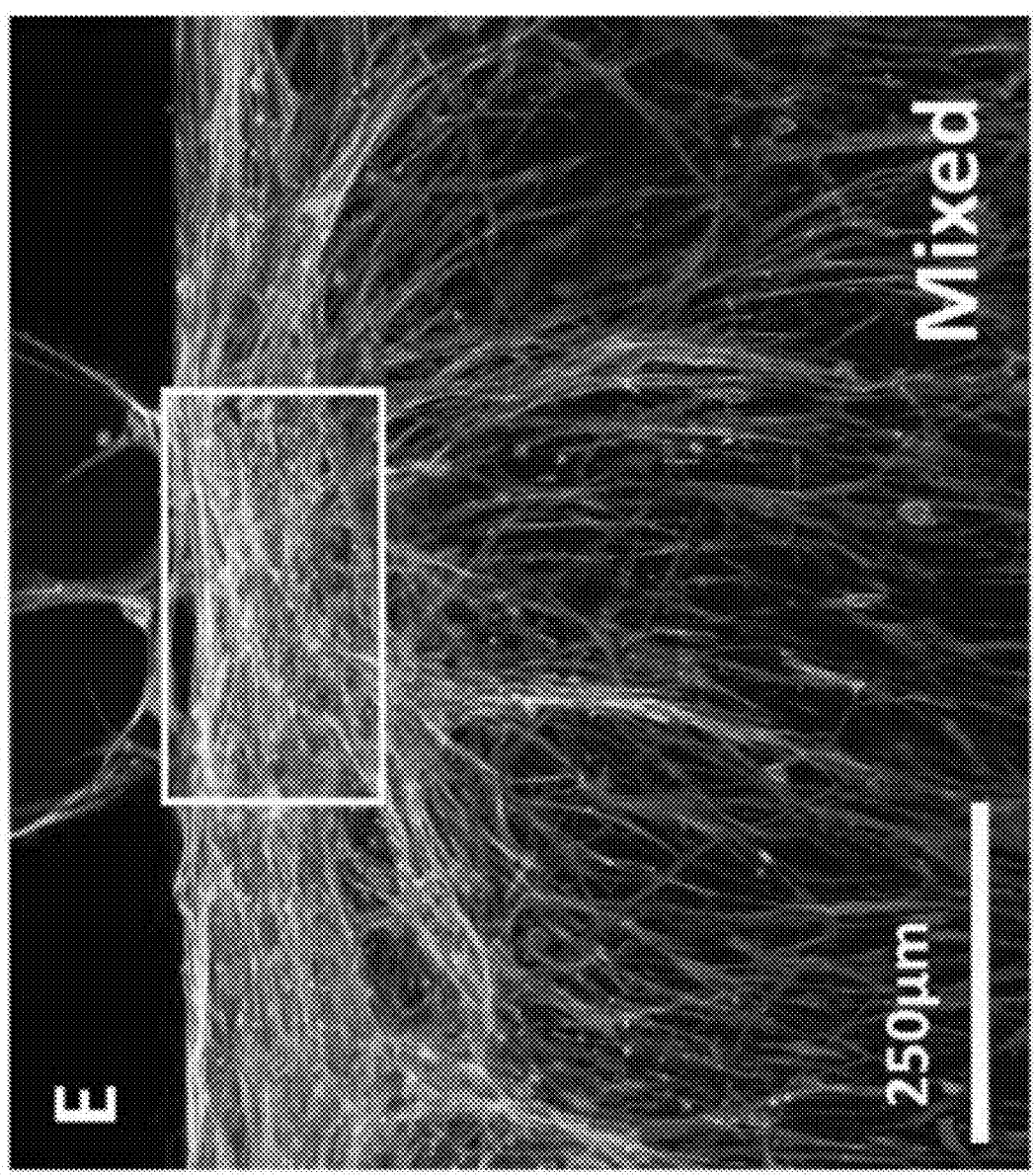
Figure 4F:

To recapitulate stroma-like micro-tissue in vitro and study how the microenvironment impacts on the capacity of endothelial cells to form vascularized networks, human lung fibroblasts (NHLFs) and human umbilical vein endothelial cells (HUVECs) were co-cultured within the microfluidic device and 4 days post-seeding analyzed how these cells organize and interact within the microwell-shaped hydrogel interfaces (FIG. 4A and FIG. 4B). For these studies, two methods were used that allowed the study of different cell behaviors within the microfluidic device: The first method was "separated culture"—on which HUVECs and NHLFs cells were separately seeded in two different channels (i.e. C1 and C3, Separated, FIG. 4A, top, HUVECs, and FIG. 4B left) and "mixed culture"—the mixture of two types of stromal cells (HUVECs and NHLFs) co-cultured on the same channel (i.e. C1, Mixed, FIG. 4A, top HUVECs and NHLFs, and FIG. 4B right). Only a small fraction of HUVEC sprouts can be found in the separated condition with these sprouts having a hollow shaped structure characteristic of vascular channels (FIG. 4C and FIG. 4D). In contrast, using the mixed cell co-culture method (FIG. 4E and FIG. 4F) a large network of in vivo-like vascular channels was observed when compared to the separate co-culture method.

Figure 4G:
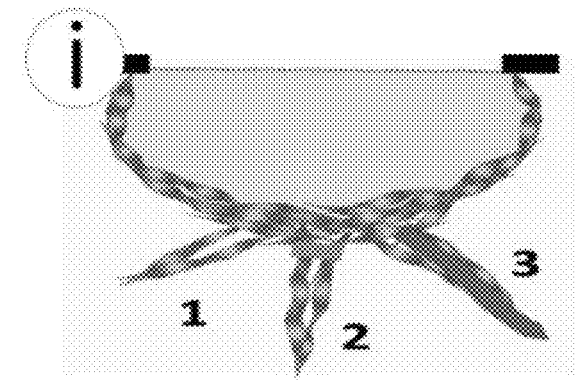
Figure 4G:
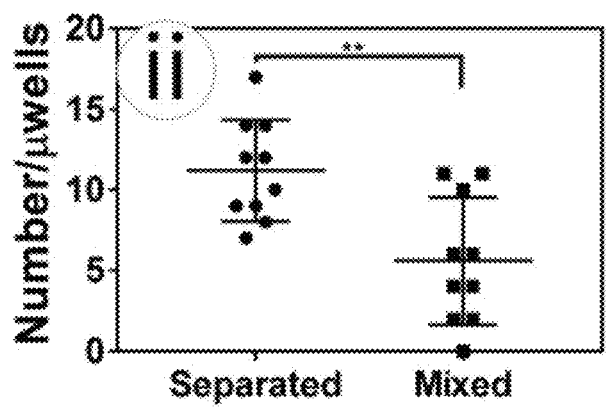
Figure 4G:
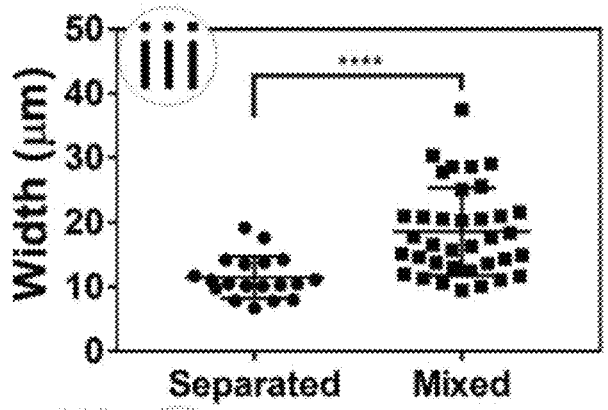
Figure 4G:
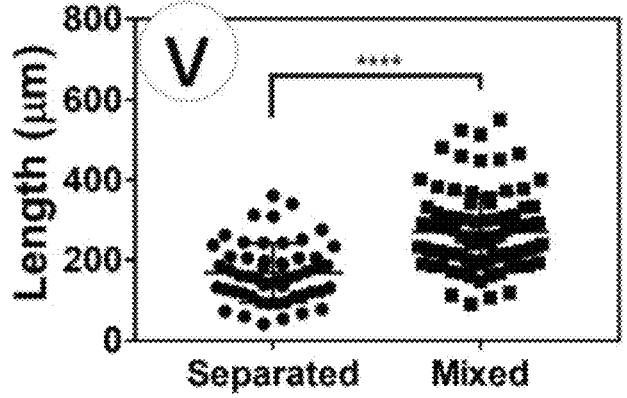

The phenotype of vasculature originating using these two methods was further assessed quantitatively by examining the morphological differences between them including the number, width and length of the observed vessel like structures (FIG. 4G). The separated cell culture (FIG. 4C, separated, quantifications in FIG. 4G) showed HUVECs sprout more often from the microwells, but these sprouts were smaller in width and shorter in length when compared to the mixed co-culture conditions (FIG. 4G, mixed, quantifications in FIG. 4G). Altogether, these results suggested that under these conditions, NHLF cells contributed significantly to the migration of HUVECs for the sprouting and downstream formation of vascular network structures.

(ii) Cancer Cell Invasion and Angiogenesis

Next, the device was used to better mimic breast tumor microenvironments which are composed of complex ECM and populated by a variety of cell types, including both stromal and tumor cells. More specifically, this system was used to study breast cancer cell invasion and tumor angiogenesis, two hallmarks of aggressive solid cancers historically difficult to treat and manage.

ER+PR+Her2 luminal subtype (MCF-7) and ER−PR−Her2-basal subtype (MDA-MB-231, hereafter referred as MDA) breast cancer cells were chosen to culture within this device to represent the spectrum of breast cancer experienced by patients. In addition, the combination of cancer cells with and without the presence of fibroblasts and HUVECs better reflected the complexity of bona fide breast tumor microenvironments.

Invasion Analysis

Figure 5A:
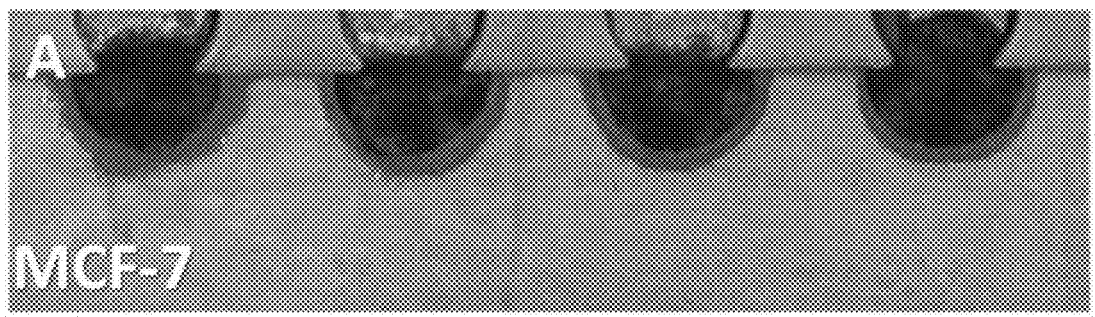
FIGS. 5A-5H—cancer cell migration assay. Tumor cells were grown within the microwells at the liquid-gel interface and cultured for 6 days with the migration distance after 1 day and 6 days of culture measured.
Figure 5B:
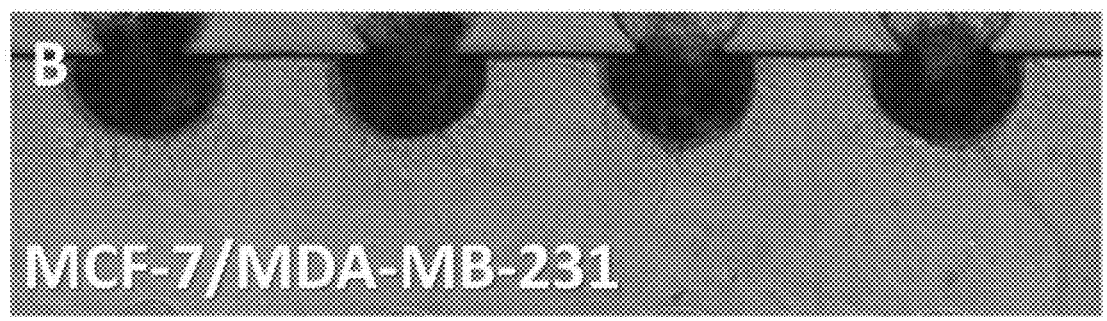
Figure 5C:
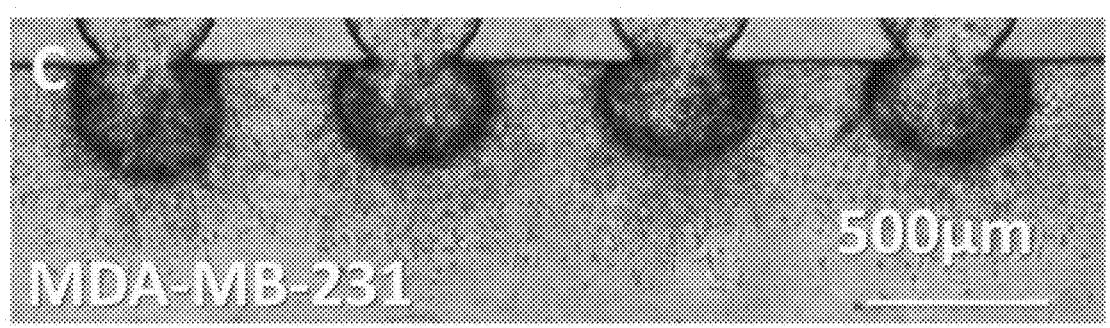
Figure 5D:
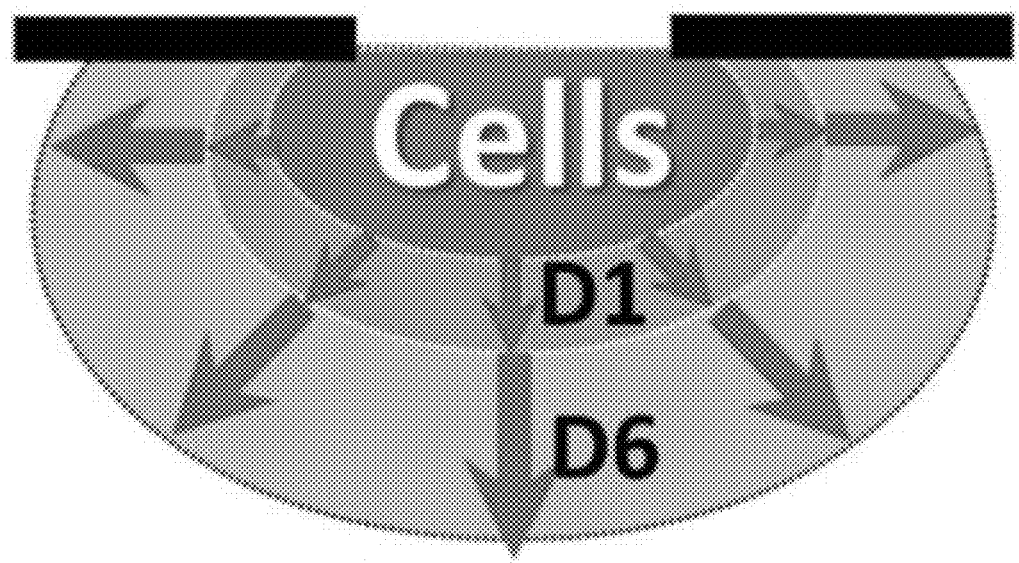
Figure 5E:
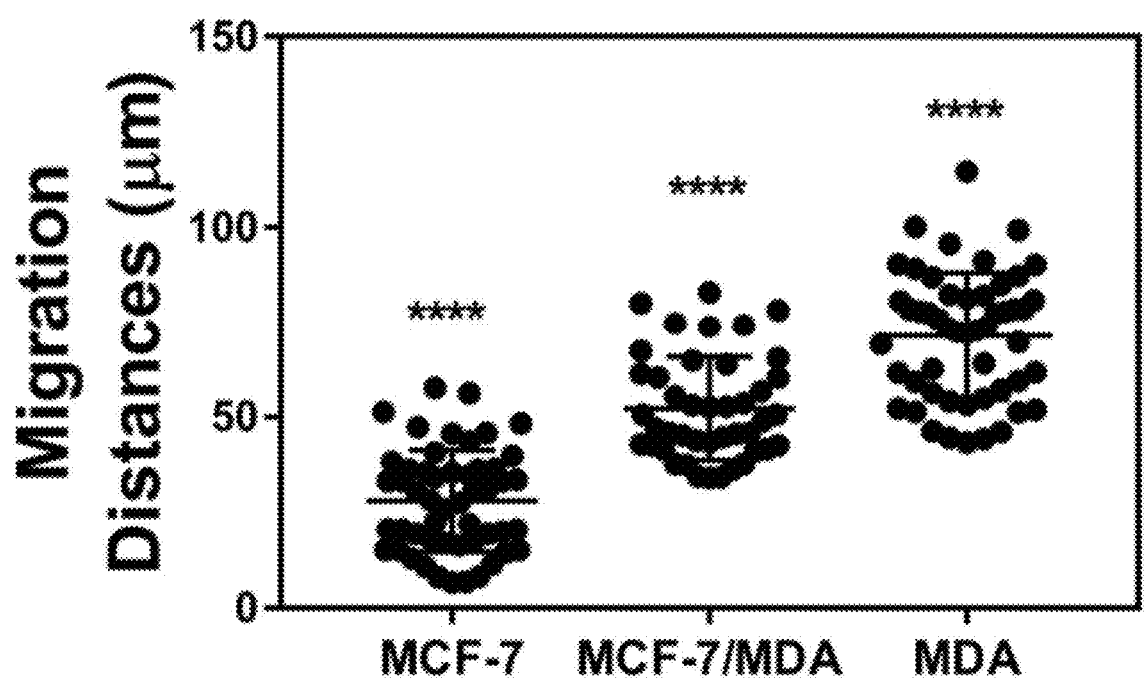
Figure 5F:
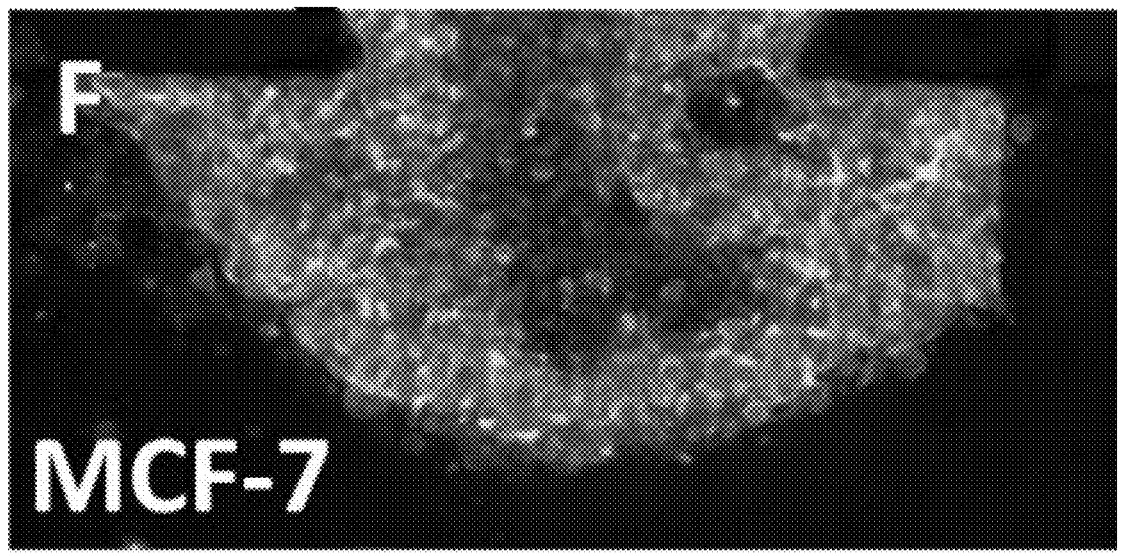
Figure 5G:
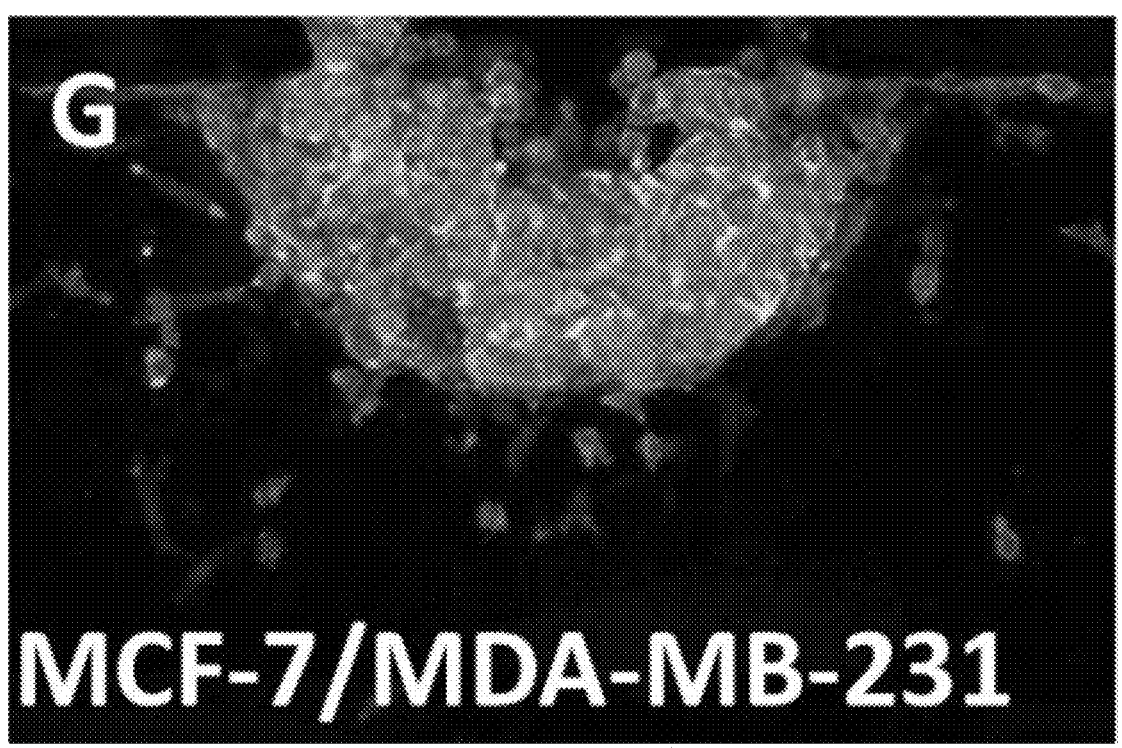
Figure 5H:
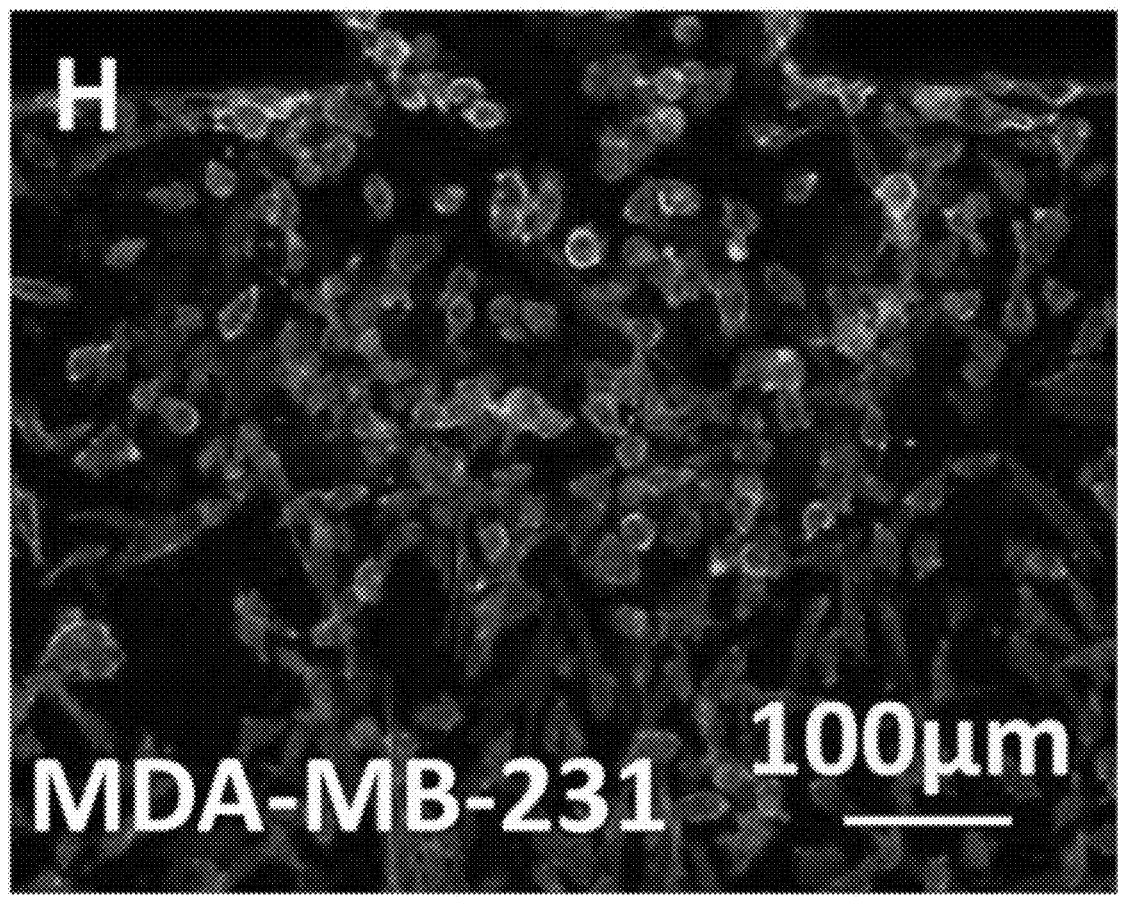

First, tumor cells were assayed only within the microfluidic platform. In this approach, tumor cells were grown within the microwells at the gel-gel or liquid-gel interface and cultured for 6 days (FIGS. 5A-5H). Images were taken at day 1 and day 6 after seeding in the system and superimposed (FIGS. 5A-5H). The invasiveness of cancer cells within the ECM gel was determined by measuring the migration distance front 1d to 6d from the microwell (FIG. 5D, outer arrows). In agreement with the nature of these cells, MCF-7 cells did not invade the ECM gel (FIG. 5A and FIG. 5F), but by contrast, MDA-MB-231 cells were significantly more efficient in invading and migrating within the ECM gels (FIG. 5C and FIG. 5H). When loading both cell types within the microwells, the mixture exhibited the two types of behavior (invasive and non-invasive) with the invasiveness of the MDA cells significantly reduced by the presence of MCF-7 cells (FIG. 5B and FIG. 5G).

Tumour Angiogenesis and Immunostaining Analysis

Figure 6A:
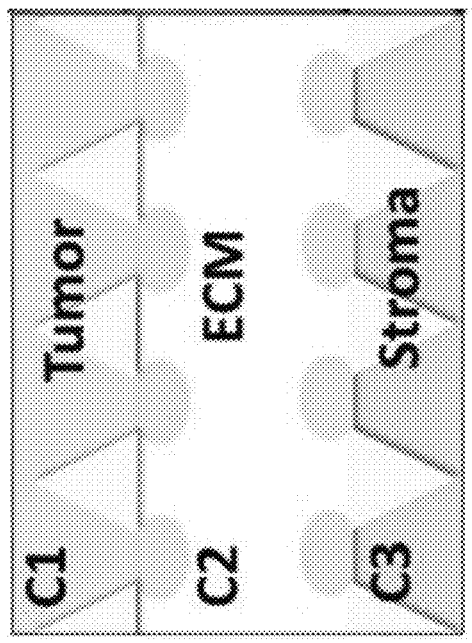
FIGS. 6A-6F—tumour angiogenesis models. The heterogeneic tumor microenvironment was created by co-culturing different types of cancer and stroma cells. Solid (MCF-7), mixed (MCF-7/MDA-MB-231) and metastatic (MDA-MB-231) tumor models were generated.
Figure 6B:
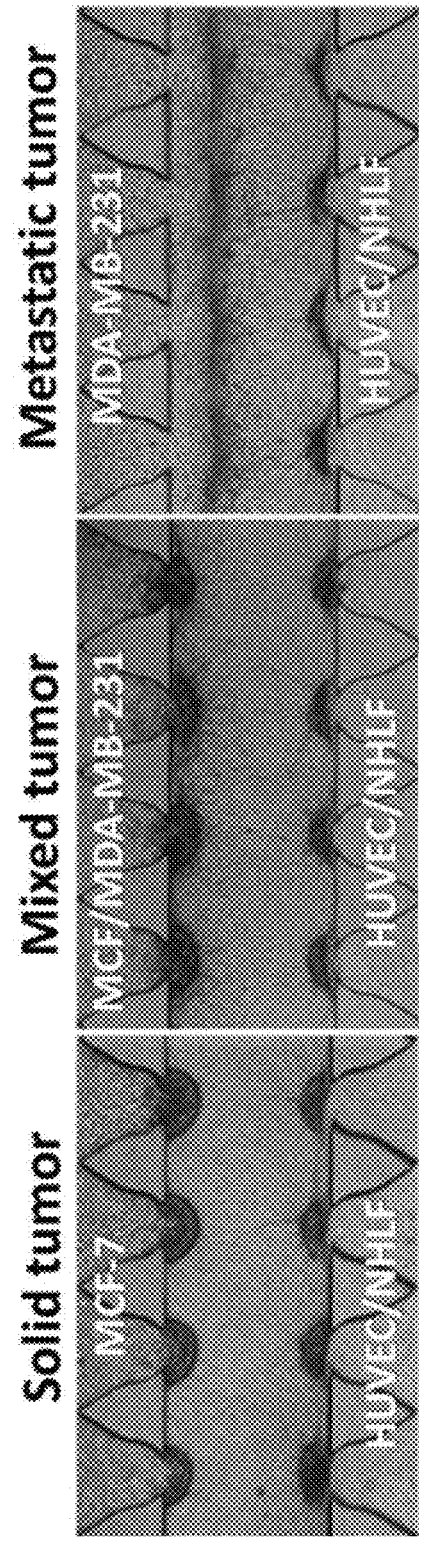

The above two different types of breast tumors were then analyzed for their ability to induce angiogenesis by culturing cancer cells and a mixture of HUVEC+NHLF cells within C1 and C3 of the microfluidic device, respectively (FIG. 6A and FIG. 6B). With this configuration, different (tumor vs non-tumor) cells were initially separated by the ECM gel (C2), permitting the analysis of endothelial and tumor cells migration as well as the formation of vascular network structures within the ECM gel (FIG. 6A and FIG. 6B). The results indicated that the extent of tumor angiogenesis was directly associated with the type and ratio of cancer cells (FIG. 6C).

Figure 6C:
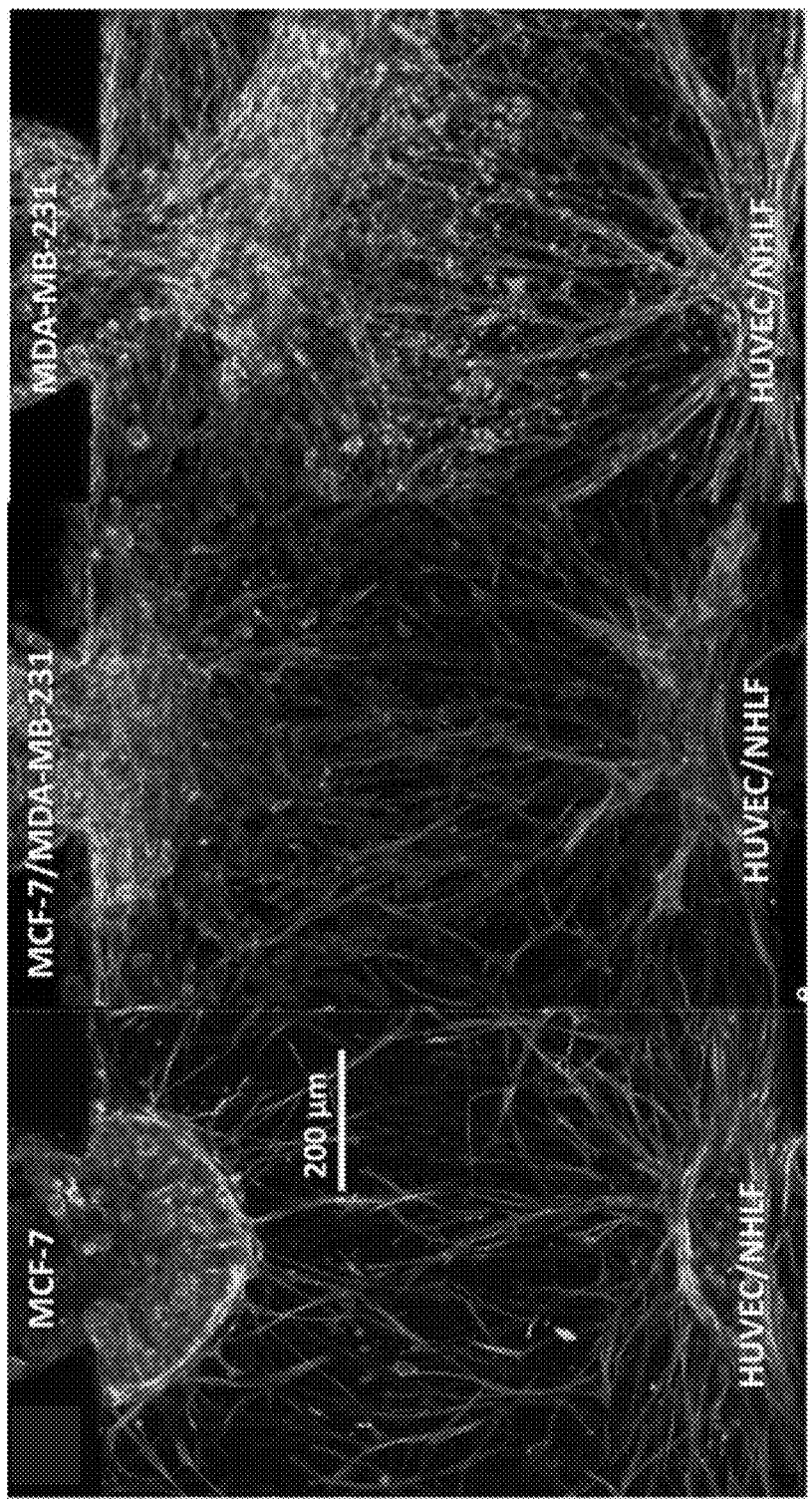
Figure 6D:
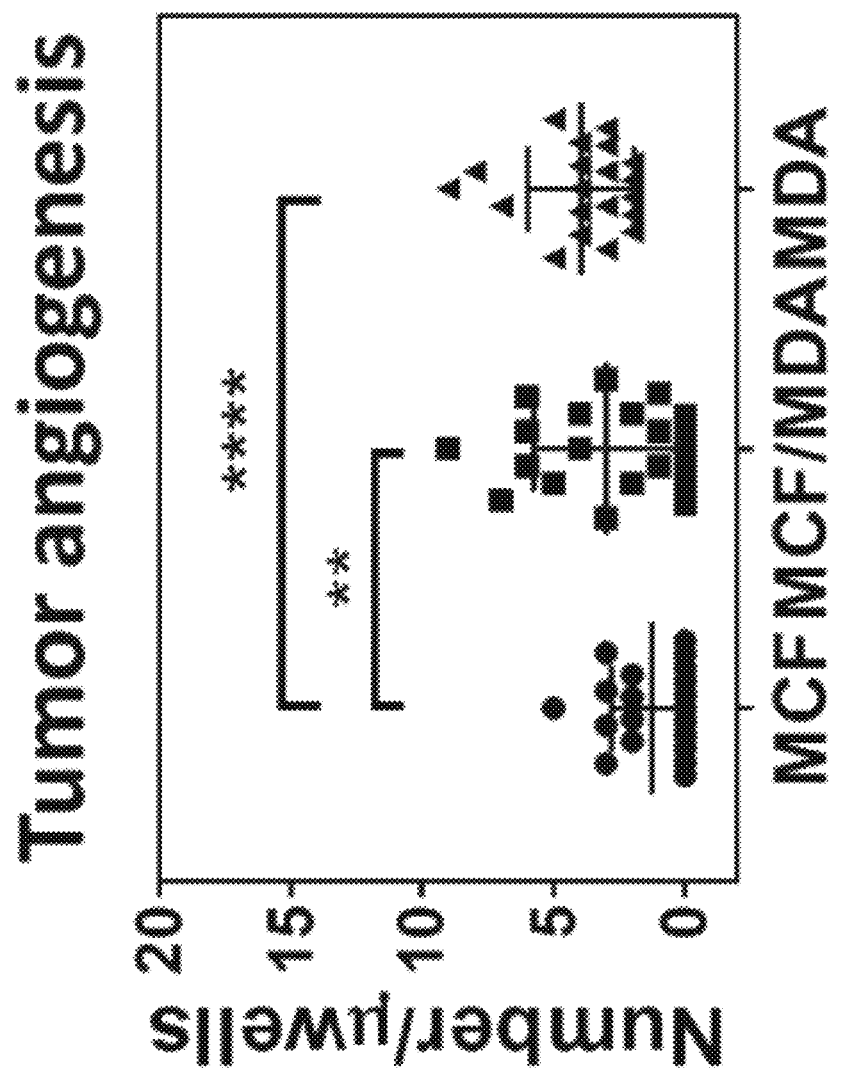

MCF-7 cells seeded within the microwells appeared to form epithelial-like structures and remain largely in a confined area around the microwells (FIG. 6B, solid tumor and FIG. 6C, left, MCF-7 on top). In contrast, the metastatic MDA cancer cells exhibited more invasion, adhered in the ECM gel and further formed cell sheets that extended beyond the limits of the microwells. These cells also cooperated with the NHLF cells and induced tumor angiogenesis (FIG. 6B, metastatic tumor, FIG. 6C, right). Finally, in the mixed tumor model (1:1 ratio of MCF-7/MDA), cancer cells showed solid and metastatic phenotypes (FIG. 6B, mixed tumor, FIG. 6C, middle). Moreover, the MCF-7 tumor model revealed mild tumor angiogenesis when compared to mixed and MDA tumor models (FIG. 6D), which exhibited the highest levels of angiogenesis.

Figure 6E:
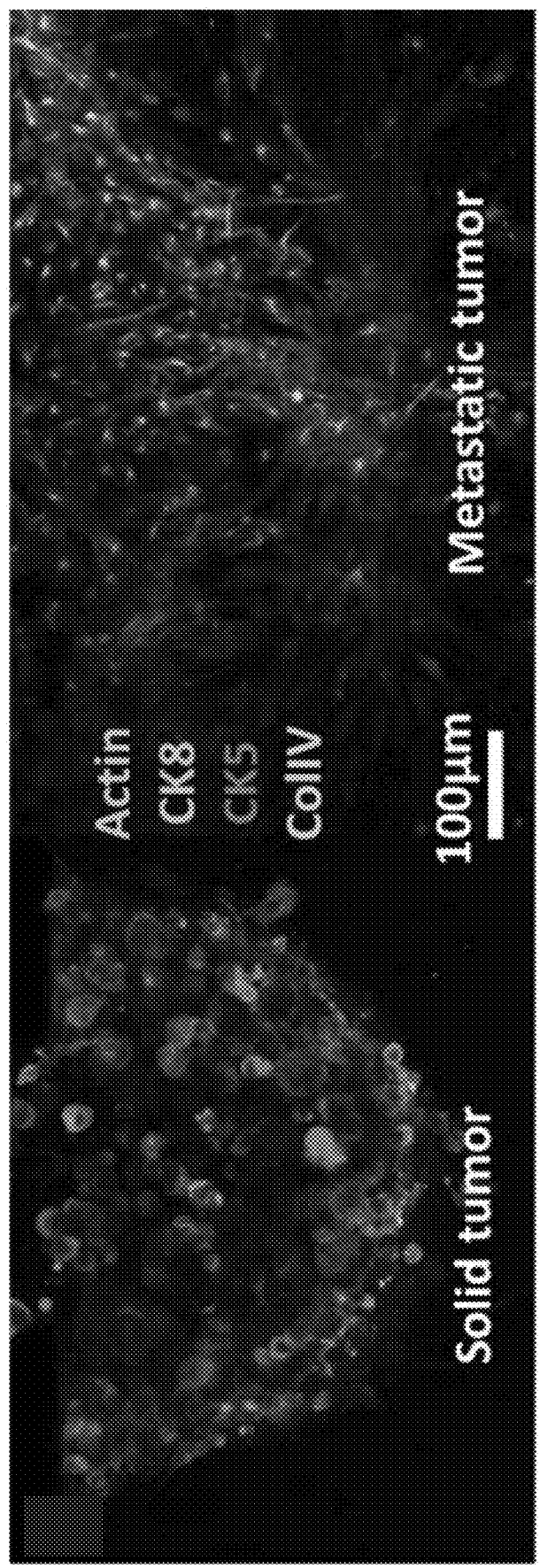
Figure 6F:
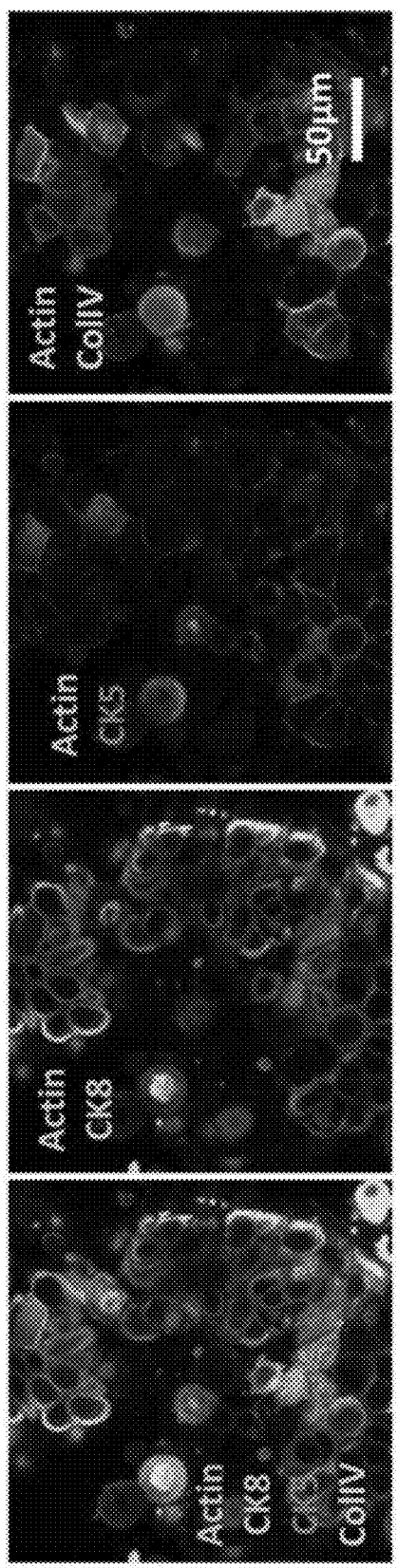

Altogether, these results show that this platform can directly integrate cancer cells and stromal cells in microenvironments. However, the usefulness of the platform is not limited to the formation of spheroids or other types of cell aggregates of tumor cells but may also be used to develop tumor angiogenesis and tumor invasiveness models, which are strongly correlated with the invasiveness of cancer cells. This last conclusion is further supported by characterization of tumors by immunofluorescence, which results show that in a solid tumor model (MCF-7) the expression of cytokeratin 5 (CK5) (FIG. 6E, left image, and FIG. 6F, red) was concentrated in specific cells and cytokeratin 8 (CK8) (FIG. 6E, left, green) showing high expression in the cell-matrix interface. In contrast, the metastatic model showed no expression of cytokeratin 5 (FIG. 6E, right; red), but random distribution of cytokeratin 8 (FIG. 6E, right; green). These immunofluorescence results were similar to those previously reported with MCF-7 cells forming differentiated microtissues (Vantangoli M M et al., 2015, *PLoS One*, 10(8) e0135426. doi:10.1371/journal.pone.0135426) and breast cancer cells embedded in gel culture.

(iii) Cell-Particle Interactions

Figure 7A:
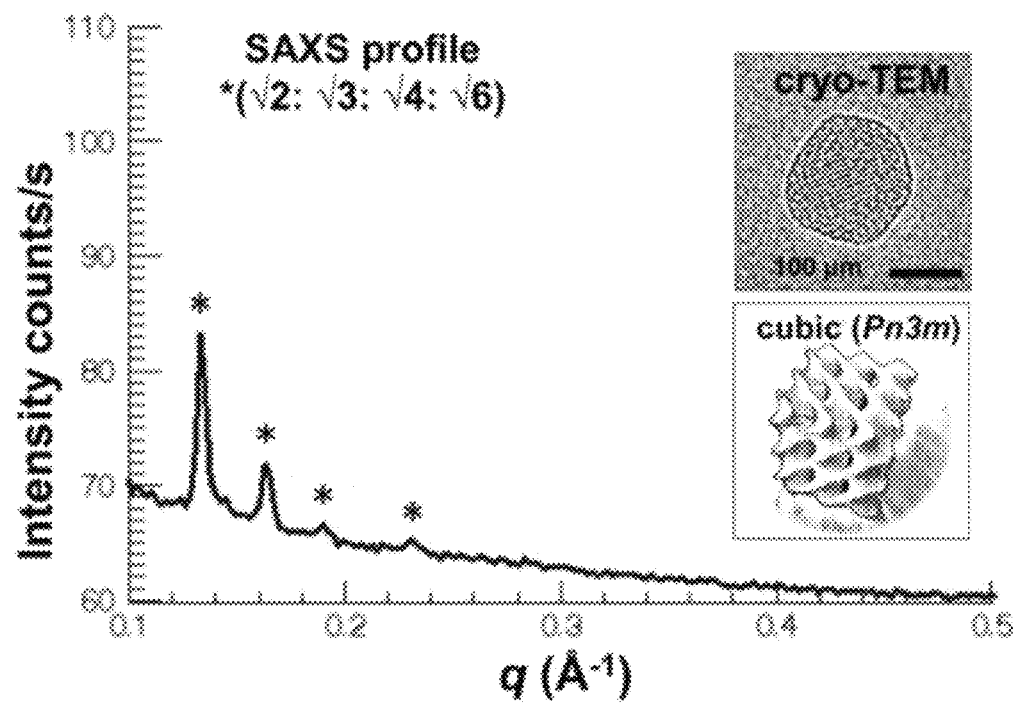
FIGS. 7A-7J—cell-particle interactions in solid and metastatic tumour models.
Figure 7B:
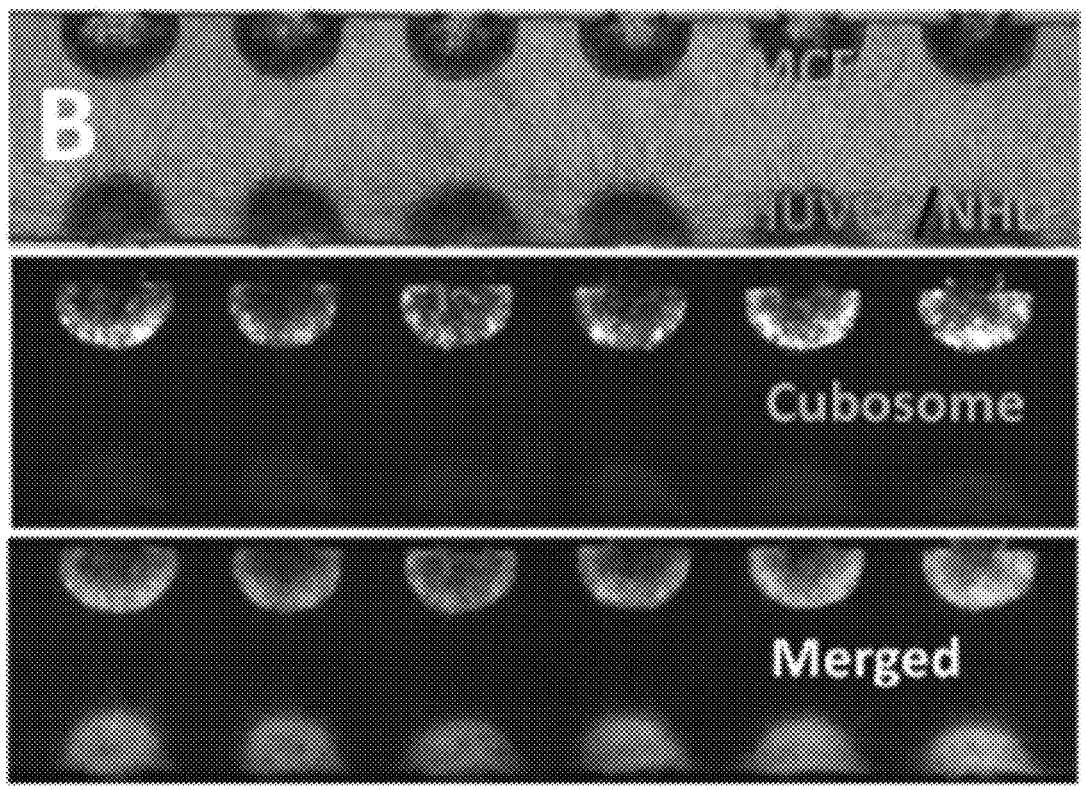
Figure 7C:
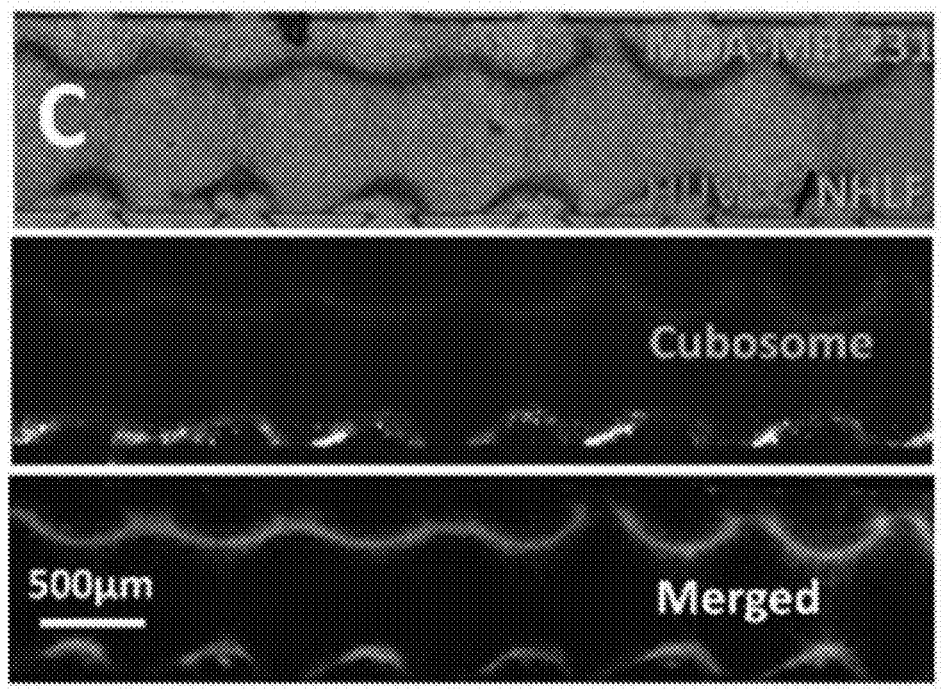
Figure 7D:
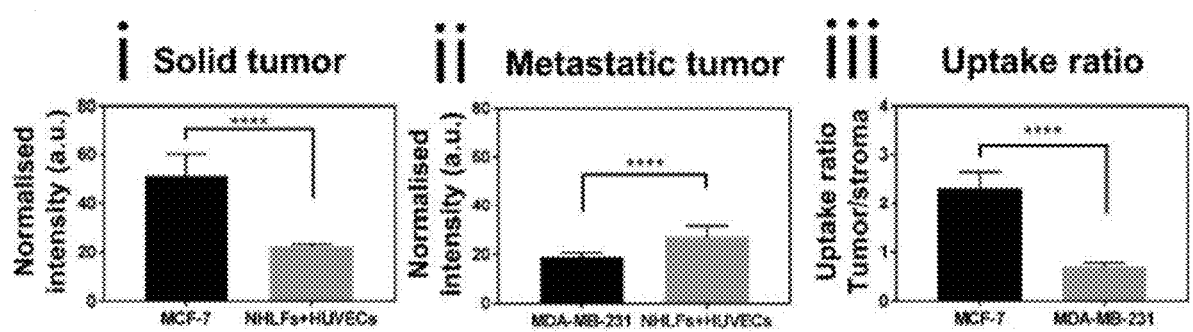
Figure 7E:
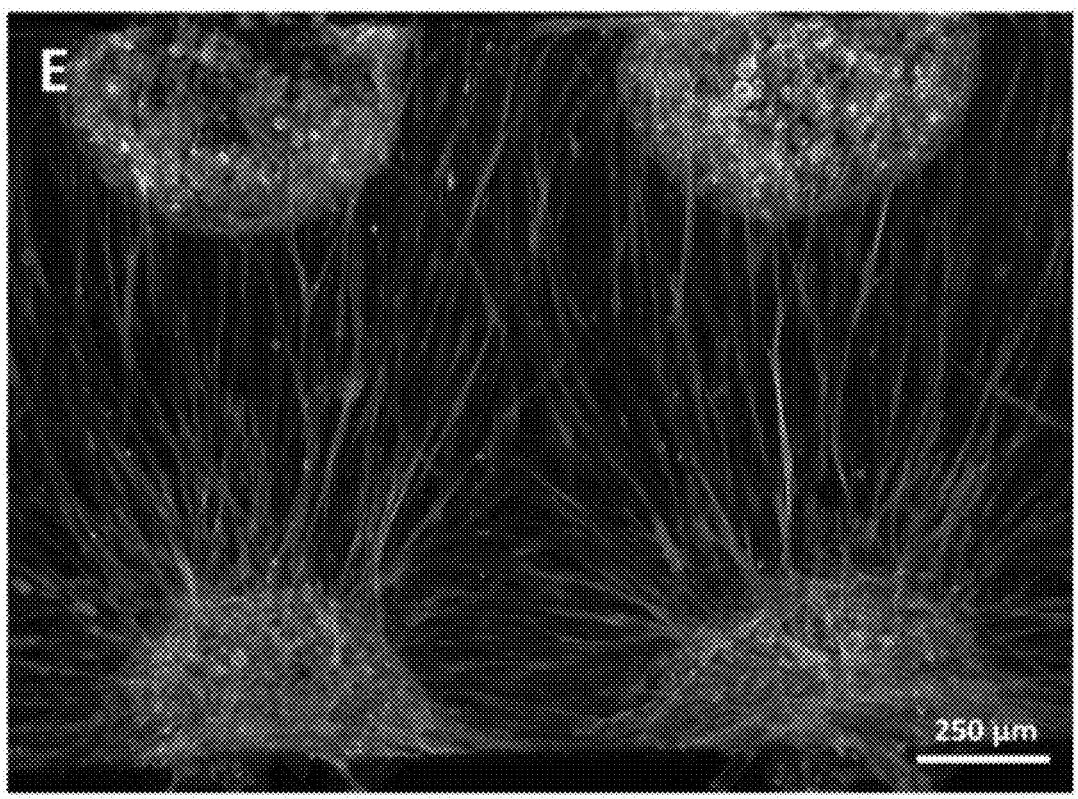
Figure 7F:
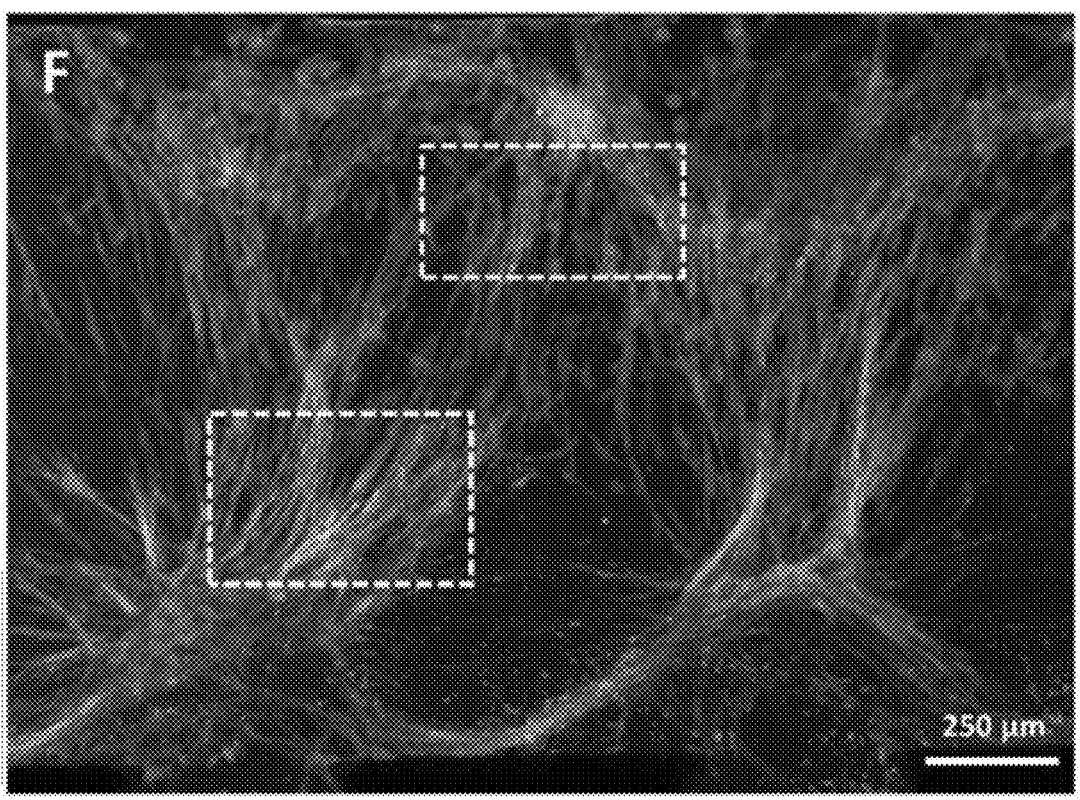
Figure 7G:
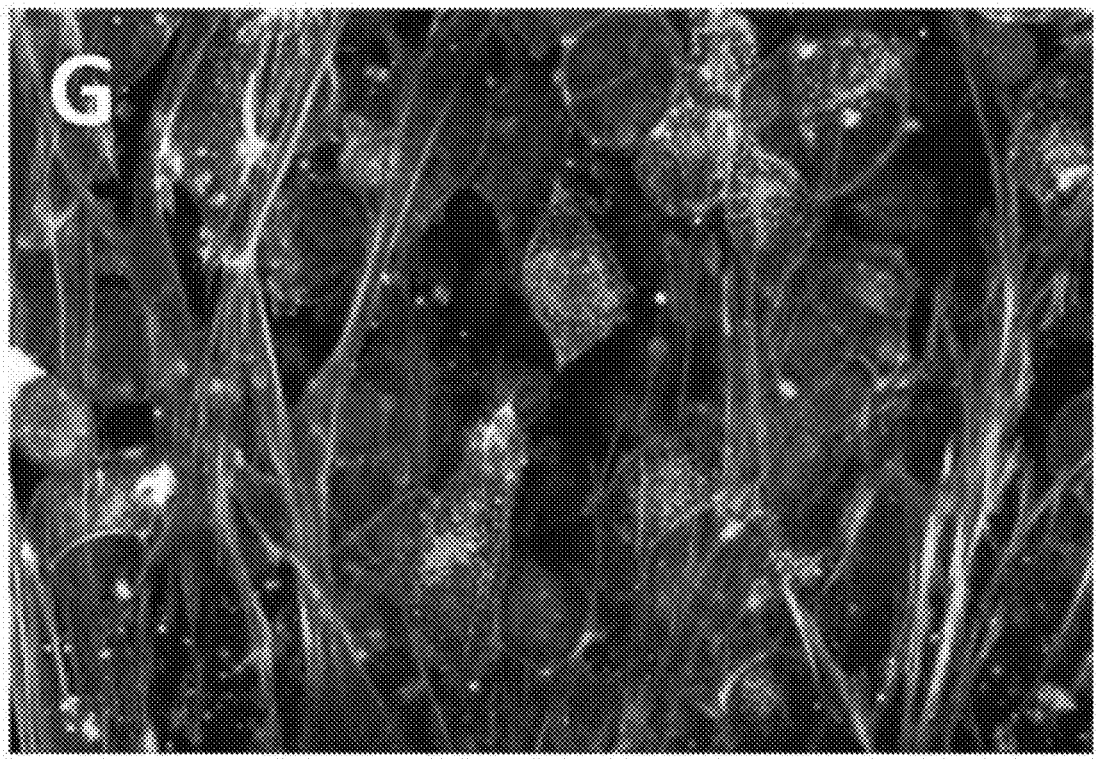
Figure 7H:
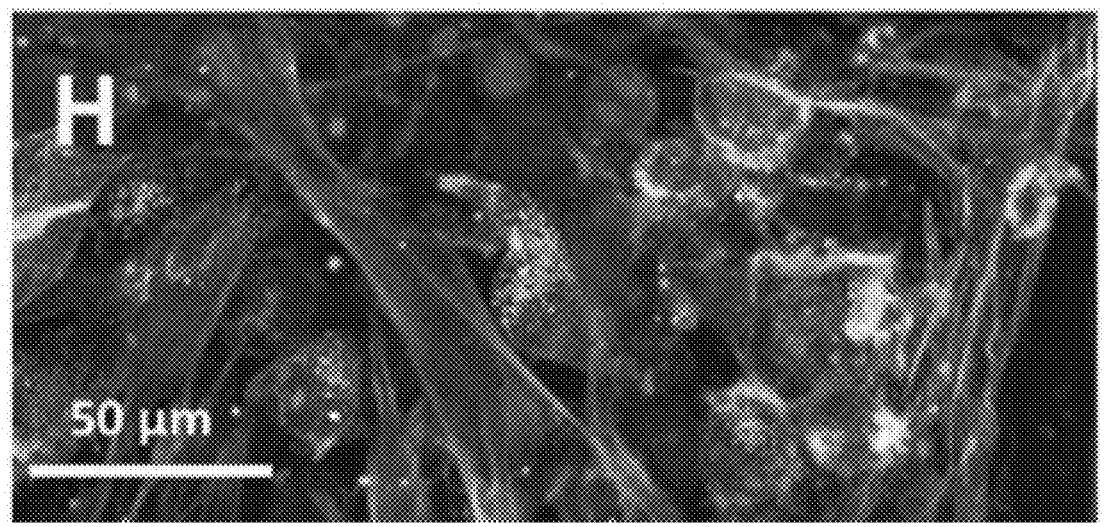
Figure 7I:
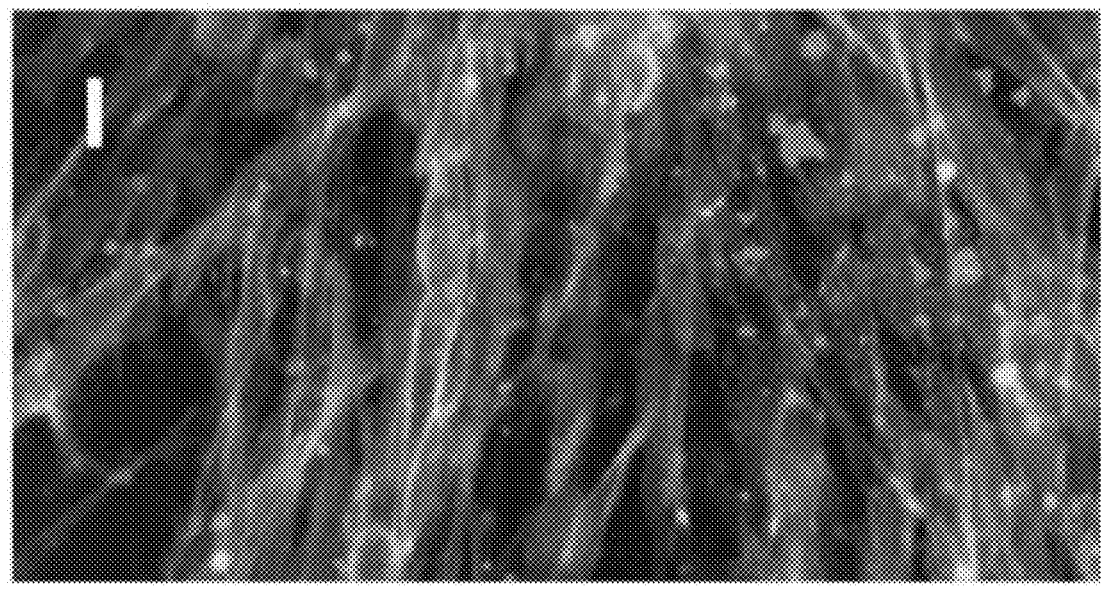
Figure 7J:
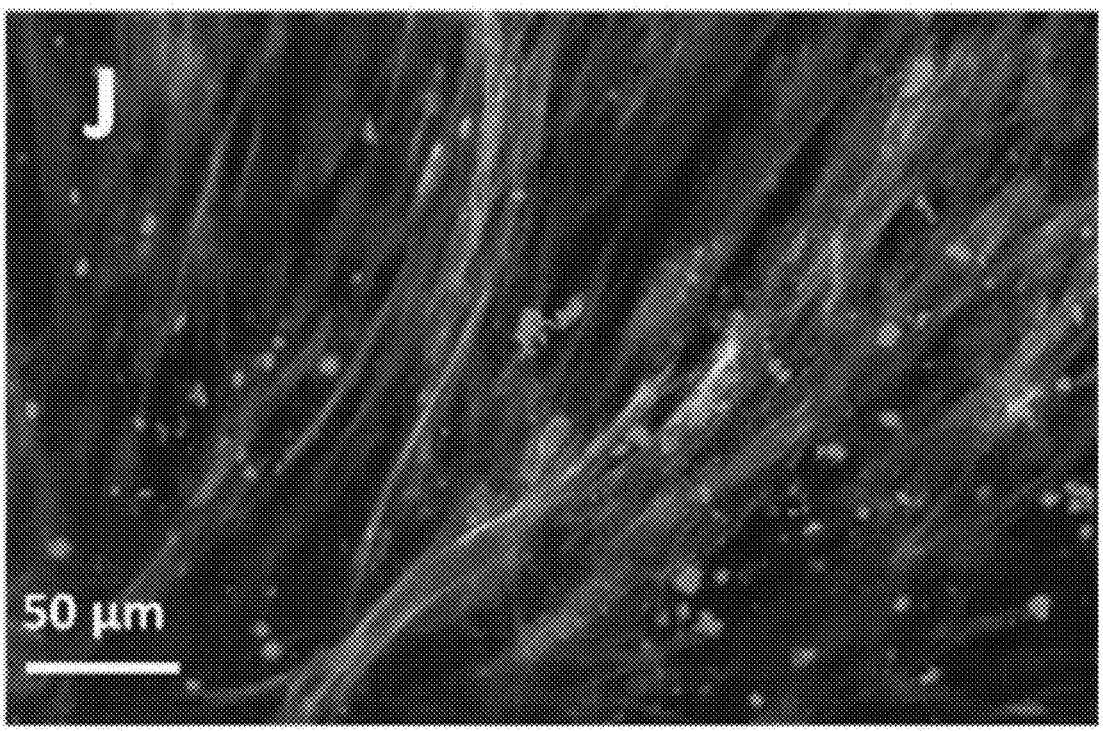

Cubosomes are highly geometrically ordered lipid-based particles, consisting of dispersed particles of bicontinuous cubic phase. They have the capacity to encapsulate various bioactive ingredients and to provide sustained release via different routes. To assess their systemic delivery performance in a co-culture environment of cancer/stroma cells, the rhodamine-lipid tagged cubosomes (FIG. 7A) were administered via the C3 channel of the microfluidic device simulating the intravenous input (FIGS. 6A-6A). Surprisingly, the fluorescently labelled cubosomes revealed selectivity and uptake differences in solid (MCF-7) and metastatic (MDA) tumor microenvironments (FIG. 7B and FIG. 7C, respectively). The cubosomes successfully traversed across the ECM and were specifically accumulated in solid tumor cells (FIG. 7B and FIGS. 7D-G) whereas in the metastatic cancer and stroma cells, the degrees of cubosome association were significantly lower (FIGS. 7C, D and H-J, cubosomes, purple).

Discussion

A major challenge of in vitro model systems is the inability to accurately reproduce the complex 3D cytoarchitecture and cellular composition of tissues. An ideal 3D platform that successfully addresses these limitations should have the attributes of simplicity, controllability, complexity, and scalability to create a more complex tissue-like structure suitable for pre-clinical research and for the testing of personalized therapies.

In this regard, the present inventors have developed a novel three-dimensional cell culture platform that is scalable and simple to implement while allowing precise spatiotemporally controlled seeding of different cell types or cell aggregates within the well-controlled extracellular matrix of the platform. The unique design of microwells inside the channel interface with the ECM gel also allows the study of the effect of flow within this system.

Integrating stromal cells and vasculature with tumor and organoid platforms is critical to best mimic tumor/tissue/organoid microenvironments. However, this is not presently optimized in currently available platforms and devices. For example, recent studies have used endothelial cells to form vascular networks in in vitro 3D culture systems via patterned channels (Bischel L L et al., 2013, *Biomaterials*, 34: 1471-1477; and Nguyen D H et al., 2013, *Proc. Natl. Acad. Sci. USA*, 110: 6712-6717). In particular, self-organized vascular networks have been built in ECM gels for studying vascular function, vasculogenesis, and tumor metastasis (Ehsan S M et al., 2014, *Integr. (Camb.)*, 6: 603-610; and Chen M B et al., 2017, *Nat. Protoc.*, 12: 865-880) and within "pre-formed spheroids" introduced into the ECM gel (Ehsan S M et al., 2014, supra; Agarwal P et al., 2017, *ACS Nano.*, 11: 6691-6702; and Laschke M W and Menger M D, 2017, *Biotechnol. Adv.*, 35: 782-791). Accordingly, current models require the preformation of spheroids which are then introduced into the microfluidic devices followed by secondary handling procedures (Agarwal P et al., 2017, supra; and Laschke M W and Menger M D, 2017, supra). This limits the applicability of these approaches to those tumor cells that can form spheroids that are easy to manipulate. These approaches also give rise to an increase in experimental variations and labor detrimental and contrary to the equivalent in vivo situation. Furthermore, other currently available platforms and devices having microwells in microfluidic systems comprised of a monolayer of channels for forming cell clusters require introducing an ECM gel later to integrate with tumor cells and vasculature (Lee G H et al., 2017, Biofabrication, 10(1): e015001. doi: 10.1088/1758-5090/aa9876; and Lee S W et al., 2018, Sci. Rep., 8: 2365 doi: 10.1038/s41598-018-20886-0). These single-channel designed platforms increase ECM gel deformation and reduce the flexibility for forming vascular networks in more complex multicellular systems (e.g. including other stroma cells). Finally, the use of such systems for spatial control of multicellular cell aggregates within well-defined extracellular matrices and with flow systems to study tissue self-organization properties and vascularization has not previously been reported.

In contrast, the cell culture platform of the present invention (and microfluidic devices incorporating said platform) enable the formation of cell aggregates (including spheroids) in the platform which in turn can form micro-tissues which exemplify the elucidation of multicellular and self-organized vascularized tumoroids. The platform of the present invention best mimics cell microenvironments from simple mono-cell culture systems to complex multi-cellular co-culture systems including: neovasculogenesis, cell invasion, tumor angiogenesis, as well as applications for bio-nano interaction and drug screening. In this study, the application of the platform and associated devices in assessing the delivery specificity of a non-targeted cubosome nanocarrier in a mixed cancer/healthy cell environment was demonstrated for the first time. It is noteworthy that a majority of the existing cancer-cubosome interaction studies have been limited to the use of conventional well/plate monoculture assays. The current findings based on a co-culture platform highlight that different cancer cells show differential uptake behaviors for the same nanocarrier system, where the non-targeted uptake of cubosomes could be ranked in the following trend: solid tumor (MCF-7)>stroma cells (HUVECs and NHLFs)>metastatic cancer cells (MDA-MB-231). This observation is suggestive of dissimilar metabolic and uptake behaviors of these different cell types, which form the basis for future mechanistic investigations.

By taking advantage of these elaborately formed micro-tissues, there is the potential for applying the platform and associated devices of the present invention to the development of different epithelial organoids and patient tissue cultures (Vlachogiannis G et al., 2018, Science, 359: 920-926; and Sachs N et al., 2018, Cell, 172: 373-386), and cancer targeting therapeutic and diagnostic agents. This includes the use of defined fibrin gels and different types of stem cell-derived organoids (Shamir E R and Ewald A J, 2014, Nat. Rev. Mol. Cell Biol., 15: 647-664; and Broguiere N et al., 2018, Adv. Mater., 30: e1801621 doi.org/10.1002/adma.201801621). In addition, different ECM gels, including thermal sensitive gelling (Matrigel and collagen) (Campbell J J et al., 2017, Biomaterials, 114: 34-43) and spontaneous polymerization (fibrin) biomaterials (Liu J et al., 2012, Nat. Mater., 11: 734-741), can be applied in the platforms of the present invention for discovering suitable ECM matrices for both biochemical and mechanical cues that regulate cell phenotypes and functional development (Oksdath M et al., 2018, APL Bioengineering, 2: 041501 doi.org/10.1063/1.5045124).

The platform and devices of the present invention also allow the interrogation of tissue formation mechanisms underlying vasculogenesis (monoculture), tumor invasion and tumor angiogenesis seen in tumor microenvironments. Ultimately, these platforms allow tumor microenvironments to develop into advanced epithelial-stromal organ tissues and vascularized organoids allowing better understanding of cancer/disease progression. The inclusion of tumor vasculature and the complexity of microenvironment mimics human physiological conditions and empowers the implementation and the knowledge of cell cultures for prodrug evaluation and prediction while minimizing the toxicity in the body and increasing the efficacy in tumor/disease treatments.

Example 2

Three-Dimensional Cell Culture Platform Modelling Mini-Skin Equivalent Units

The cell culture platform and associated microfluidic device used in Example 1 was applied to the development of an in vitro model of skin. The demand for physiologically relevant in vitro human skin equivalent models is increasing owing to the regulations pertaining to the replacement, reduction, and refinement of animal models relevant in scientific society and the failure to clinically translate results obtained in animal models to clinical trials.

3D human skin models on a chip are considered superior to conventional in vitro 2D monolayer assays owing to the complex 3D tissue microenvironment offered by different human skin cells including keratinocytes, fibroblasts, vascular cells and their interaction with extracellular matrix (ECM). Recently, there have been reports on the development of microfluidic chip based 3D skin culture models (Abaci H E et al., 2015, Lab Chip, 15(3): 882-888; Mori N et al., 2017, Biomaterials, 116: 48-56; Sriram G et al., 2018, Materials Today, 21(4): 326-340; Wagner I et al., 2013, Lab Chip, 13(18): 3538-3547; and Wufuer M et al., 2016, Sci. Rep., 6: 37471). Several techniques have been adopted for the development of microfluidic devices for the culture of skin cells and endothelial cells to form skin equivalent units. Moreover, skin equivalent units have been developed inside such devices for further cell growth and differentiation as well as assay development (Abaci H E et al., 2015, supra; and Wagner I et al., 2013, supra). Although these 3D cultures have significant advantages over 2D models they still exhibit profound limitations including the lack of control for the integration and number of different cell types, the formation of vasculature (Pham M T et al., 2018, Neuroreport, 29(7): 588-593), the limited flexibility of the extracellular matrix and the lack of a flow system for the continuous supply of nutrients (Shamir E R and Ewald A J, 2014, supra). Therefore, research focused on the fabrication of "skin-on-a-chip" has gained significant interest as an alternative, realistic in vitro model and signifies the relevance and importance of 3D skin equivalent units.

Materials and Methods

Microfluidic Device and Culture Platform Design

The microfluidic device was prepared as described above in Example 1. To create the cell culture platform aspect of the microfluidic device, the same approach was taken as in Example 1. In this instance, the constituents of the ECM included fibrin (2.5 mg/ml or 4 mg/ml). Fibrin is the mixture of fibrinogen (Sigma-Aldrich, F8630) (2.5 mg/ml and 4 mg/ml) and thrombin 0.5 U/ml (Sigma-Aldrich, T9549) in DPBS (GIBCO) solution. Upon gelling of the ECM, round shaped patterns formed as channels for seeding cells within the ECM gel.

Cell Culture

In this study keratinocytes (HaCaT)(Cell Lines Service, DKFZ, Heidelberg, Germany), human foreskin fibroblasts (HFFs)(Cell Lines Service, DKFZ, Heidelberg, Germany), Human dermal microvascular endothelial cells (HDMEC), juvenile foreskin, Human umbilical vein endothelial cells (HUVECs) (Lonza) and Human lung fibroblasts (NHLFs) (Lonza) were used to mimic skin. Human epidermal keratinocytes (HaCaT) and human skin fibroblast (HFF) cells were cultured in DMEM (4.5 g/L D glucose) (GIBCO) supplemented with 10% fetal bovine serum and penicillin/streptomycin solution (100 units/ml, GIBCO). HMVEC (PromoCell) and HUVEC (Lonza) were cultured in Endothelial Cell Growth Medium MV (PromoCell) with the addition of Microvascular Growth Supplement (PromoCell) and Endothelial Cell Growth Medium (Lonza), respectively. The human cutaneous invasive SCC keratinocyte cell lines from primary tumor (MET-1)(see Proby C M et al., 2000, Exp. Dermatol., 9(2): 104-117) were cultured in DMEM:Ham's F12 (GIBCO) supplemented with 10% FCS and penicillin/streptomycin (100 units/ml) and NHLF cells was cultured in FGM™-2 BulletKit™ Medium.

Establishment of Skin Equivalents

HaCaT cells ($1\times10^5/10$ μL) and HFFs ($1\times10^5/10$ μL) were seeded in the side channels of the microfluidic device separately, or they were seeded together (1:1, HaCaT and HFF at $1\times10^5/10$ μL) to yield a mixed culture. For example, HaCaTs (or the combined HaCaT/HFFs) were seeded first in one channel (e.g. FIG. 8A, left panel, C1), and the device was placed in a vertical direction for 20-30 minutes to allow the cells to settle in the microwells. Once the cells had settled, the device was inverted and HFFs (or the combined HaCaT/HFFs) were seeded in the opposite channel (e.g. FIG. 8A, left panel, C3). The cells were again allowed to settle in the microwells and the device was then placed in a horizontal position ready for incubation (see FIG. 8B). Cell culture media was changed daily.

Figure 8A:
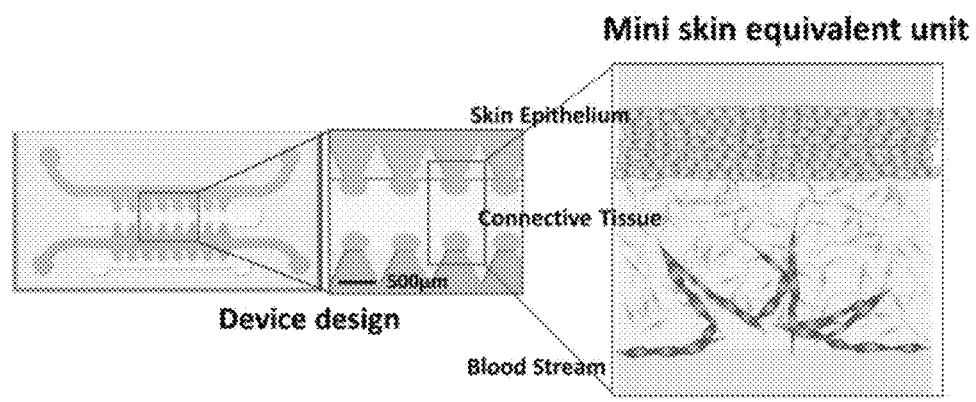
FIGS. 8A-8E—formation of organotypic mini skin equivalent units.
Figure 8B:
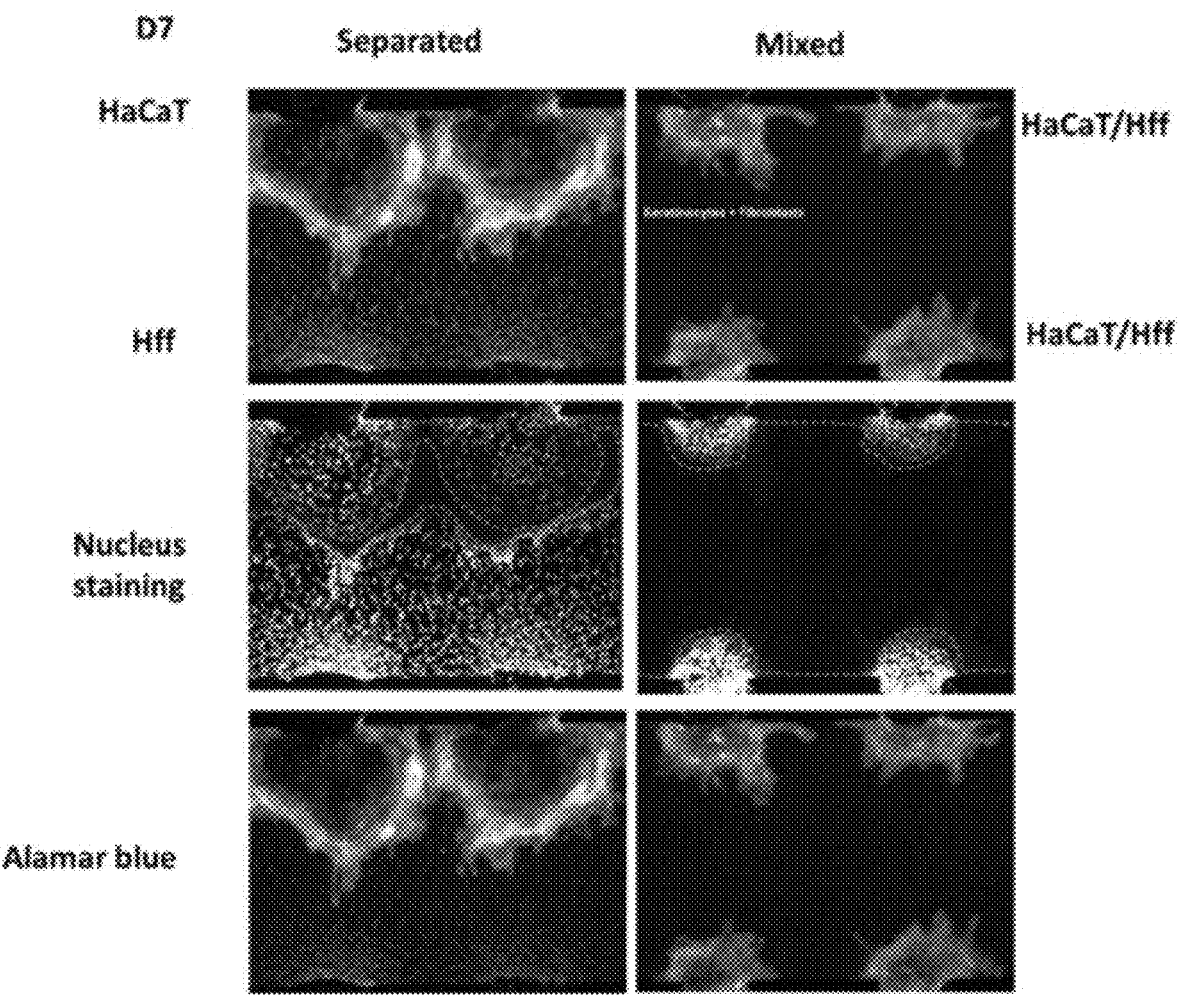
Figure 8C:
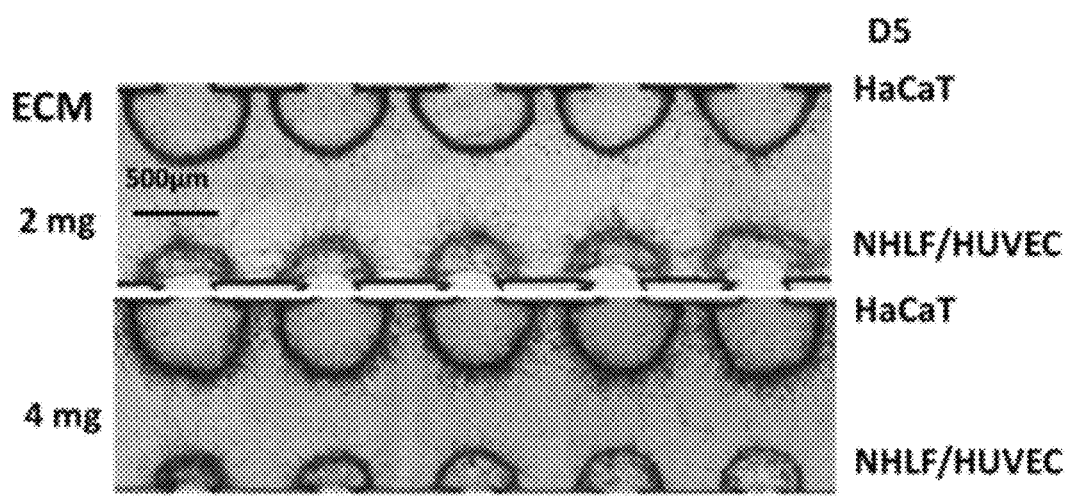
Figure 8D:
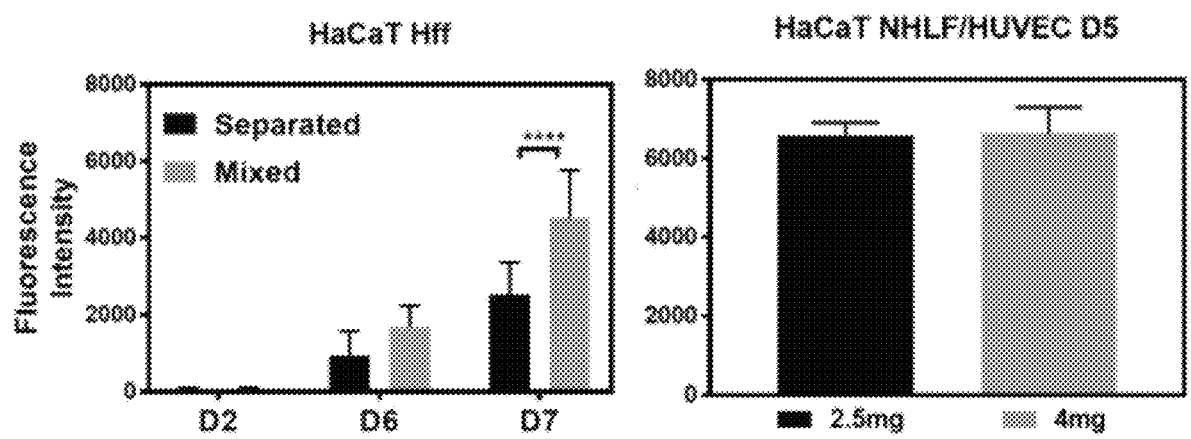
Figure 8E:
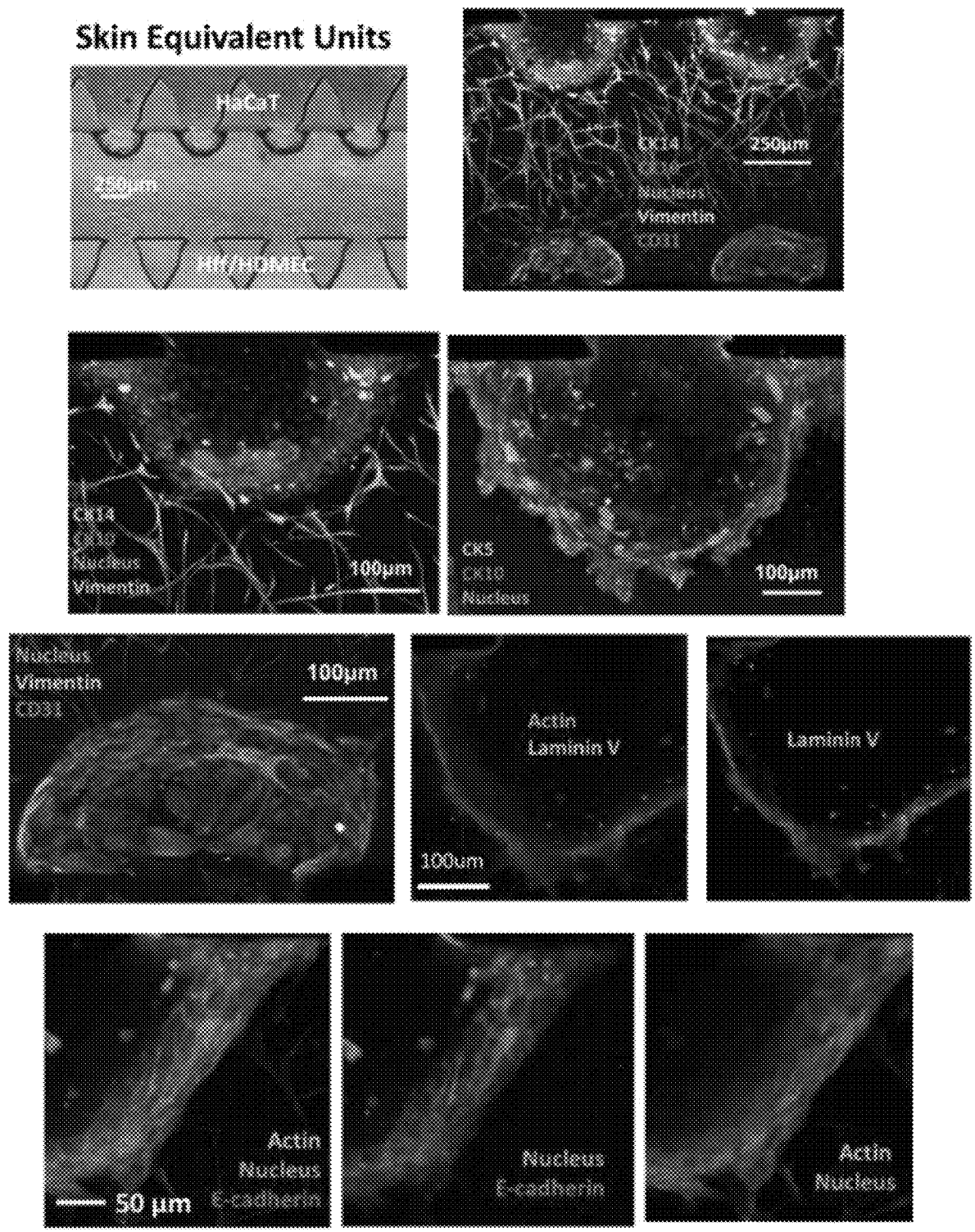

To create skin equivalent units, in a separate device HaCaT cells were seeded in one channel of the device, and a mixture of HFF cells and endothelial cells (either HDMEC or HUVEC) were seeded on the opposite channel of the device (see FIG. 8E).

Another model was also established in a further device by using primary fibroblast cells (NHLF). In this model, HaCaT cells ($1\times10^5/10$ μL) were seeded in one channel, and then a mix of NHLF and HUVEC cells (total cells $1\times10^5/10$ μL) were seeded in the opposite channel. When endothelial cells or primary cells were present, the cells in the opposite channel were cultured with corresponding media (either EBM-2 media or endothelial cell specific media (Lonza), respectively). The concentration of fibrin in the ECM was also varied (2.5 mg and 4 mg).

Establishment of a Skin Cancer Model

MET-1 (squamous cell carcinomas, SSC) cells ($1\times10^5/10$ μL) were seeded in one channel of the device and the opposite channel was seeded with a mixed culture of endothelial cells and primary fibroblast (HUVEC cells and NHLF) cells to mimic a skin cancer model. MET-1 cells were cultured in DMEM and the mixed cells were cultured in EBM-2 medium. The model was cultured over a period of 7 days and immunofluorescence was performed.

Cellular Proliferation Assay

Cellular viability was studied using the alamarBlue™ assay (ThemoFisher Scientific). AlamarBlue was in 1:10 ratio in culture medium and 200 μL was added to each reservoir of the device. The proliferation assay was accessed at different time points in both compartments (C1 and C3 of FIG. 8A). After a 4 hr incubation, the culture medium was removed and the fluorescence intensity was measured from a plate reader using an excitation between 540 nm and an emission at 590 nm.

Immunofluorescence

The microfluidic device was fixed in situ overnight in 4% paraformaldehyde (PFA) at 4° C. Following fixation, samples were washed 3 times in 1×PBS, subsequently permeabilized in 0.5% Triton X-100 in PBS (PBST) 0.2% sodium azide for 1 hr and washed again with PBST, blocked with 2% BSA/10% Goat serum in PBST for 2 hr at room temperature. Primary antibodies used in this study were LS Laminin V (Laminin-5 Alexa Fluor® 488, cat #SANTSC-13586 AF488, Santa Cruz), E cadherin (Anti-E Cadherin antibody Alexa Fluor® 594, cat #ab206880, Abcam), Cytokeratin V (Cytokeratin 5 Alexa Fluor® 647, cat #ab207352, Abcam), Cytokeratin 10 (Anti-Cytokeratin 10 Alexa Fluor® 546, cat #SANTSC-23877 AF546, Santa Cruz), Cytokeratin 14 (Cytokeratin 14 Alexa Fluor® 488, cat #ab192055, Abcam), vimentin (Anti-Vimentin antibody Alexa Fluor® 555, cat #ab203428, Abcam), CD31 (CD31 Alexa Fluor® 647, cat #ab215912, Abcam), Proliferating cell nuclear antigen (PCNA Alexa Fluor® 647, cat #ab201674, Abcam). Primary antibodies were diluted and mixed in 2% BSA/10% Goat serum with Phalloidin (50 μg/ml, ab176752 Phalloidin-iFluor Reagent) and Hoescht 33342 (10 μg/ml) in PBST at a dilution of 1:100 and incubated overnight at 4° C. in a humidified channel. Samples were washed 3 times in 1×PBS, followed by secondary antibody treatment, incubation and washing. Samples were stored in the dark at 4° C. until imaging on an inverted microscope (Nikon) and confocal microscope (Zeiss 710).

Results and Discussion

The formation of mini-skin equivalent units is shown in FIGS. 8A-8E. An illustration of the culture platform and associated device can be seen in FIG. 8A which comprises a culture medium in side channels (C1 and C3), and ECM gel in the central channel (C2), collectively mimicking the skin epithelium (C1), connective tissue (C2) and blood stream (C3).

As shown in FIG. 8B, cells follow their internal properties and reorganise in the ECM, even in a mixed cell culture (right column). The keratinocytes (HaCaTs) form epithelium-like structures and the fibroblast cells infiltrate through the ECM gel to form connective tissue. The concentration of fibrin in the ECM (2.5 mg/mL and 4 mg/mL of fibrin matrix) also affects epithelium formation and stroma cells (FIG. 8C). In this regard, HaCaT cells present as a smooth layer with greater stromal cell sprouting (NHLF/HUVEC) in 2.5 mg/mL than with the 4 mg/mL ECM gel. In the 4 mg/mL ECM gel, the HaCaTs appear more invasive.

Cell proliferation intensity (alamar blue) is affected by the cell type and the composition of cells but is not affected by ECM concentration (FIG. 8D: left panel corresponds to FIG. 8B; right panel corresponds to FIG. 8C). As shown in FIG. 8E, an optimised co-culture condition and ECM concentration leads to the formation of complex skin tissue structures. In these units of mini-skin equivalents, keratinocyte and fibroblast markers confirmed a self-assembled unbroken epithelial equivalent. CK5 was observed in the keratinocyte layer signifying the stable attachment of epidermis to dermis layer, promoting the basement membrane. CK10, expressed in stratified epithelial cells in the supra basal of epidermis was observed in the skin equivalent. CK14, which is observed in actively dividing basal keratinocytes, was seen in the immunostaining of skin equivalent. Laminin V (which is essential to epidermal cell attachment) was observed in the keratinocyte layer indicating epidermal attachment by promoting the rate of formation of basement membrane. Tight junctions in the keratinocyte layer were demonstrated by E-cadherin staining. The fibroblast cells under the skin equivalent unit, stained with vimentin, which is expressed mostly in normal fibroblast.

Figure 9A:
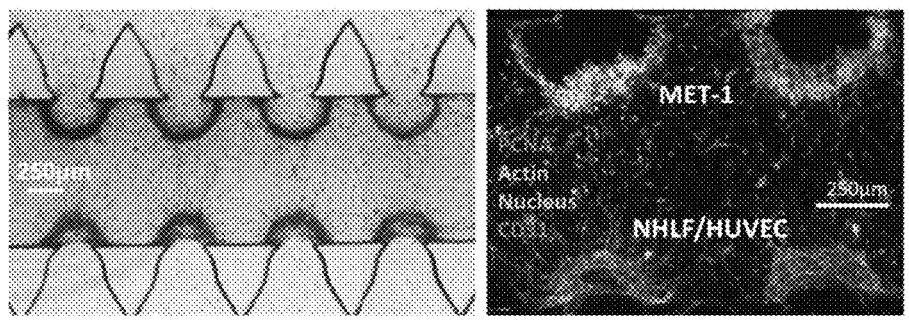
FIGS. 9A-9B—formation of a skin cancer model.
Figure 9B:
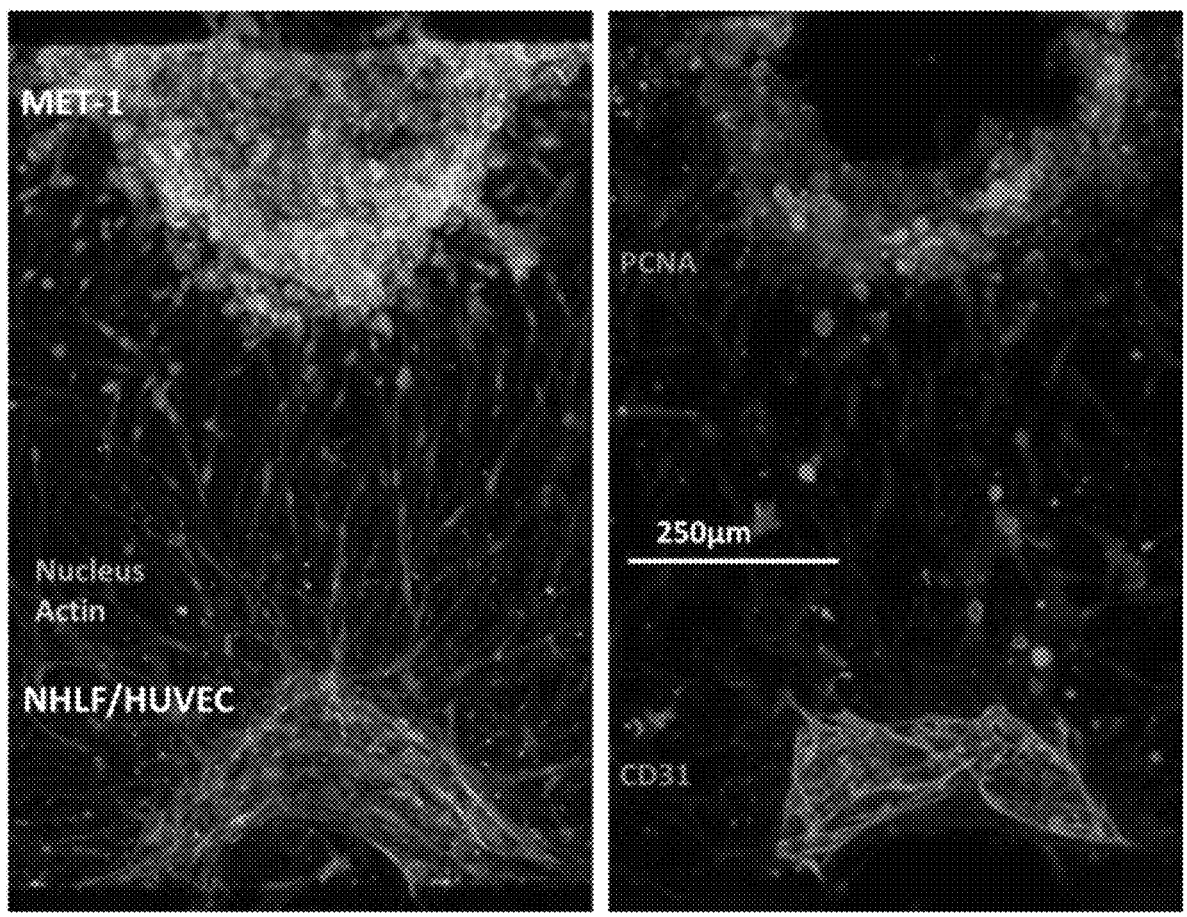

As shown in FIGS. 9A-9B, a skin cancer model was developed by culturing MET-1 cells in the top channel and mixed NHLF and HUVEC cells in the opposite bottom channel. The cells were stained for proliferating cell nucleic acid (PCNA), CD31, actin and nucleus. All the cell types in the device are proliferative and MET-1 cells promote invasive behaviour unlike HaCaT cells (shown in FIGS. 8B and 8E). Similar to the skin equivalent model, the fibroblast cells infiltrate towards the fibrin in the device. The endothelial cells display CD31 expression.

The work in this Example presents a proof-of-concept of cell culture of mini-skin equivalent units formed in a microfluidic device to best mimic the complex and heterogeneous skin tissue-like architecture. In brief, the three-dimensional culture platform produced in this Example has the capacity to accommodate multicellular co-cultures to represent the complexity of tissue microenvironments and model the structural and functional aspects of human mini-skin units. As discussed above, the culture platform produced allows the formation of "microwells" suitable for complex co-culture tissue formation and which are integrated with "flow channels" and "extracellular matrix gel (ECM gel)". These three elements (microwells, flow channels and extracellular matrix) facilitate control of the microenvironment for the organization of different skin-cell types into small tissue units that can be also subjected to flow and vasculature for the administration of nutrients and/or testing of pharmacological treatments (FIG. 8A).

The different cellular (HaCaTs: human keratinocyte cell line; HFFs: human foreskin fibroblast; HDMECs (Human Dermal Microvascular Endothelial Cells) or HUVECs (Human Umbilical Vein Endothelial Cell): endothelial cells) and ECM compositions within the platform can be used to optimise the culture conditions to form skin-like structures. A schematic of a microfluidic device encompassing the culture platform is shown in FIG. 8A which depicts skin equivalent units within the device. ECM gel is an extracellular matrix which allows for cells to adhere, proliferate and differentiate to form skin-like epithelial and connective tissues. Moreover, this study demonstrates the feasibility of recreating in vitro organotypic 3D skin equivalents (FIGS. 8A-8E) and skin cancer models (FIGS. 9A-9B).

This Example shows that all the cell types within the device proliferate and MET-1 (squamous cell carcinoma, SSC)(Kopecki Z et al., 2015, *Oncotarget*, 6(34): 36426-36440) but not HaCaT cells clearly exhibited invasive behaviour (FIGS. 9A-9B). The endothelial cells labelled by CD31 expression (FIGS. 8A-8E and 9A-9B), suggesting the multicellular culture of tumour/cancer model in the device can provide the possibility for studying skin cancer therapeutics. This novel platform enables the growth of small tissue units, such as biomimetic "skin equivalent-on-chip" (FIGS. 8A-8E) and "skin-cancer-on-chip" (FIGS. 9A-9B), which will provide alternative models for testing preclinical drug penetration and toxicity assays for therapeutics and cosmetic components in the future (Ronaldson-Bouchard K and Vunjak-Novakovic G, 2018, *Cell Stem Cell*, 22(3): 310-324).

In conclusion, cell culture of skin equivalents mimicked the morphology and structural integrity of native skin under normal and disease conditions. This compact skin model system can adopt a wide range of cell types for modelling of skin tissue under healthy and cancerous conditions, which represents a substantial improvement to existing in vitro skin equivalent models. Moreover, these studies demonstrate that the culture of skin equivalents offers a potential integrated platform to not only model for the interaction and integration of different cells mimicking tissue/tumour/infectious/inflammatory microenvironment but also as a robust platform for drugs and genetic screening.

Example 3

Toxicity Assay for Drug Effect

The aim of the study in this Example was to evaluate the drug effect on cancer cells growing in the three-dimensional cell culture platform of the present invention.

Materials and Methods

Detached U87 cells (human glioblastoma cell line) were seeded in fibrin microwells of a three-dimensional cell culture platform of the present invention. U87 cells can be obtained from Sigma-Aldrich (Merck KGaA, Darmstadt, Germany) or ATCC (American Type Culture Collection, Manassas, Virginia USA). After 24 hr culture, microtumour tissues formed in the microwells and were subsequently treated with the chemotherapeutic drugs Abemaciclib (also known as Verzenio and produced by Eli Lilly) or Palbociclib (also known as IBRANCE and produced by Pfizer) for 6 days. The killing and toxicity effect of the chemotherapeutic drugs was evaluated by the detection of dead cells by Image-iT® Dead Green staining.

Results

Figure 10A:
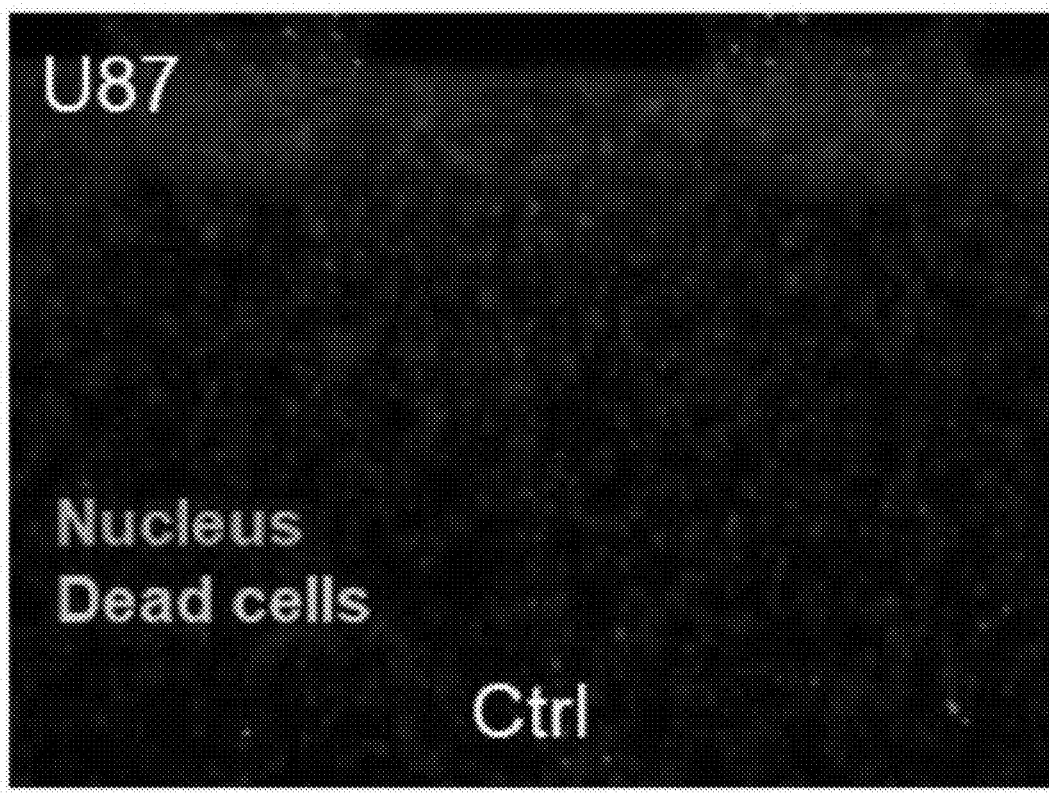
FIGS. 10A-10C—images from a drug toxicity assay using an embodiment of the three-dimensional cell culture platform of the present invention.
Figure 10B:
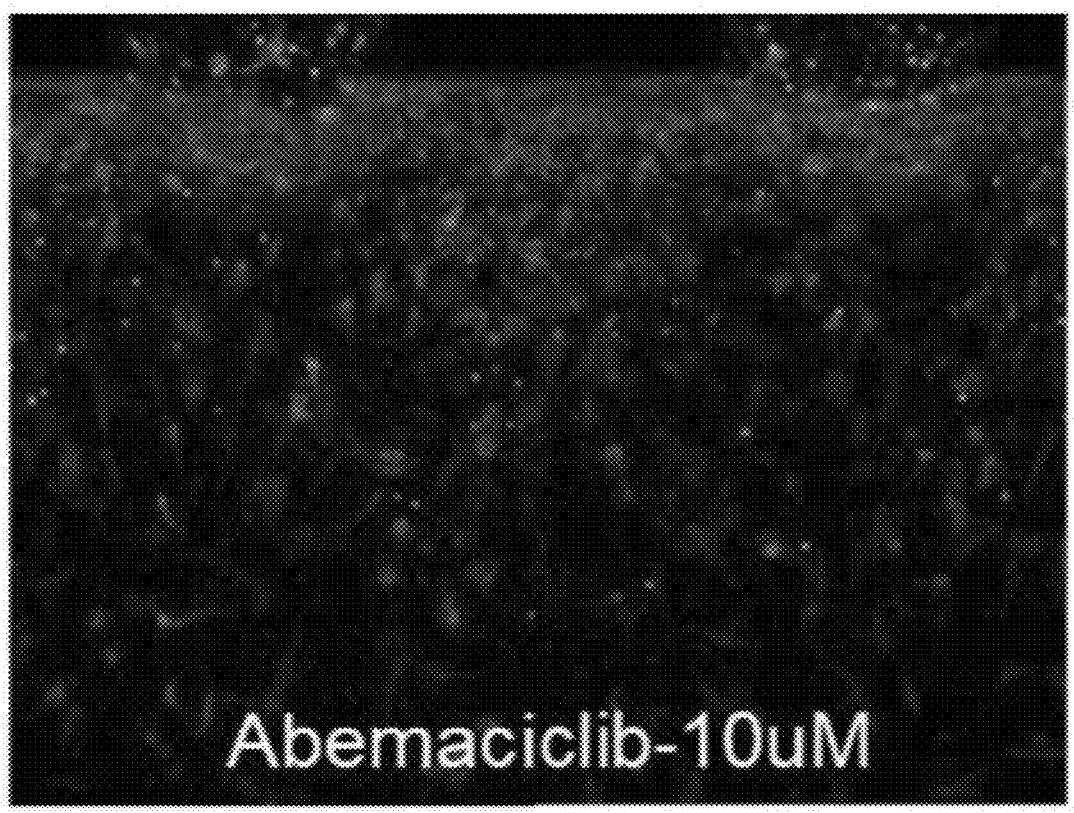
Figure 10C:
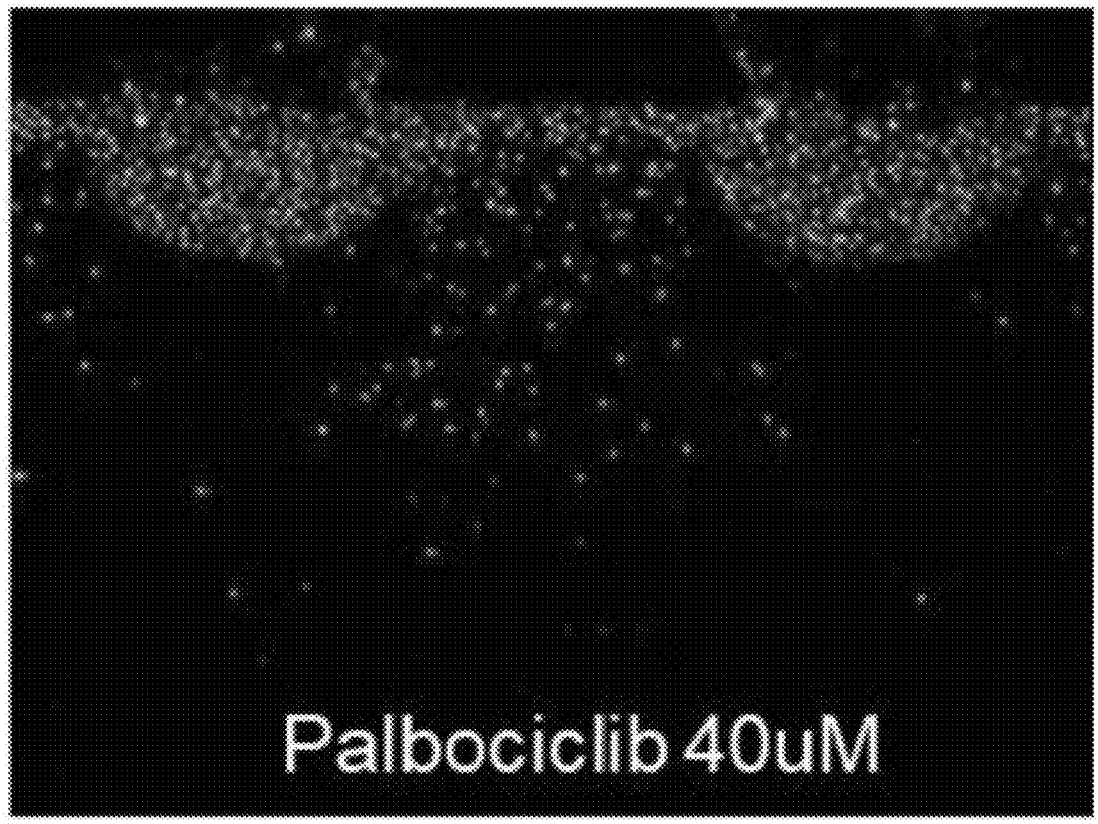

U87 cells were viable and grew in microwells of the cell culture platform. The cytotoxic effects of the chemotherapeutic drugs on cancer cells was determined by the quantity of dead cells after treatment with Abemaciclib or Palbociclib. The control group without chemotherapeutic drug treatment showed virtually no dead cells. The group treated with Abemaciclib (10 μM) demonstrated an increase in the numbers of the dead cells, while the group treated with Palbociclib (40 μM) led to almost all cells being killed (FIGS. 10A-10C).

This Example shows that the three-dimensional cell culture platform of the present invention can be used to assess the affects of therapeutic agents on cancerous cells. The platform therefore provides an ideal high-throughput in vitro tool for screening for potential new therapeutic agents.

Example 4

Chemotaxis Assay

The aim of the study in this Example was to evaluate the chemotaxis effect between cancer cells and immune cells using the three-dimensional cell culture platform of the present invention.

Materials and Methods

Cancer cells were detached by trypsin and were then seeded in microwells of the three-dimensional cell culture platform for evaluating the chemotaxis effect. After 24 hr co-culture with the effector cells in microwells positioned opposite the microwells containing the cancer cells, the chemotaxis effects were evaluated via optical imaging.

Extracellular Matrix (ECM) Gel in
Three-Dimensional Cell Culture Platform

For the chemotaxis assay, two types of ECM gels were prepared in the three-dimensional cell culture platform—one ECM contained fibrin and the other ECM contained Matrigel.

Chemotaxis Assay with Chimeric Antigen Receptor
(CAR) T-Cells

In this assay, the immune cells were CAR T-cells (from human peripheral blood mononuclear cells), and the cancer cells were human glioblastoma cells (from patient tumour derived cancer cells).

Chemotaxis Assay with U937 Myeloid Cells

In this assay, the immune cells were the U937 human myeloid cell line (from the histiocytic lymphoma) and the cancer cells comprised three different cancer cell lines—MDA-MB-231 and HCC70 (human breast cancer cells) and U251 (human glioblastoma cells). The immune cells and cell lines are available from commercial sources such as ATCC (American Type Culture Collection, Manassas, Virginia, USA) and Sigma-Aldrich (Merck KGaA, Darmstadt, Germany).

Result and Discussion

Chemotaxis Assay with CAR T-Cells

Figures 11A, 11B:
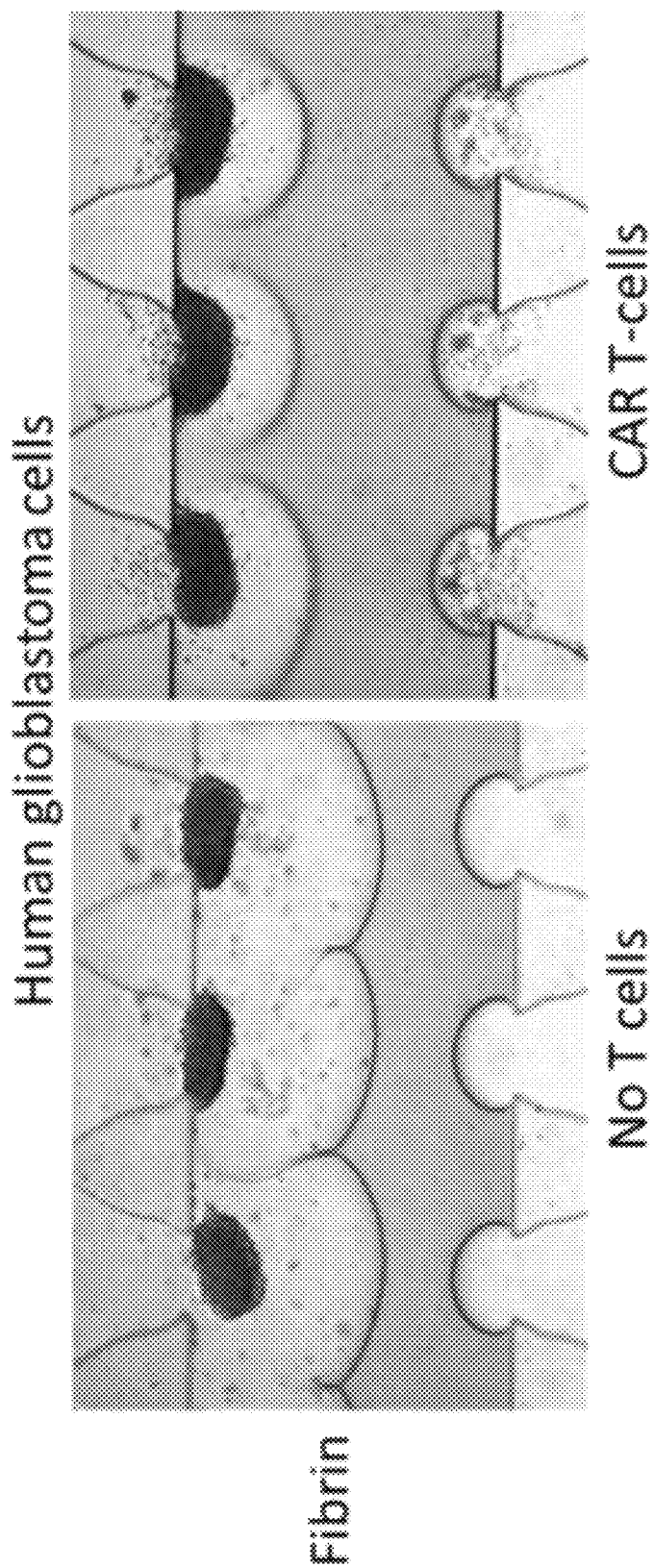
FIGS. 11A-11D—images of a chemotaxis assay using an embodiment of the three-dimensional cell culture platform of the present invention.
Figures 11C, 11D:
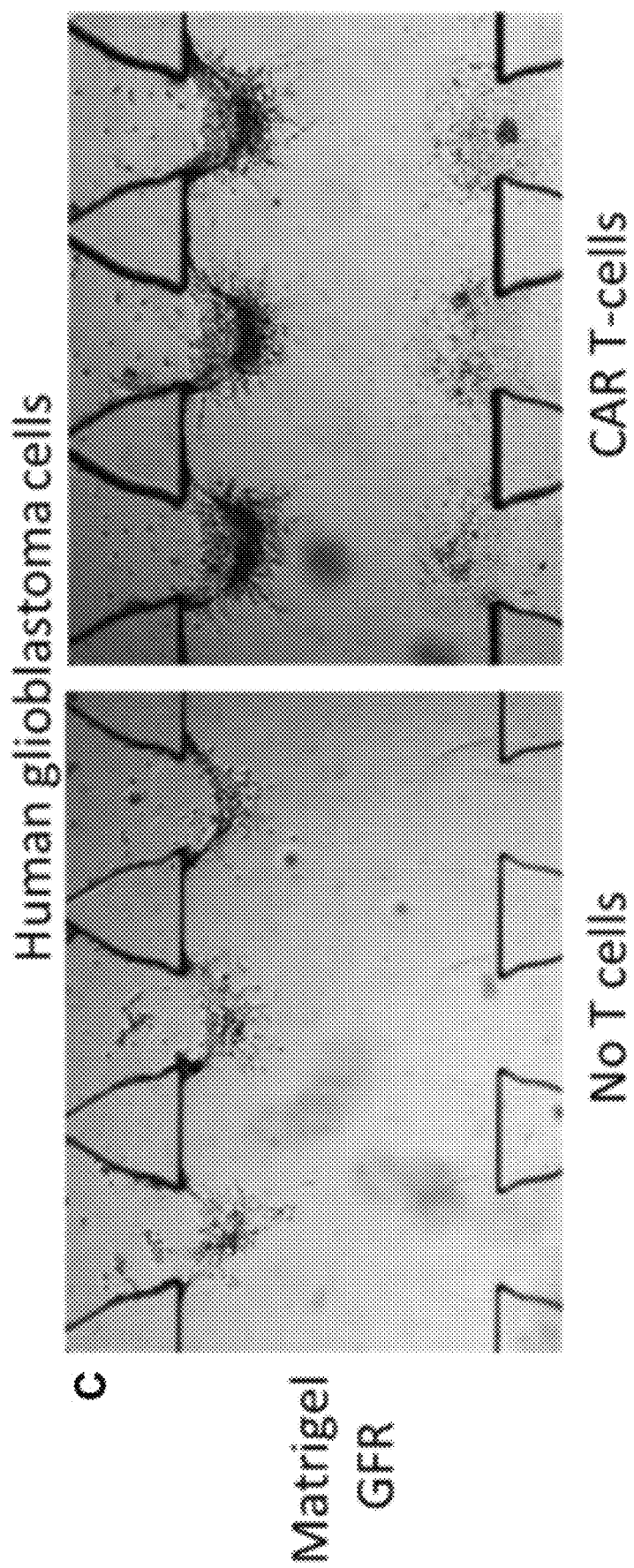

Human glioblastoma cells showed chemotaxis to CAR T-cells both in the fibrin gel (FIG. 11B) and in Matrigel (FIG. 11D). Interestingly, CAR T-cells can migrate through both fibrin and Matrigel toward human glioblastoma cells. The degradation of fibrin (FIG. 11A) but not Matrigel (FIG. 11C) is dramatically different in human glioblastoma cells.

Chemotaxis Assay with U937 Myeloid Cells

Figure 12A:
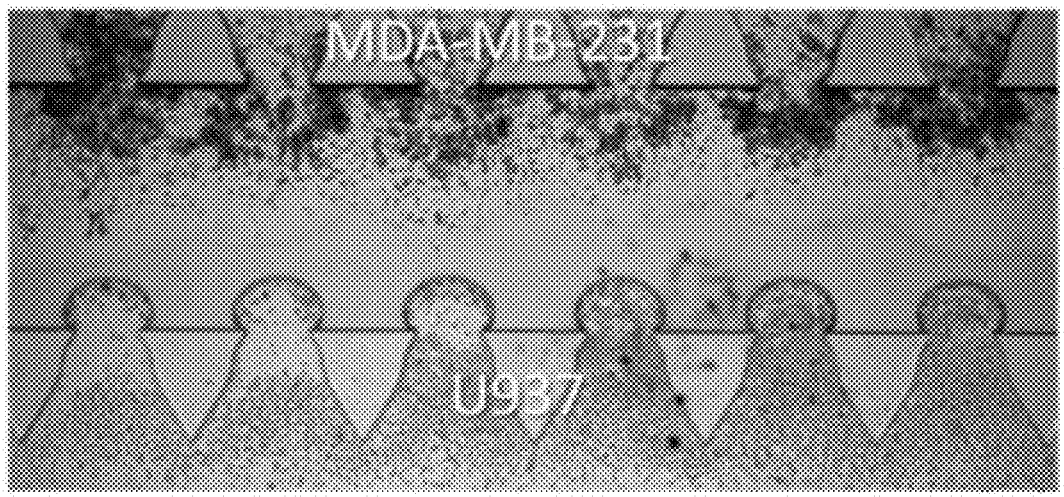
FIGS. 12A-12F—images of a chemotaxis assay with U937 myeloid cells using an embodiment of the three-dimensional cell culture platform of the present invention. In a fibrin ECM gel (FIGS. 12A-12C), MDA-MB-231 (FIG. 12A) and HCC70 (FIG. 12B) cells degrade the gel partially and completely, respectively. However, the fibrin gel was not degraded by u251 cells (FIG. 12C). All three cancer cell types demonstrated chemotaxis to U937 myeloid cells. U937 showed dramatic migration toward HCC70 cells (FIG. 12B). In Matrigel (FIGS. 12D-12F), MDA-MB-231 (FIG. 12D), HCC70 (FIG. 12E) and u251 (FIG. 12F) cells did not degrade the gel. However, all three cancer cell types did not demonstrate chemotaxis to U937 cells.
Figure 12B:
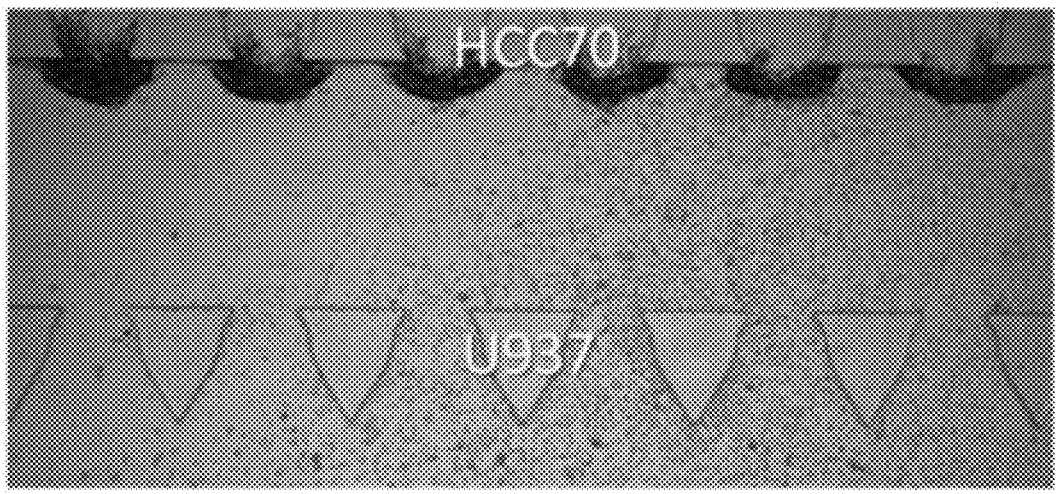
Figure 12C:
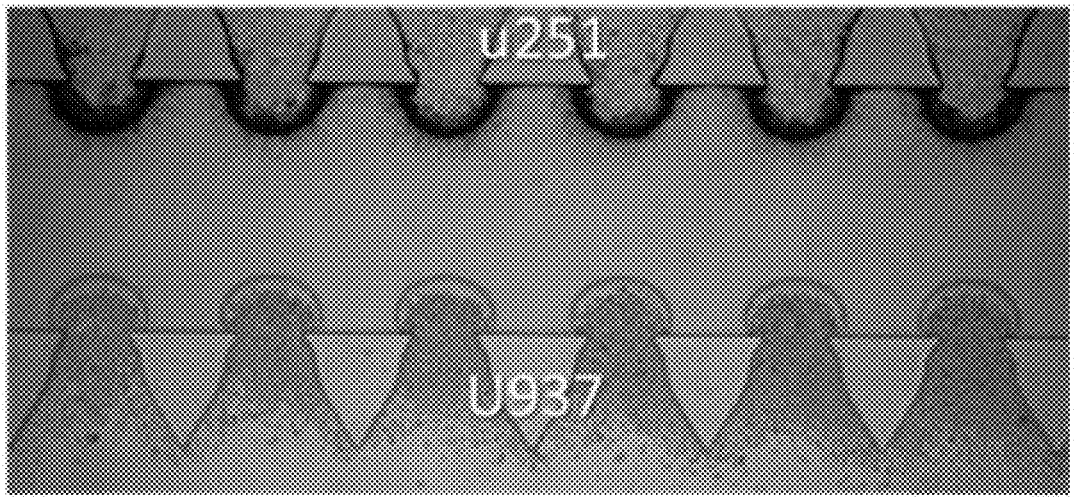
Figure 12D:
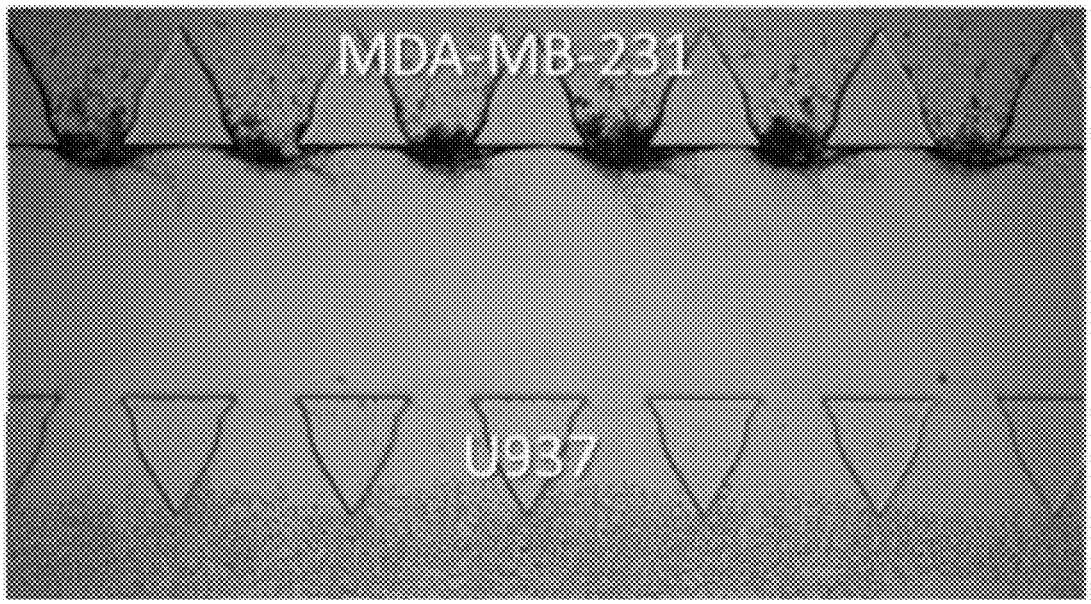
Figure 12E:
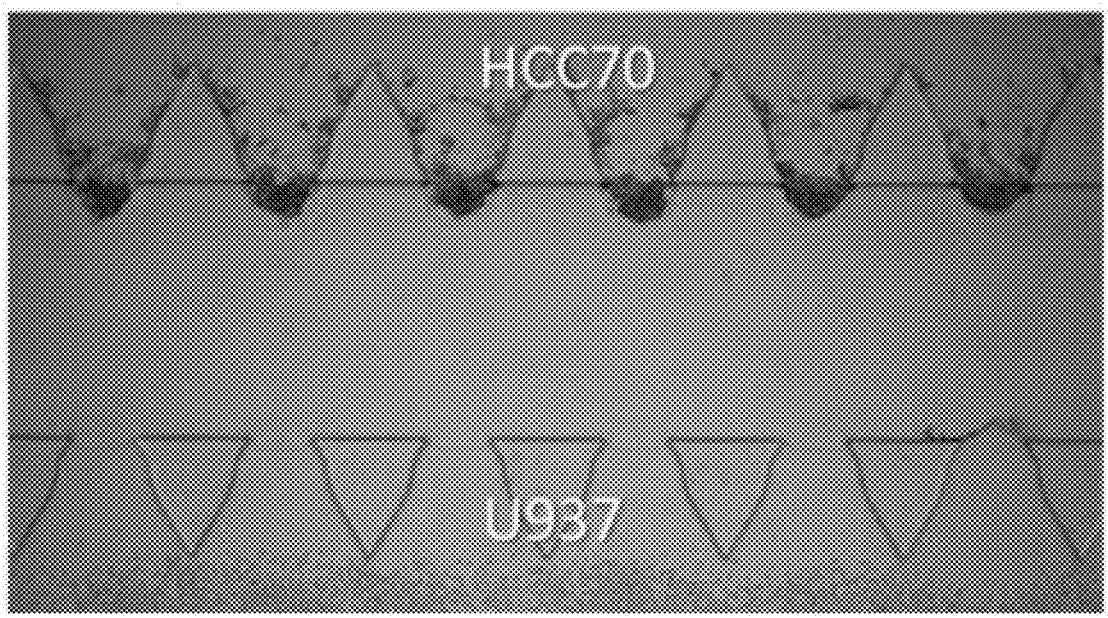
Figure 12F:
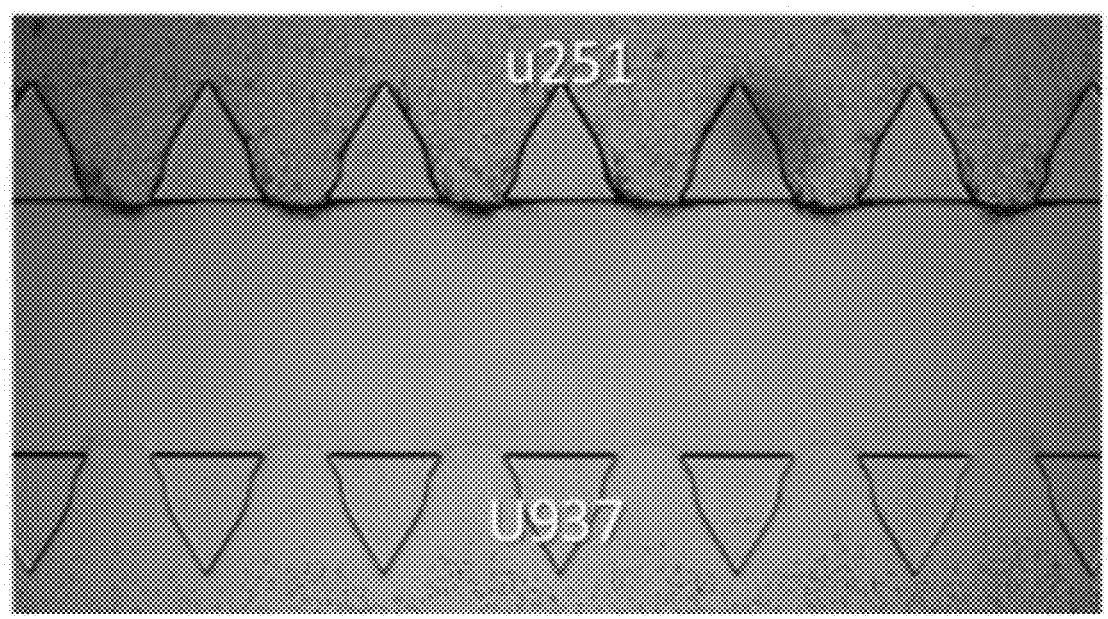

In a fibrin ECM gel (FIGS. 12A-12C), MDA-MB-231 (FIG. 12A) and U251 cells (FIG. 12C) showed significant chemotaxis to U937 cells which are attracted to the cell supporting medium of the microwells. MDA-MB-231 and HCC70 cells degraded fibrin gel significantly (FIGS. 12A and 12B, respectively). However, all cancer cell types grew on Matrigel (FIGS. 12D-12F) but did not show chemotaxis to U937 cells. In summary, compared to Matrigel, cancer cells grown on fibrin ECM gels demonstrated chemotaxis to U937 cells.

Example 5

Brain Organoid Culture Using the
Three-Dimensional Cell Culture Platform

The aim of the study in this Example was to provide a proof-of-concept of a one-step organoid culture in situ, the suspension of induced pluripotent stem cells (iPSC) attached in microwells, and differentiation into brain organoid units in situ.

Methods

Detached iPSC cells (AICS-0023, induced pluripotent stem cells from human, iPSC) were seeded in a three-dimensional cell culture platform according to an embodiment of the present invention. Matrigel was used as the cell supporting medium. iPSCs were cultured and differentiated with condition medium (Lancaster M and Knoblich J, 2014, Nat. Protoc., 9: 2329-2340) for 20 days. The organoid samples were then fixed and stained with primary antibody C9-PAX6 (Red Alex647), Tubulin β3 (Alex 568) and Nucleus Hoescht 33342 (Thermo Fisher; 1/500).

Results

Figure 13A:
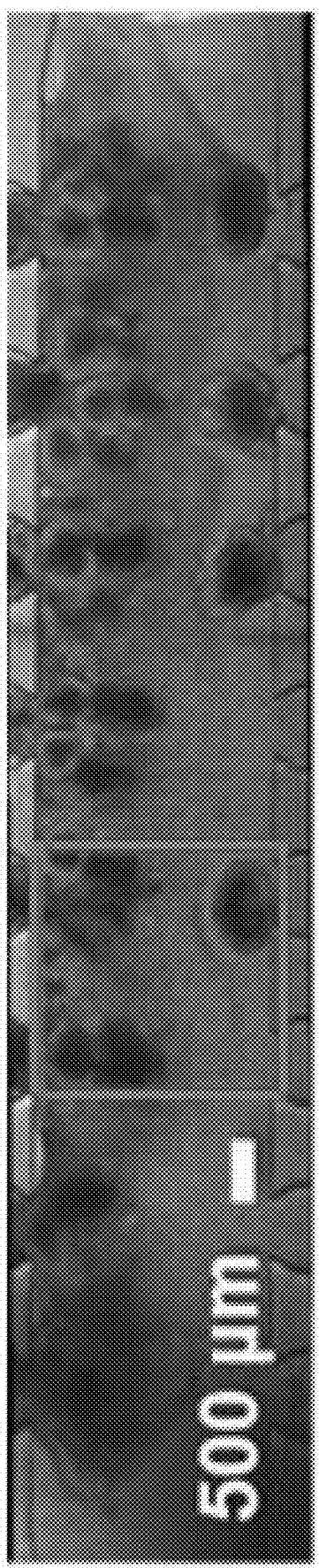
FIGS. 13A-13B—images showing the formation of a brain organoid culture using the three-dimensional cell culture platform of the present invention.
Figure 13B:
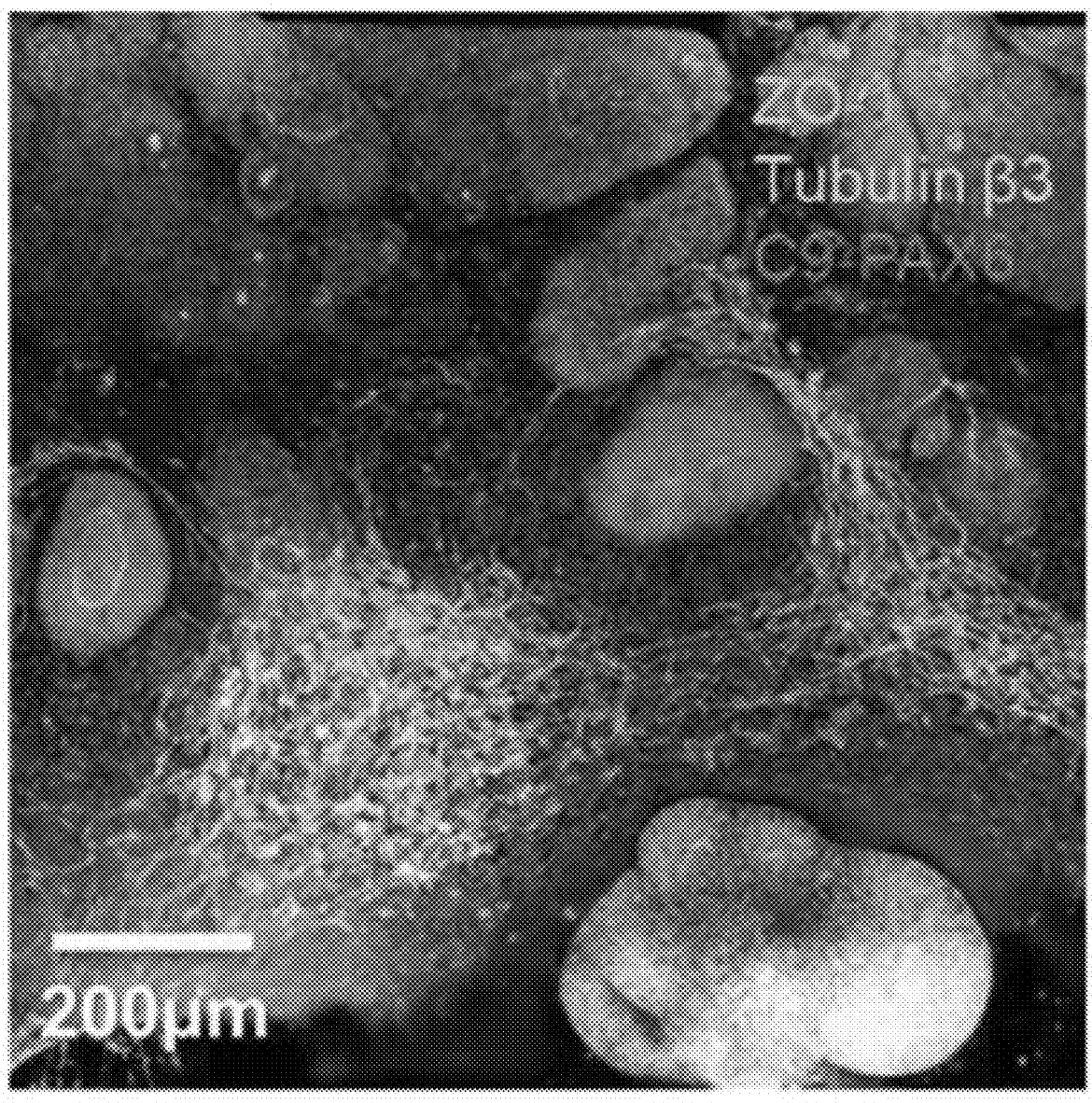

The iPSC cells directly differentiated in situ in the three-dimensional cell culture platform into brain organoids without having to first pre-form embryo bodies (spheroids) away from the culture platform for brain organoid culture (FIGS. 13A-13B). The one-step process of brain organoid culture enabled by the three-dimensional cell culture platform of the present invention reduced the manipulating and embedding processes of embryo bodies. This three-dimensional cell culture platform for the first time demonstrated a simplified culture process for iPSC differentiation into brain organoids with cortex and neuron formation in situ.

Example 6

Comparison of Human Breast Cancer Cell Line,
Mouse Xenograft and Mouse Mammary Tumour
Culture Using the Three-Dimensional Cell Culture
Platform The aim of the study in this Example was to provide an innovative three-dimensional cell culture platform for comparing a human breast cancer cell line, human cancer cell formed mouse xenograft, and a mouse mammary tumour culture using the three-dimensional cell culture platform of the present invention.

Materials and Methods

Three different cancer cells were used for comparison using the three-dimensional cell culture platform, including a monoculture of the human breast cancer cell line MDA-MB-231 (transfected with GFP, human mammary cancer cell line), a dissociated mouse xenograft mammary tumour (NOD/SCID mice) from MDA-MB-231, and cells from a mouse mammary tumour from a MMTV-PyMT transgenic mouse. Each of these cancer cell types were seeded in fibrin ECM microwells of the three-dimensional cell culture platform. After 5-, 8-, and 5-days culture, the MDA-MB-231 cells, the mixture of xenograft tumour dissociated cells, and mouse mammary tumour derived cells were evaluated respectively via optical and fluorescence microscopy.

Results

Breast cancer cells from different origins showed distinct morphology in the three-dimensional cell culture platform. MDA-MB-231 cell line culture showed more fibrin degradation and less agglomerated cells in situ (FIGS. 14A1-14A3). The xenograft mammary tumour dissociated cells also demonstrated the ability to degrade fibrin, continued growth with an increase in cell number (FIGS. 14B1-14B2) and revealed different cell types populated in microwells (FIG. 14B3)—all cells labelled the nucleus in blue, cancer cell in green and endothelial cells in red. The mouse mammary tumour derived cell culture showed no obvious fibrin degradation. Intriguingly, it presented an in vivo-like structure (FIG. 14C3) comprising a tubular structure of epithelial cells which mimic a mammary gland (green) embedded in mesenchymal cells (red).

Throughout this specification, unless the context requires otherwise, the word "comprise", or variations such as "comprises" or "comprising", will be understood to imply the inclusion of a stated element or integer or group of elements or integers but not the exclusion of any other element or integer or group of elements or integers.

It is to be noted that where a range of values is expressed, it will be clearly understood that this range encompasses the upper and lower limits of the range, and all numerical values or sub-ranges in between these limits as if each numerical value and sub-range is explicitly recited. The statement "about X % to Y %" has the same meaning as "about X % to about Y %," unless indicated otherwise.

The term "about" as used in the specification means approximately or nearly and in the context of a numerical value or range set forth herein is meant to encompass variations of +/−10% or less, +/−5% or less, +/−1% or less, or +/−0.1% or less of and from the numerical value or range recited or claimed.

It is also to be noted that, as used herein, the singular forms "a", "an" and "the" include plural aspects unless the context already dictates otherwise.

The subject headings used herein are included only for the ease of reference of the reader and should not be used to limit the subject matter found throughout the disclosure or the claims. The subject headings should not be used in construing the scope of the claims or the claim limitations.

The description provided herein is in relation to several embodiments which may share common characteristics and features. It is to be understood that one or more features of one embodiment may be combinable with one or more features of the other embodiments. In addition, a single feature or combination of features of the embodiments may constitute additional embodiments.

All methods described herein can be performed in any suitable order unless indicated otherwise herein or clearly contradicted by context. The use of any and all examples, or exemplary language (e.g., "such as") provided herein, is intended merely to better illuminate the example embodiments and does not pose a limitation on the scope of the claimed invention unless otherwise claimed. No language in the specification should be construed as indicating any non-claimed element as essential.

It will be apparent to the person skilled in the art that while the invention has been described in some detail for the purposes of clarity and understanding, various modifications and alterations to the embodiments and methods described herein may be made without departing from the scope of the inventive concept disclosed in this specification.

Those skilled in the art will appreciate that the invention described herein is susceptible to variations and modifications other than those specifically described. It is to be understood that the invention includes all such variations and modifications. The invention also includes all of the steps, features, compositions and compounds referred to, or indicated in this specification, individually or collectively, and any and all combinations of any two or more of the steps or features.

The invention claimed is:

1. A three-dimensional cell culture platform comprising:
   i) a cell supporting medium having at least one microwell formed therein, wherein the cell-supporting medium is formed by a hydrogel; and
   (ii) one or more microwell spacers defining an entrance of the one or each microwell, the entrance enabling the introduction of a cell culture medium into the one or each microwell,
   wherein the volume of a microwell is determined by a surface of the one or more microwell spacers defining the entrance of the microwell, and by an interface of the cell supporting medium of the microwell,
   wherein the one or more microwell spacers are in direct contact with the cell supporting medium prior to one or more cells being delivered to the three-dimensional cell culture platform,
   wherein the distance and area between each microwell spacer influences the volume and shape of the microwell, and
   wherein each microwell is in the form of a microchannel in the cell supporting medium.

2. The three-dimensional cell culture platform of claim 1, wherein the cell supporting medium has at least two microwells formed therein, wherein at least one microwell opposes and faces another microwell.

3. The three-dimensional cell culture platform of claim 1, wherein the cell supporting medium has at least two microwells formed therein, wherein the at least two microwells lie in the same plane and are spaced apart from each other.

4. The three-dimensional cell culture platform of claim 1, wherein each microwell or microchannel has a flat, bulbous, rounded, or curved base.

5. The three-dimensional cell culture platform of claim 1, wherein the platform supports the formation of a cluster of cells in situ.

6. The three-dimensional cell culture platform of claim 1, wherein the cell culture medium enables delivery of cells to a microwell, and
   wherein the cells once delivered form a cluster of cells in the microwell, on the interface of the cell supporting medium of the microwell, and/or in the cell supporting medium.

7. The three-dimensional cell culture platform of claim 1, further comprising a cluster of cells formed in situ, and
   wherein the cluster of cells is present in a microwell, on the interface of the cell supporting medium of a microwell, and/or in the cell supporting medium.

8. The three-dimensional cell culture platform of claim 1, wherein the entrance of a microwell enables the delivery of one or more agents to the microwell, to the interface of the cell supporting medium of a microwell, or to the cell supporting medium.

9. The three-dimensional cell culture platform of claim 8, wherein the one or more agents are selected from the group consisting of organic materials, inorganic materials, a drug carrier, a colloid, a drug, a small molecule, a nucleic acid, an oligonucleotide, an oligopeptide, a polypeptide, a protein, an enzyme, a polysaccharide, a glycoprotein, a hormone, a receptor, a ligand for a receptor, a co-factor, an antisense oligonucleotide, a ribozyme, a small interfering RNA, a microRNA, a short hairpin RNA, a lipid, an aptamer, a virus, and an antibody or an antigen binding part thereof.

10. The three-dimensional cell culture platform of claim 1, wherein the cell supporting medium supports the formation of a cluster of cells in situ, and wherein the cluster of cells is in the form of a spheroid, a microtissue, a compact aggregate, a loose aggregate, or a suspension of cells in the cell supporting medium.

\* \* \* \* \*